United States Patent
Laroia et al.

(10) Patent No.: US 9,554,031 B2
(45) Date of Patent: Jan. 24, 2017

(54) CAMERA FOCUSING RELATED METHODS AND APPARATUS

(71) Applicant: THE LIGHTCO INC., Palo Alto, CA (US)

(72) Inventors: Rajiv Laroia, Far Hills, NJ (US); Sapna A Shroff, Sunnyvale, CA (US)

(73) Assignee: Light Labs Inc., Palo Alto, CA (US)

( * ) Notice: Subject to any disclaimer, the term of this patent is extended or adjusted under 35 U.S.C. 154(b) by 0 days.

(21) Appl. No.: 14/518,396

(22) Filed: Oct. 20, 2014

(65) Prior Publication Data

US 2015/0189154 A1 Jul. 2, 2015

Related U.S. Application Data

(60) Provisional application No. 61/922,801, filed on Dec. 31, 2013, provisional application No. 62/064,982, filed on Oct. 16, 2014.

(51) Int. Cl.
*H04N 5/232* (2006.01)

(52) U.S. Cl.
CPC .................................. *H04N 5/23212* (2013.01)

(58) Field of Classification Search
CPC ........... G03B 13/30; G01C 3/32; G02B 27/16; G02B 27/40; H04N 5/23212
See application file for complete search history.

(56) References Cited

U.S. PATENT DOCUMENTS

| 4,890,133 A | 12/1989 | Ogawa et al. |
| 5,078,479 A | 1/1992 | Vuilleumier |
| 5,153,569 A | 10/1992 | Kawamura et al. |
| 5,353,068 A | 10/1994 | Moriwake |

(Continued)

FOREIGN PATENT DOCUMENTS

| EP | 2642757 A2 | 9/2013 |
| JP | 10091765 | 4/1998 |

(Continued)

OTHER PUBLICATIONS

Segan,S. "Hands on with the 41-Megapixel Nokia PureView 808", Feb. 27, 2012, PC Mag, [online], [retrieved on Apr. 16, 2014]. Retrieved from the Internet: , URL:http://www.pcmag.com/article2/0,2817,2400773,00.asp>, pp. 1-9.

(Continued)

*Primary Examiner* — Mekonnen Dagnew
(74) *Attorney, Agent, or Firm* — Michael P. Straub; Stephen T. Straub; Ronald P. Straub

(57) ABSTRACT

Methods and apparatus that facilitate or implement focus control in a camera and/or can be used to set the camera focus distance, e.g., the distance between the camera and an object which will appear in focus when the objects picture is taken by the camera. A depth map is generated for an image area, e.g., an area corresponding to an image which is captured by the camera. Based on said depth map, in various exemplary embodiments, a visual indication of which portions of an image captured by the camera device are in focus is generated. A user may indicate a change in the desired focus distance by touching a portion of the screen corresponding to an object at the desired focus distance or by varying a slider or other focus distance control.

20 Claims, 35 Drawing Sheets

(56) References Cited

U.S. PATENT DOCUMENTS

| | | |
|---|---|---|
| 5,583,602 A | 12/1996 | Yamamoto |
| 5,781,331 A | 7/1998 | Carr et al. |
| 5,889,553 A | 3/1999 | Kino et al. |
| 5,975,710 A | 11/1999 | Luster |
| 5,982,951 A | 11/1999 | Katayama et al. |
| 6,011,661 A | 1/2000 | Weng |
| 6,028,600 A | 2/2000 | Rosin et al. |
| 6,081,670 A | 6/2000 | Madsen et al. |
| 6,141,034 A | 10/2000 | McCutchen |
| 7,009,652 B1 | 3/2006 | Tanida et al. |
| 7,280,735 B2 | 10/2007 | Thibault |
| 7,315,423 B2 | 1/2008 | Sato |
| 7,551,358 B2 | 6/2009 | Lee et al. |
| 7,561,201 B2 | 7/2009 | Hong |
| 7,801,428 B2 | 9/2010 | Nagaishi et al. |
| 7,810,511 B2 | 10/2010 | Fagrenius et al. |
| 8,144,230 B2 | 3/2012 | Watanabe et al. |
| 8,194,169 B2 | 6/2012 | Tamaki et al. |
| 8,199,222 B2 | 6/2012 | Drimbarean et al. |
| 8,237,841 B2 | 8/2012 | Tanida et al. |
| 8,320,051 B2 | 11/2012 | Matsumura et al. |
| 8,417,058 B2 | 4/2013 | Tardif |
| 8,482,637 B2 | 7/2013 | Ohara et al. |
| 8,520,022 B1 | 8/2013 | Cohen et al. |
| 8,553,106 B2 | 10/2013 | Scarff |
| 8,619,082 B1 | 12/2013 | Ciurea et al. |
| 8,639,296 B2 | 1/2014 | Ahn et al. |
| 8,665,341 B2 | 3/2014 | Georgiev et al. |
| 8,704,944 B1 | 4/2014 | Wierzoch et al. |
| 8,762,895 B2 | 6/2014 | Mehta et al. |
| 8,780,258 B2 | 7/2014 | Lee |
| 8,896,655 B2 | 11/2014 | Mauchly et al. |
| 9,041,826 B2 | 5/2015 | Jung et al. |
| 9,104,705 B2 | 8/2015 | Fujinaga |
| 9,135,732 B2 | 9/2015 | Winn et al. |
| 2002/0149691 A1 | 10/2002 | Pereira et al. |
| 2003/0018427 A1 | 1/2003 | Yokota et al. |
| 2003/0020814 A1 | 1/2003 | Ono |
| 2003/0185551 A1 | 10/2003 | Chen |
| 2004/0100479 A1 | 5/2004 | Nakano et al. |
| 2004/0227839 A1 | 11/2004 | Stavley et al. |
| 2005/0088546 A1 | 4/2005 | Wang |
| 2005/0200012 A1 | 9/2005 | Kinsman |
| 2006/0067672 A1 | 3/2006 | Washisu et al. |
| 2006/0187338 A1 | 8/2006 | May et al. |
| 2006/0221218 A1 | 10/2006 | Adler et al. |
| 2006/0238886 A1 | 10/2006 | Kushida et al. |
| 2006/0281453 A1 | 12/2006 | Jaiswal et al. |
| 2007/0050139 A1 | 3/2007 | Sidman |
| 2007/0065012 A1 | 3/2007 | Yamakado et al. |
| 2007/0127915 A1 | 6/2007 | Lu et al. |
| 2007/0177047 A1 | 8/2007 | Goto |
| 2007/0182528 A1 | 8/2007 | Breed et al. |
| 2008/0030592 A1 | 2/2008 | Border et al. |
| 2008/0074755 A1 | 3/2008 | Smith |
| 2008/0084484 A1 | 4/2008 | Ochi et al. |
| 2008/0111881 A1 | 5/2008 | Gibbs et al. |
| 2008/0180562 A1 | 7/2008 | Kobayashi |
| 2008/0211941 A1 | 9/2008 | Deever et al. |
| 2008/0219654 A1 | 9/2008 | Border et al. |
| 2008/0240698 A1 | 10/2008 | Bartilson et al. |
| 2008/0247745 A1 | 10/2008 | Nilsson |
| 2008/0251697 A1 | 10/2008 | Park et al. |
| 2008/0278610 A1 | 11/2008 | Boettiger |
| 2009/0086032 A1 | 4/2009 | Li |
| 2009/0136223 A1 | 5/2009 | Motomura et al. |
| 2009/0154821 A1 | 6/2009 | Sorek et al. |
| 2009/0225203 A1 | 9/2009 | Tanida et al. |
| 2009/0278950 A1 | 11/2009 | Deng et al. |
| 2009/0290042 A1 | 11/2009 | Shiohara |
| 2010/0013906 A1 | 1/2010 | Border et al. |
| 2010/0034531 A1 | 2/2010 | Go |
| 2010/0045774 A1 | 2/2010 | Len et al. |
| 2010/0053414 A1 | 3/2010 | Tamaki et al. |
| 2010/0079635 A1 | 4/2010 | Yano et al. |
| 2010/0091089 A1 | 4/2010 | Cromwell et al. |
| 2010/0097443 A1 | 4/2010 | Lablans |
| 2010/0225755 A1 | 9/2010 | Tamaki et al. |
| 2010/0238327 A1 | 9/2010 | Griffith et al. |
| 2010/0265346 A1 | 10/2010 | Iizuka |
| 2010/0283842 A1 | 11/2010 | Guissin et al. |
| 2010/0296802 A1 | 11/2010 | Davies |
| 2011/0051243 A1 | 3/2011 | Su |
| 2011/0063325 A1 | 3/2011 | Saunders |
| 2011/0069189 A1 | 3/2011 | Venkataraman et al. |
| 2011/0080655 A1 | 4/2011 | Mori |
| 2011/0123115 A1 | 5/2011 | Lee et al. |
| 2011/0128393 A1 | 6/2011 | Tavi et al. |
| 2011/0157430 A1 | 6/2011 | Hosoya et al. |
| 2011/0157451 A1 | 6/2011 | Chang |
| 2011/0187878 A1 | 8/2011 | Mor et al. |
| 2011/0193984 A1 | 8/2011 | Kitaya et al. |
| 2011/0221920 A1 | 9/2011 | Gwak |
| 2011/0222167 A1 | 9/2011 | Iwasawa |
| 2011/0242342 A1 | 10/2011 | Goma et al. |
| 2011/0280565 A1 | 11/2011 | Chapman et al. |
| 2011/0285895 A1 | 11/2011 | Weng et al. |
| 2012/0002096 A1 | 1/2012 | Choi et al. |
| 2012/0033069 A1 | 2/2012 | Becker et al. |
| 2012/0062691 A1 | 3/2012 | Fowler et al. |
| 2012/0155848 A1 | 6/2012 | Labowicz et al. |
| 2012/0162464 A1 | 6/2012 | Kim |
| 2012/0188391 A1 | 7/2012 | Smith |
| 2012/0207462 A1 | 8/2012 | Justice |
| 2012/0242881 A1* | 9/2012 | Suzuki ............... H04N 5/23212 348/333.02 |
| 2012/0249815 A1 | 10/2012 | Bohn et al. |
| 2012/0257013 A1 | 10/2012 | Witt et al. |
| 2012/0257077 A1 | 10/2012 | Suzuki |
| 2012/0268642 A1 | 10/2012 | Kawai |
| 2013/0027353 A1 | 1/2013 | Hyun |
| 2013/0050564 A1 | 2/2013 | Adams, Jr. et al. |
| 2013/0057743 A1 | 3/2013 | Minagawa et al. |
| 2013/0064531 A1 | 3/2013 | Pillman et al. |
| 2013/0076928 A1 | 3/2013 | Olsen et al. |
| 2013/0086765 A1 | 4/2013 | Chen |
| 2013/0088614 A1 | 4/2013 | Lee |
| 2013/0093842 A1 | 4/2013 | Yahata |
| 2013/0093947 A1 | 4/2013 | Lee et al. |
| 2013/0100272 A1 | 4/2013 | Price et al. |
| 2013/0153772 A1 | 6/2013 | Rossi et al. |
| 2013/0155194 A1 | 6/2013 | Sacre et al. |
| 2013/0194475 A1* | 8/2013 | Okamoto ........... H04N 5/23293 348/333.01 |
| 2013/0222676 A1 | 8/2013 | Ono |
| 2013/0223759 A1 | 8/2013 | Nishiyama |
| 2013/0250125 A1 | 9/2013 | Garrow et al. |
| 2013/0258044 A1 | 10/2013 | Betts-Lacroix |
| 2014/0049677 A1 | 2/2014 | Kawaguchi |
| 2014/0063018 A1 | 3/2014 | Takeshita |
| 2014/0111650 A1 | 4/2014 | Georgiev et al. |
| 2014/0152802 A1 | 6/2014 | Olsson et al. |
| 2014/0192214 A1 | 7/2014 | Laroia |
| 2014/0192224 A1 | 7/2014 | Laroia |
| 2014/0192225 A1 | 7/2014 | Laroia |
| 2014/0192240 A1 | 7/2014 | Laroia |
| 2014/0192253 A1 | 7/2014 | Laroia |
| 2014/0204244 A1 | 7/2014 | Choi et al. |
| 2014/0226041 A1 | 8/2014 | Eguchi et al. |
| 2014/0267243 A1 | 9/2014 | Venkataraman et al. |
| 2014/0293079 A1 | 10/2014 | Milanfar et al. |
| 2014/0354714 A1* | 12/2014 | Hirschler ............... G09G 5/391 345/698 |
| 2015/0035824 A1 | 2/2015 | Takahashi et al. |
| 2015/0043808 A1 | 2/2015 | Takahashi et al. |
| 2015/0049233 A1 | 2/2015 | Choi |
| 2015/0154449 A1 | 6/2015 | Ito et al. |
| 2015/0156399 A1* | 6/2015 | Chen ................... H04N 5/23212 348/48 |
| 2015/0234149 A1 | 8/2015 | Kreitzer et al. |
| 2015/0253647 A1 | 9/2015 | Mercado |

(56) References Cited

U.S. PATENT DOCUMENTS

2015/0279012 A1* 10/2015 Brown ................ G06T 5/50
　　　　　　　　　　　　　　　　　　　　　382/284
2016/0142610 A1　5/2016 Rivard et al.

FOREIGN PATENT DOCUMENTS

| JP | 2001061109 | 3/2001 |
| --- | --- | --- |
| JP | 2007164258 | 6/2004 |
| JP | 2004289214 | 10/2004 |
| JP | 2006106230 | 4/2006 |
| JP | 2007201915 | 8/2007 |
| JP | 2008268937 | 11/2008 |
| JP | 2010049263 | 3/2010 |
| JP | 2010256397 | 11/2010 |
| KR | 100153873 | 7/1998 |
| KR | 1020080022260 | 3/2008 |
| KR | 1020110022279 | 3/2011 |
| KR | 1020130038076 | 4/2013 |

OTHER PUBLICATIONS

Robertson, M et al "Dynamic Range Improvement Through Multiple Exposures". 1999. [online] [retrieved on Apr. 16, 2014]:<URL:http://ieeexplore.ieee.org/xpl/login.jsp?tp=&arnumber=817091&url=http%3A%2F%2Fieeexplore.ieee.org%2Fxpls%2Fabs_all.jsp%3Farnumber%3D817091>, pp. 1-6.

International Search Report from International Application No. PCT/US14/10267, pp. 1-5, dated Jul. 8, 2014.
Written Opinion of the International Searching Authority from International Application No. PCT/US14/10267, pp. 1-29, dated Jul. 8, 2014.
International Search Report and Written Opinion of the International Searching Authority from International Application No. PCT/US2014/061254, pp. 1-29, dated Jan. 8, 2015.
International Search Report and Written Opinion of the International Searching Authority from International Application No. PCT/US2014/061248, pp. 1-11, dated Jan. 13, 2015.
International Search Report and Written Opinion of the International Searching Authority from International Application No. PCT/US2014/061258, pp. 1-14, dated Jan. 13, 2015.
International Search Report and Written Opinion of the International Searching Authority from International Application No. PCT/US2014/061257, pp. 1-12, dated Jan. 14, 2015.
International Search Report and Written Opinion of the International Searching Authority from International Application No. PCT/US2014/062306, pp. 1-12, dated Jan. 26, 2015.
International Search Report and Written Opinion of the International Searching Authority from International Application No. PCT/US2014/063601, pp. 1-12, dated Jan. 27, 2015.
International Search Report and Written Opinion of the International Searching Authority from International Application No. PCT/US2014/072907, pp. 1-11, dated Mar. 27, 2015.

* cited by examiner

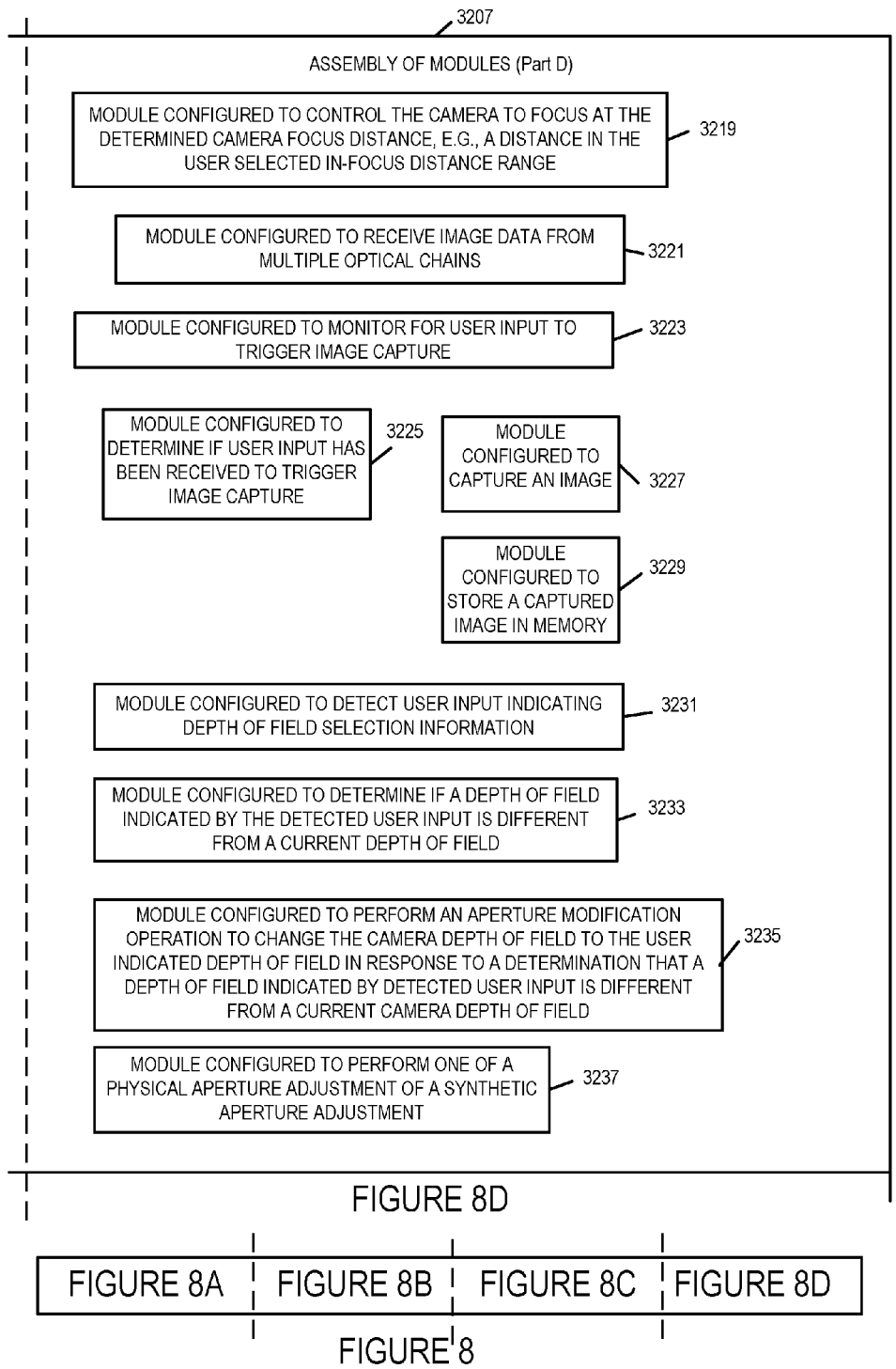

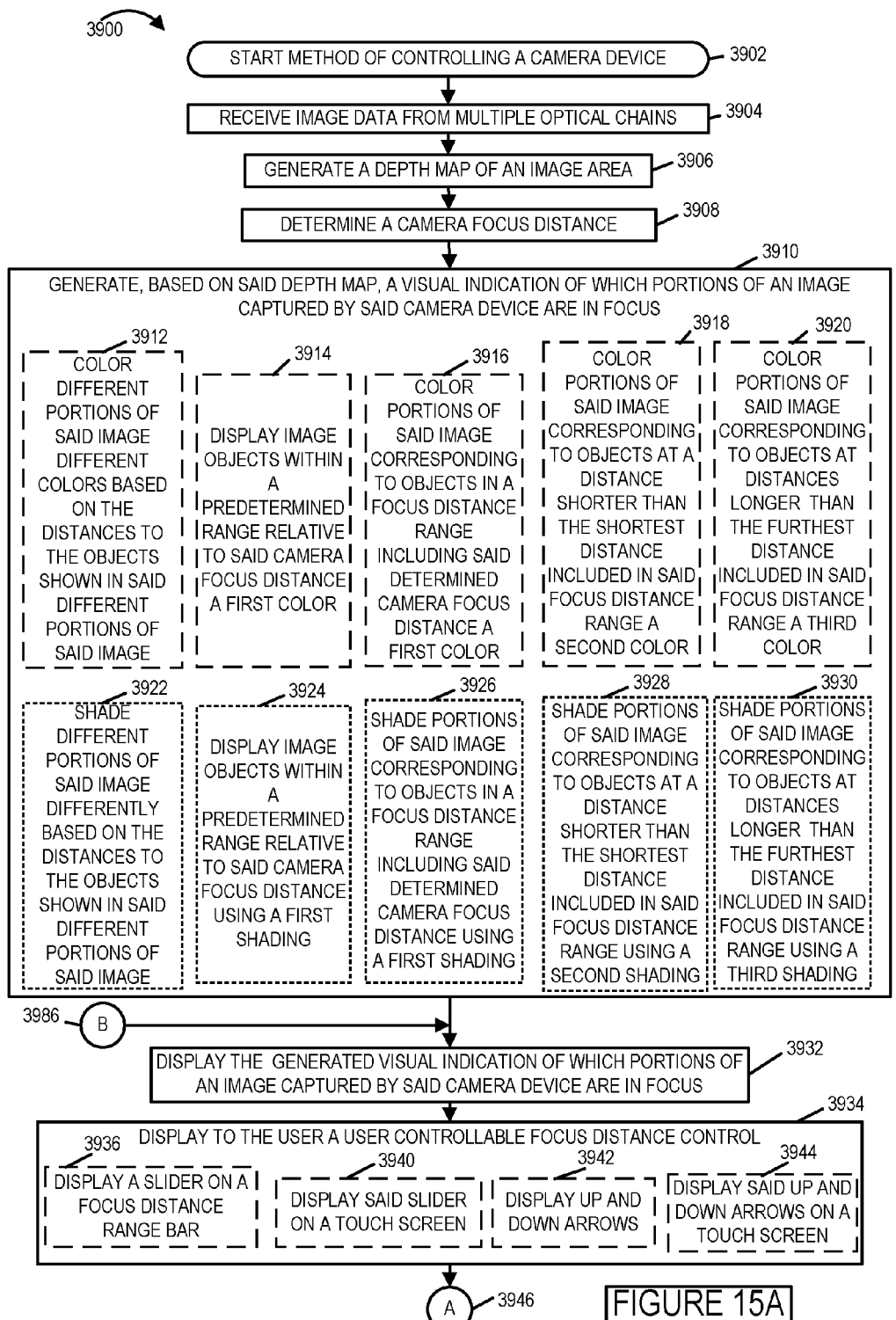

| FIGURE 16A | FIGURE 16B |

CAMERA FOCUSING RELATED METHODS AND APPARATUS

RELATED APPLICATIONS

The present application claims the benefit of U.S. Provisional Patent Application Ser. No. 61/922,801 filed Dec. 31, 2013 and U.S. Provisional Patent Application Ser. No. 62/064,982 filed Oct. 16, 2014, each of which is hereby expressly incorporated by reference in their entirety.

FIELD

The present application relates to camera focusing and, more particularly, to methods and apparatus which allow a user to control camera focusing operations, e.g. setting a focus distance and/or depth of field, e.g. based on a visual image generated as a function of a depth map and/or user input.

DISCUSSION

High quality digital cameras have to a large extent replaced film cameras. While digital cameras offer some advantages over film cameras, most digital cameras still need to focused as part of a picture taking operation.

Portions of an area which are in focus will appear normally appear sharp in the image which is captured while areas of scene which correspond to a distance from the camera which is different from the distance at which the camera is focused will normally appear blurry.

Skilled photographers will often carefully control camera focus so that a subject or objects of interest appear in focus while other areas at a different distance than the object or objects of interest from the camera will appear blurry. This may be done by controlling one or more camera setting which can be used to control a focus distance and/or depth of field. While focus distance is normally controlled by controlling the focal length of a camera module and thus the distance at which the camera module will focus, depth of filed is often achieved through aperture control whether the aperture control is implemented by physically controlling the size of an aperture or synthetically controlling the aperture through processing or other non-mechanical operations.

While many cameras support focus control aperture/depth of field control is more commonly found on high end cameras. Objects in a range of distances from a camera corresponding to the depth of field will appear to be in focus while objects outside the distance range from the camera corresponding to the depth of field will normally appear blurry.

Depth of field control is sometimes use to achieve desired blurring of portions of an image while leaving another portion, e.g., the faces of a bride and groom in a wedding photo, clear and in focus.

Digital cameras often allow a user to select, e.g., by touching a portion of a display screen, an area of a displayed image to indicate the image area a user desires to be in focus. This touch based method of indicating an image portion which is to be used to determine the camera focus is useful in many applications and relatively intuitive. Unfortunately, the small screen size on many cameras combined with the relatively large size of a finger touch area results in a degree of uncertainty as to precisely what object is to be focused on in many cases. Consider for example an image which includes a tree with branches and leaves. By touching an area of the displayed image including the leaves and branches there may be uncertainty as to whether the user intended to focus on a leaf which may be closer to the camera than the branch which is displayed in the same area of the screen and which may be further from the camera.

While identification of an object to be focused on by a camera is an issue in many known systems, even if the camera focuses on the identified target, the user may achieve sub-optimal focusing for a scene including multiple object of interest. Consider for example a group photo shoot. In such in situation it may be difficult for the camera user to judge the relative distances of members in the group to the camera. By selecting one member of the group without information about the relative distances of the various group members to the camera, the camera user may choose a group member to focus on when focusing on another group member or an object located between group members may result in a better focus distance selection from the perspective of the overall group than would be achieved by focusing on an individual group member nearer or further from the camera. This problem is particularly of interest when group members or objects of interest are scattered throughout an area rather than in a concentrated group making it difficult to judge what object would result in the largest number of object of interest being in focus is it was selected as the object to be used for determining camera focus distance.

While touching a portion of an image to indicate the point at which the camera should focus, maybe useful in controlling a focus distance setting, it is not well suited for field of view, e.g., as may be achieved through aperture control, since it does not convey information about the desired field of view which corresponds to a range of distances from a camera in which a user desires objects in the range to be in focus.

In view of the above discussion, it should be appreciated that there is a need for new and improved methods and apparatus which would provide a camera user useful information which can be used to facilitate camera focus related operations and/or allow a user to control such operations. In particular there is a need for improved methods of allowing a user to control camera module focus and/or a camera module field of view in a camera including one or more camera modules.

SUMMARY OF THE INVENTION

Various exemplary methods and apparatus that facilitate or implement focus control and/or field of view control in a camera and/or can be used to set the camera focus distance, e.g., the distance between the camera and an object which will appear in focus when the objects picture is taken by the camera or the camera field of view. As discussed above, the camera field of view corresponds to a range of distances from the camera in which objects will appear in focus. In some but not necessarily all embodiments the field of view is controlled in response to user input indicating a range of distances in which a user desires object to be in focus and by implementing physical or synthetic aperture control based on the indicated range of distances the user seeks to be in focus.

In various exemplary embodiments a depth map is generated for an image area, e.g., an area corresponding to an image which is captured by the camera. The depth map may be generated in a variety of ways by sensing or otherwise measuring the distance to one or more objects in the image area. In at least some embodiments, multiple images of an image area are captured using different optical chain modules of a camera using lenses which are a known distance apart from each other. Distances to objects, e.g., depths, in the image area are determined using the known lens spacing and, for example, stereoscopic distance determination techniques. Thus, in at least some embodiments a depth map is generated from images captured by the camera where the images correspond, entirely or at least to some extent, to the same image area.

Based on said depth map, in various exemplary embodiments, a visual indication of which portions of an image captured by the camera device are in focus is generated. The visual indication may be in the form of the use of colors to indicate different depths with one color, e.g., red, being used for objections which are in focus in the displayed image. The displayed image with depth information may be one of the images used to generate the depth map or an image captured subsequent to generation of the depth map. Instead of colors, shading, cross-hatching or other visual indications may be used to distinguish between portions of the image which are in focus and portions which are not in focus with the relative distances from the camera and/or focus distance being indicated via color, shading and/or other visual indications.

From the visual indication of depth of the various objects in the image area, a user of the camera can not only determine which portions of the image are in or out of focus but also their relative depths allowing a user to visually identify and determine which objects are at the same depth.

With the visual indication of depth displayed to the user, the user can provide additional input used to adjust or specify the desired camera focus distance. The user can, in those embodiments where depth of field is user controllable, indicate a desired depth of field, e.g., by selecting multiple objects corresponding to a range of depths, e.g., distances, from the camera.

With regard to focus control, for example, if the user initially selected a leaf of a tree and the leaf was displayed not to be in focus due to a miss-interpretation that the user actually selected a nearby branch of the tree, the user may touch a portion of the displayed image of the same color as the leaf thereby indicating that the camera is to focus to the distance corresponding to the image depth to which the leaf corresponds without the user having to touch the relatively small leaf. Alternatively the user may select a portion of the displayed image to be enlarged and then select the object in the enlarged image portion which is at the depth to which the focus is to be set.

Similarly, after considering the depth information visually displayed for a group of objects of interest, the user may select an object which is shown to be at a depth which is similar to the majority of other objects in the group of objects of interest. In this way the user can optimize the focus for a group of objects based on readily apparent visual indicia of the depth of the objects throughout the image being viewed for purposes of setting the focus distance.

For purposes of controlling a depth of field, a user may select multiple objects at different depths, the camera aperture is then controlled either mechanically or synthetically based on the range of depths selected by the user. Camera focus is then controlled so that the camera will focus at a distance from the camera which is within the user selected range of distances with the focus point usually being within the first ⅓ of the distance range, e.g., the ⅓ portion of the range closest to the camera.

A visual indication of objects in focus and thus the focus range may be implemented using colors, shading and/or other visual indicator of the portion of an image which will be in focus. While in some embodiments in focus objects are colored or shaded in a particular manner to identify the in-focus image portions in other embodiments out of focus image areas are shaded or otherwise distorted to provide a visual indication of the portion of the image which are in focus and out of focus. For example by blurring of image areas which are out of focus more than is due to the lack of focus in these areas, a visual indication is provided that the unblurred image areas are in focus. The visual indications may be indicated using changes of contrast, changes in luminance and/or other visually perceivable images changes such as cross hatching or use of color.

It should be appreciated that the range of colors, shading or patterns used to indicate depth may follow a predetermined pattern allowing a user to readily determine which objects are nearer to the camera than those which are in focus and further away from the camera than the objects in focus. For example, a first color may be used for in focus image areas, a second color used for background image areas further away from the camera than the images in focus and a third color may be used for foreground image area corresponding to objects which are closer to the camera than the objects which are in focus.

While three colors can be used to generally distinguish between image areas corresponding to different image areas, the intensity of the colors may vary to further indicate depth to a finer degree than is possible by using three colors, more or fewer colors may be used or a combination of colors, shading or patterns may be used to display depth to a relatively fine degree. As an alternative to the use of color to indicate depth, shading or various patterns applied to objects may be used to show depth.

While touching a portion of the display screen corresponding to a displayed object at the depth to which the camera focus is to be set is used to set the desired camera focus distance in some embodiments, in other embodiments a user is provided a focus control which may be varied to change camera focus. In one such embodiment a user is presented with a depth slider. The user can vary the position of an indicator on the slider to adjust the depth to which the focus is set. As the user varies the slider position in at least one embodiment, the visual indicia of the objects position relative the camera focus point is changed. For example, if the slider is modified so that the focus distance is increased some objects previously in the background will be changed in color to indicate that they are now in the foreground, i.e., closer to the camera than objects which are in focus. Similarly, in such a case, objects which were previously in focus will be changed in color or shade to indicate that they are no longer at the focus distance but closer to the camera than the focus distance.

Should the user move the focus slider to adjust the focus distance to be shorter bringing objects which are close to the camera into focus, the objects which were previously indicated to be in focus will be modified in color, shading or via another visual indiator to show that they are now further away from the camera than the objects which are in focus.

Thus, in such an embodiments through the user of a slider, dial, numerical focus distance input, or other focus distance control, a user can vary the camera focus distance with the changes being reflected in a displayed image which includes depth information displayed through the use of one or more visual depth indicators. In such an embodiment a user can vary the focus point without having to touch individual displayed objects allowing for a very fine control of the depth setting with a quick indication of which objects are being moved into or out of focus as the focus is adjusted.

While in some embodiments a touch screen control is used to vary the focus distance, in other embodiments a physical button, dial or slider is provided on the camera to allow input of focus control information by a user.

It should be appreciated that through the display of depth information, which in various embodiments is generated from captured images, facilities much more refined and informed user control of the camera focus setting than is possible when compared to system which merely allow a user to identify an object which is to be focused upon without displaying depth map information.

Significantly, the display of which objects will move in or out of focus can, and in many embodiments is performed, without the camera having to refocus before being able to provide a visual indication of the effect of the change in focus distance. This is possible since the distance to objects is known from the depth map and which objects will be in focus for a particular focus depth setting can and in various embodiments is determined from the depth map without the need to refocus the camera.

The ability to show the effect of a change in a focus setting without having to move camera components to adjust the camera focus can save power and mechanical wear as compared to camera devices which need to refocus to show the effect of a change in a focus distance selection. In at least some embodiments the actual change in camera device focus is implemented, e.g., by moving lenses or other components of the camera device, after the user settles on the final focus distance to be used to capture one or more images. The user may, and in some embodiments does, signal the selection of a focus distance to be used to capture an image by the user pressing a button to take a picture after setting the focus distance via the display or thorough another technique such as a partial press of the button used to trigger taking the refocusing of the camera prior to taking a picture. In one such embodiment after the refocusing operation has been implemented the user can complete the depressing of the button used to trigger the refocusing to the focus setting to trigger taking of a picture.

After user control of the focus distance and/or field of view, the user can and in some cases does provide an input indicating that an image, e.g., picture should be taken. In response to a user input to trigger taking of a picture, the camera takes a picture using the user controlled focus setting and/or depth of field. The one or more pictures may be taken using the user controlled focus and depth of field, e.g., using one or more optical chains, also sometimes referred to as camera modules, of a camera. The captured images are stored, displayed and/or processed to generate a composite image which may be, and sometimes is, displayed, transmitted or output.

An exemplary method of controlling a camera device, in accordance with some embodiments, includes: generating a depth map of an image area; and generating, based on said depth map, a visual indication of which portions of an image captured by said camera device are in focus. In some embodiments, the exemplary method further includes determining a camera focus distance. In some embodiments, generating a visual indication of which portions of an image captured by said camera device are in focus includes coloring different portions of said image different colors based on the distances to the objects shown in said different portions of said image. In some embodiments, generating a visual indication of which portions of an image captured by said camera device are in focus includes shading different portions of said image differently based on the distances to the objects shown in said different portions of said image.

An exemplary method of controlling a camera device, in accordance with some embodiments, includes: generating a depth map of an image area; generating, based on said depth map, a visual indication of which portions of an image captured by said camera device are in focus; displaying to the user a user controllable focus distance control; and monitoring for user input indicating a change in a user selected focus distance.

Numerous additional features and embodiments are described in the detailed description which follows.

BRIEF DESCRIPTION OF THE DRAWINGS

FIG. 8D is a drawing of a fourth part of assembly of modules which may be included in an exemplary camera device in accordance with an exemplary embodiment.

FIG. 15A is a first part of a flowchart of an exemplary method of controlling a camera device in accordance with various exemplary embodiments.

DETAILED DESCRIPTION

Figure 1A:
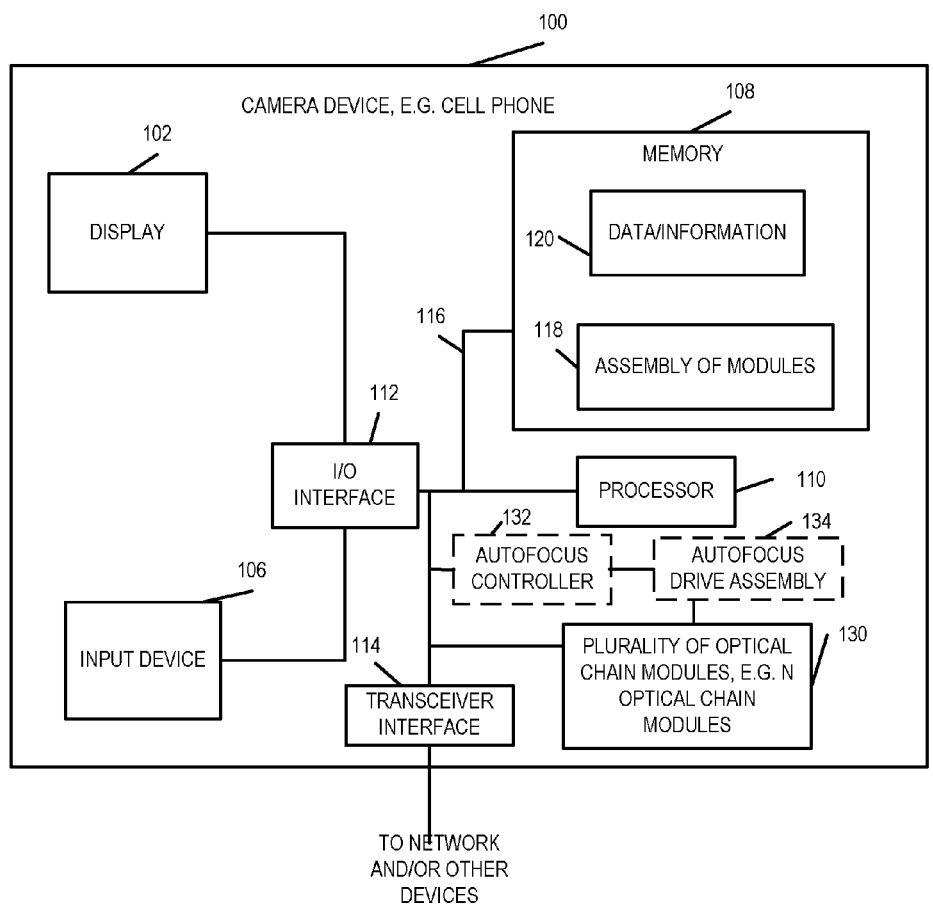
FIG. 1A is an exemplary block diagram of an exemplary apparatus, e.g., camera device, implemented in accordance with one embodiment of the present invention.

FIG. 1A illustrates an exemplary apparatus 100, sometimes referred to hereinafter as a camera device, implemented in accordance with one exemplary embodiment of the present invention. The camera device 100, in some embodiments, is a portable device, e.g., a cell phone or tablet including a camera assembly. In other embodiments, it is fixed device such as a wall mounted camera.

FIG. 1A illustrates the camera device 100 in block diagram form showing the connections between various elements of the apparatus 100. The exemplary camera device 100 includes a display device 102, an input device 106, memory 108, a processor 110, a transceiver interface 114, e.g., a cellular interface, a WIFI interface, or a USB interface, an I/O interface 112, and a bus 116 which are mounted in a housing represented by the rectangular box touched by the line leading to reference number 100. The input device 106 may be, and in some embodiments is, e.g., keypad, touch screen, or similar device that may be used for inputting information, data and for instructions. The display device 102 may be, and in some embodiments is, a touch screen, used to display images, video, information regarding the configuration of the camera device, and/or status of data processing being performed on the camera device. In the case where the display device 102 is a touch screen, the display device 102 serves as an additional input device and/or as an alternative to the separate input device, e.g., buttons, 106. The I/O interface 112 couples the display 102 and input device 106 to the bus 116 and interfaces between the display 102, input device 106 and the other elements of the camera which can communicate and interact via the bus 116. In addition to being coupled to the I/O interface 112, the bus 116 is coupled to the memory 108, processor 110, an optional autofocus controller 132, a transceiver interface 114, and a plurality of optical chain modules 130, e.g., N optical chain modules. In some embodiments N is an integer greater than 2, e.g., 3, 4, 7 or a larger value depending on the particular embodiment. Images captured by individual optical chain modules in the plurality of optical chain modules 130 can be stored in memory 108, e.g., as part of the data/information 120 and processed by the processor 110, e.g., to generate one or more composite images. Multiple captured images and/or composite images may be processed to form video, e.g., a series of images corresponding to a period of time. Transceiver interface 114 couples the internal components of the camera device 100 to an external network, e.g., the Internet, and/or one or more other devices e.g., memory or stand alone computer. Via interface 114 the camera device 100 can and does output data, e.g., captured images, generated composite images, and/or generated video. The output may be to a network or to another external device for processing, storage and/or to be shared. The captured image data, generated composite images and/or video can be provided as input data to another device for further processing and/or sent for storage, e.g., in external memory, an external device or in a network.

The transceiver interface 114 of the camera device 100 may be, and in some instances is, coupled to a computer so that image data may be processed on the external computer. In some embodiments the external computer has a higher computational processing capability than the camera device 100 which allows for more computationally complex image processing of the image data outputted to occur on the external computer. The transceiver interface 114 also allows data, information and instructions to be supplied to the camera device 100 from one or more networks and/or other external devices such as a computer or memory for storage and/or processing on the camera device 100. For example, background images may be supplied to the camera device to be combined by the camera processor 110 with one or more images captured by the camera device 100. Instructions and/or data updates can be loaded onto the camera via interface 114 and stored in memory 108.

The camera device 100 may include, and in some embodiments does include, an autofocus controller 132 and/or autofocus drive assembly 134. The autofocus controller 132 is present in at least some autofocus embodiments but would be omitted in fixed focus embodiments. The autofocus controller 132 controls adjustment of at least one lens position in the optical chain modules used to achieve a desired, e.g., user indicated, focus. In the case where individual drive assemblies are included in each optical chain module, the autofocus controller 132 may drive the autofocus drive of various optical chain modules to focus on the same target. As will be discussed further below, in some embodiments lenses for multiple optical chain modules are mounted on a single platter which may be moved allowing all the lenses on the platter to be moved by adjusting the position of the lens platter. In some such embodiments the autofocus drive assembly 134 is included as an element that is external to the individual optical chain modules with the drive assembly 134 driving the platter including the lenses for multiple optical chains under control of the autofocus controller 132. While the optical chain modules will in many embodiments be focused together to focus on an object at a particular distance from the camera device 100, it is possible for different optical chain modules to be focused to different distances and in some embodiments different focus points are intentionally used for different optical chains to increase the post processing options which are available.

The processor 110 controls operation of the camera device 100 to control the elements of the camera device 100 to implement the steps of the methods described herein. The processor may be a dedicated processor that is preconfigured to implement the methods. However, in many embodiments the processor 110 operates under direction of software modules and/or routines stored in the memory 108 which include instructions that, when executed, cause the processor to control the camera device 100 to implement one, more or all of the methods described herein. Memory 108 includes an assembly of modules 118 wherein one or more modules include one or more software routines, e.g., machine executable instructions, for implementing the image capture and/or image data processing methods of the present invention. Individual steps and/or lines of code in the modules of 118 when executed by the processor 110 control the processor 110 to perform steps of the method of the invention. When executed by processor 110, the data processing modules 118 cause at least some data to be processed by the processor 110 in accordance with the method of the present invention. The resulting data and information (e.g., captured images of a scene, combined images of a scene, etc.) are stored in data memory 120 for future use, additional processing, and/or output, e.g., to display device 102 for display or to another device for transmission, processing and/or display. The memory 108 includes different types of memory for example, Random Access Memory (RAM) in which the assembly of modules 118 and data/information 120 may be, and in some embodiments are stored for future use. Read only Memory (ROM) in which the assembly of modules 118 may be stored for power failures. Non-volatile memory such as flash memory for storage of data, information and instructions may also be used to implement memory 108. Memory cards may be added to the device to provide additional memory for storing data (e.g., images and video) and/or instructions such as programming. Accordingly, memory 108 may be implemented using any of a wide variety of non-transitory computer or machine readable mediums which serve as storage devices.

Having described the general components of the camera device 100 with reference to FIG. 1A, various features relating to the plurality of optical chain modules 130 will now be discussed with reference to FIGS. 1B and 10 which show the camera device 100 from front and side perspectives, respectively.

Figure 1B:
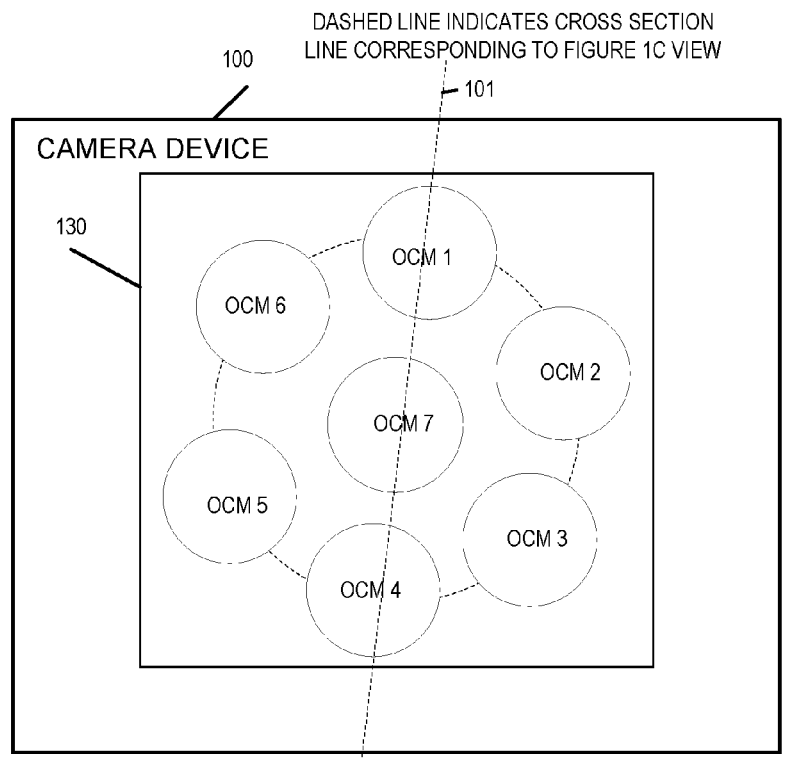
FIG. 1B illustrates a frontal view of an apparatus implemented in accordance with an exemplary embodiment of the present invention which incorporates multiple optical chain modules in accordance with the present invention with lenses which are viewable from the front of the camera.

FIG. 1B shows the front of the camera device 100. Rays of light 131 shown in FIG. 10 may enter the lenses located in the front of the camera housing. From the front of camera device 100, the camera device 100 appears as a relatively flat device with the outer rectangle representing the camera housing and the square towards the center of the camera representing the portion of the front camera body in which the plurality of optical chain modules 130 is mounted.

The front of the plurality of optical chain modules 130 is visible in FIG. 1B with the outermost lens of each optical chain module appearing as a circle represented using a solid line. In the FIG. 1B example, the plurality of optical chain modules 130 include seven optical chain modules OCM 1 through OCM 7 which include lenses represented by the solid circles shown in FIG. 1B. The lenses of the optical chain modules are arranged to form a pattern which is generally circular in the FIG. 1B example when viewed as a unit from the front. While a circular arrangement is preferred in some embodiments, non-circular arrangements are used and preferred in other embodiments. In some embodiments while the overall pattern is generally or roughly circular, different distances to the center of the general circle and/or different distances from one lens to another is intentionally used to facilitate generation of a depth map and block processing of images which may include periodic structures such as repeating patterns without the need to identify edges of the repeating pattern. Such repeating patterns may be found in a grill or a screen.

Note that the individual outer lenses, in combination, occupy an area that might otherwise have been occupied by a single large lens. Thus, the overall total light capture area corresponding to the multiple lenses of the plurality of chain modules OCM1 to OCM7, also sometimes referred to as optical camera modules, approximates that of a lens having a much larger opening but without requiring a single lens having the thickness which would normally be necessitated by the curvature of a single lens occupying the area which the lenses shown in FIG. 1B occupy.

While gaps are shown between the lens openings of the optical chain modules OCM1 to OCM7, it should be appreciated that the lenses may be made, and in some embodiments are, made so that they closely fit together minimizing gaps between the lenses represented by the circles formed by solid lines. While seven optical chain modules are shown in FIG. 1B, it should be appreciated that other numbers of optical chain modules are possible.

As will be discussed below, the use of seven optical chain modules provides a wide degree of flexibility in terms of the types of filter combinations and exposure times that can be used for different colors while still providing an optical camera module that can be used to provide an image for purposes of user preview of the image area and selection of a desired focal distance, e.g., by selecting an object in the preview image which is to be the object where the camera modules are to be focused.

For example, in some embodiments, such as the FIG. 6 embodiment, at least some of the different optical chain modules include filters corresponding to a single color thereby allowing capture of a single color at the full resolution of the image sensor, e.g., the sensor does not include a Bayer filter. In one embodiment two optical chain modules are dedicated to capturing red light, two optical chain modules are dedicated to capturing green light and two optical chain modules are dedicated to capturing blue light. The center optical chain module may include a RGB filter or opening which passes all colors with different portions of the sensor of the center optical chain module being covered by different color filters, e.g., a Bayer pattern with the optical chain module being used to capture all three colors making it easy to generate color preview images without having to process the output of multiple optical chain modules to generate a preview image.

Figure 1C:
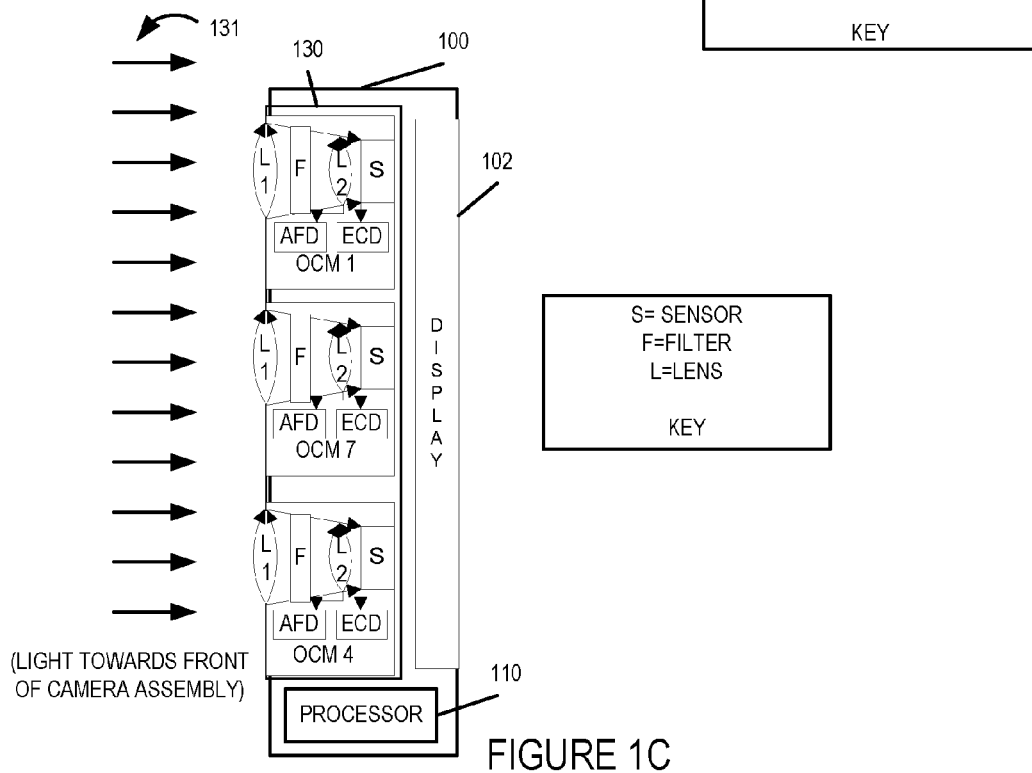
FIG. 1C, which is a side view of the exemplary apparatus of FIG. 1B, illustrates further details of the exemplary apparatus.

The use of multiple optical chains such as shown in the FIG. 1A-1C embodiment has several advantages over the use of a single optical chain.

Using multiple optical chains allows for noise averaging. For example, given the small sensor size there is a random probability that one optical chain may detect a different number, e.g., one or more, photons than another optical chain. This may represent noise as opposed to actual human perceivable variations in the image being sensed. By averaging the sensed pixel values corresponding to a portion of an image, sensed by different optical chains, the random noise may be averaged resulting in a more accurate and pleasing representation of an image or scene than if the output of a single optical chain was used.

As should be appreciated, different wavelengths of light will be bent by different amounts by the same lens. This is because the refractive index of glass (or plastic) which the lens is made of changes with wavelength. Dedication of individual optical chains to a particular color allows for the lenses for those optical chains to be designed taking into consideration the refractive index of the specific range of wavelength for that color of light. This can reduce chromatic aberration and simplify lens design. Having multiple optical chains per color also has the advantage of allowing for different exposure times for different optical chains corresponding to a different color. Thus, as will be discussed further below, a greater dynamic range in terms of light intensity can be covered by having different optical chains use different exposure times and then combining the result to form the composite image, e.g., by weighting the pixel values output by the sensors of different optical chains as a function of exposure time when combing the sensed pixel values to generate a composite pixel value for use in a composite image. Given the small size of the optical sensors (pixels) the dynamic range, in terms of light sensitivity, is limited with the sensors becoming easily saturated under bright conditions. By using multiple optical chains corresponding to different exposure times the dark areas can be sensed by the sensor corresponding to the longer exposure time while the light areas of a scene can be sensed by the optical chain with the shorter exposure time without getting saturated. Pixel sensors of the optical chains that become saturated as indicated by a pixel value indicative of sensor saturation can be ignored, and the pixel value from the other, e.g., less exposed, optical chain can be used without contribution from the saturated pixel sensor of the other optical chain. Weighting and combining of non-saturated pixel values as a function of exposure time is used in some embodiments. By combining the output of sensors with different exposure times a greater dynamic range can be covered than would be possible using a single sensor and exposure time.

FIG. 1C is a cross section perspective of the camera device 100 shown in FIGS. 1A and 1B. Dashed line 101 in FIG. 1B shows the location within the camera device to which the cross section of FIG. 1C corresponds. From the side cross section, the components of the first, seventh and fourth optical chains are visible.

As illustrated in FIG. 1C despite including multiple optical chains the camera device 100 can be implemented as a relatively thin device, e.g., a device less than 2, 3 or 4 centimeters in thickness in at least some embodiments. Thicker devices are also possible, for example devices with telephoto lenses and are within the scope of the invention, but the thinner versions are particularly well suited for cell phones and/or tablet implementations.

As illustrated in the FIG. 10 diagram, the display device 102 may be placed behind the plurality of optical chain modules 130 with the processor 110, memory and other components being positioned, at least in some embodiments, above or below the display and/or optical chain modules 130. As will be discussed below, and as shown in FIG. 10, each of the optical chains OCM 1, OCM 7, OCM 4 may, and in some embodiments do, include an outer lens L1, an optional filter F, and a second optional lens L2 which proceed a sensor S which captures and measures the intensity of light which passes through the lens L1, filter F and second lens L2 to reach the sensor S. The filter may be a color filter or one of a variety of other types of light filters.

Figure 10:
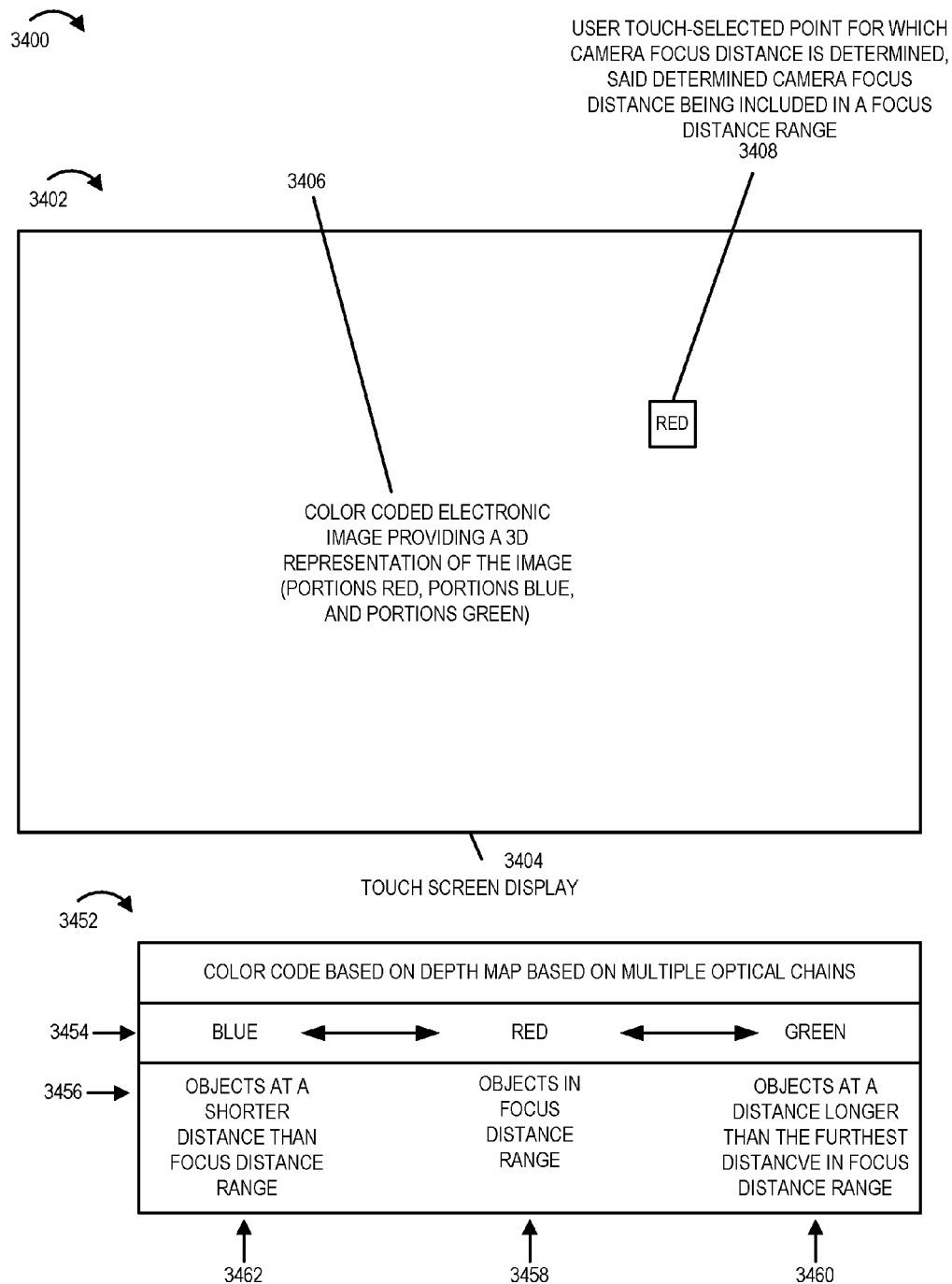
FIG. 10 illustrates an exemplary touch screen display indicating an exemplary user selected point for which camera focus distance is determined and an exemplary corresponding table indicating a mapping between a color code scheme and camera focus distance information in accordance with an exemplary embodiment.

In FIG. 10, each optical chain module includes an auto focus drive (AFD) also sometimes referred to as an auto focus device which can alter the position of the second lens L2, e.g., move it forward or back, as part of a focus operation. An exposure control device (ECD) which controls the light exposure time of the sensor to which the ECD corresponds, is also included in each of the OCMs shown in the FIG. 1C embodiment. The AFD of each optical chain module operates under the control of the autofocus controller 132 which is responsive to user input which identifies the focus distance, e.g., by the user highlighting an object in a preview image to which the focus is to be set. The autofocus controller while shown as a separate element of the device 100 can be implemented as a module stored in memory and executed by processor 110.

Note that while supporting a relatively large light capture area and offering a large amount of flexibility in terms of color filtering and exposure time, the camera device 100 shown in FIG. 10 is relatively thin with a thickness that is much less, e.g., $\frac{1}{5}$th, $\frac{1}{10}$th, $\frac{1}{20}$th or even less than the overall side to side length or even top to bottom length of the camera device visible in FIG. 1B.

Figure 2:
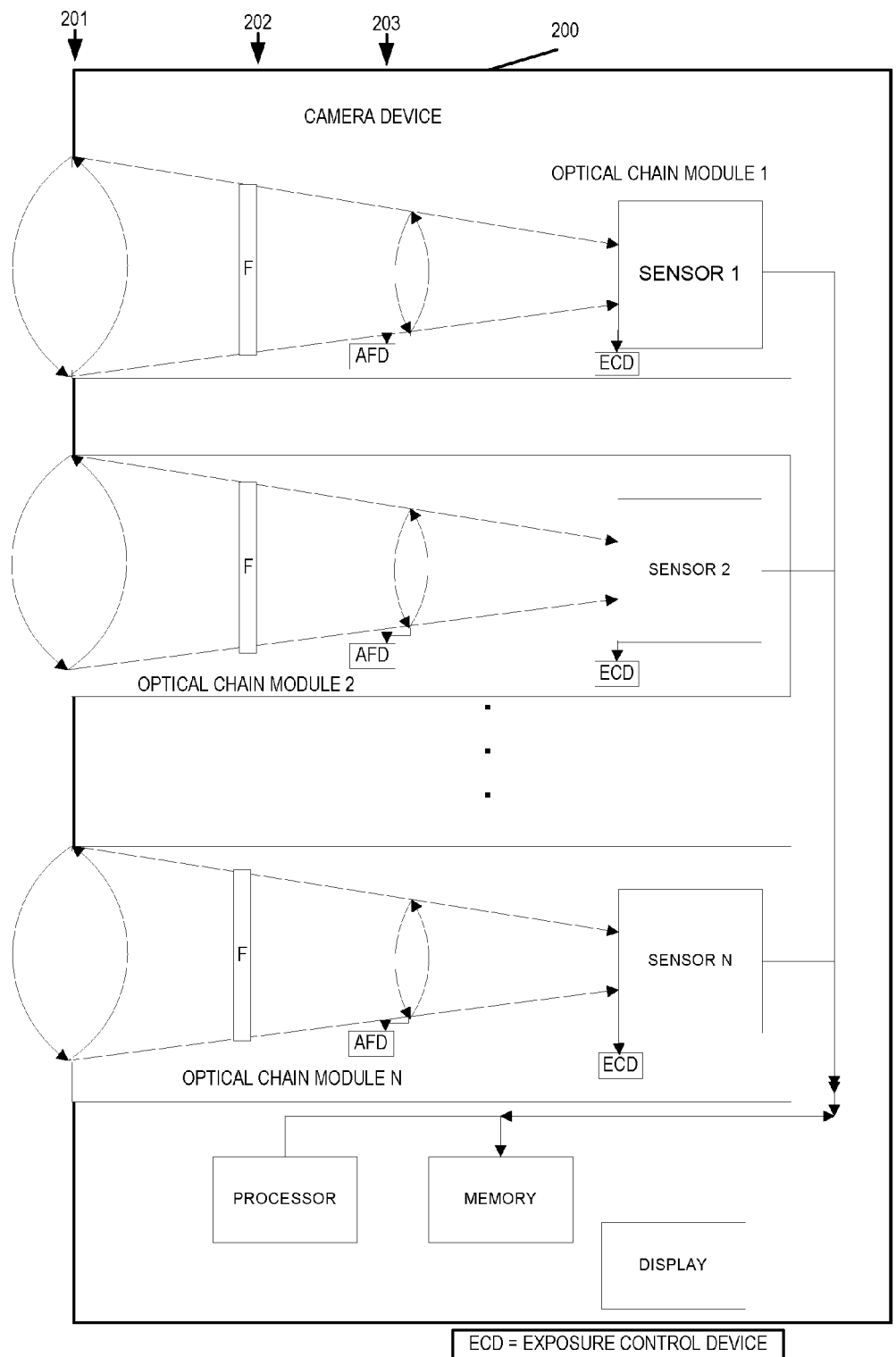
FIG. 2 illustrates a camera device implemented in accordance with one embodiment of the present invention.

FIG. 2 illustrates a camera device 200 implemented in accordance with the invention. The FIG. 2 device includes many or all of the same elements shown in the device 100 of FIGS. 1A-1C. In the FIG. 2 embodiment the optical chain modules are shown as independent assemblies with the autofocus drive of each module being a separate AFD element.

In FIG. 2, the structural relationship between the various lenses and filters which precede the sensor in each optical chain module can be seen more clearly. While three elements, e.g. two lenses (see columns 201 and 203 corresponding to L1 and L2, respectively) and the filter (corresponding to column 202) are shown in FIG. 2 before each sensor, it should be appreciated that a much larger combination of lenses and/or filters may precede the sensor of one or more optical chain modules with anywhere from 2-10 elements being common and an even larger number of elements being used in some embodiments, e.g., high end embodiments and/or embodiments supporting a large number of filter and/or lens options.

In some but not all embodiments, optical chain modules are mounted in the camera device to extend from the front of the camera device towards the back, e.g., with multiple optical chain modules being arranged in parallel. Filters and/or lenses corresponding to different optical chain modules may, and in some embodiments are, arranged in planes extending perpendicular to the front to back direction of the camera device from the bottom of the camera device towards the top of the camera device. While such a mounting arrangement is used in some embodiments, other arrangements where the optical chain modules are arranged at different angles to one another and/or the camera body are possible.

Note that the lenses/filters are arranged in planes or columns in the vertical dimension of the camera device to which reference numbers 201, 202, 203 correspond. The fact that the lenses/filters are aligned along vertical planes allows for a manufacturing and structural simplification that is used in some embodiments. That is, in some embodiments, the lenses and/or filters corresponding to a plane 201, 202, 203 are formed or mounted on a platter or plate. The term platter will be used for discussion purposes but is not intended to be limiting. The platter may take the form of a disc but non-round platters are also contemplated and are well suited for some embodiments. In the case of plastic lenses, the lenses and platter may be molded out of the same material in a single molding operation greatly reducing costs as compared to the need to manufacture and mount separate lenses. As will be discussed further, platter based embodiments allow for relatively simple synchronized focus operations in that a platter may be moved front or back to focus multiple OCMs at the same time. In addition, as will be explained, platters may be moved or rotated, e.g., along a central or non-central axis, to change lenses and or filters corresponding to multiple optical chain modules in a single operation. A single platter may include a combination of lenses and/or filters allowing, e.g., a lens to be replaced with a filter, a filter to be replaced with a lens, a filter or lens to be replaced with an unobstructed opening. As should be appreciated the platter based approach to lens, filter and/or holes allows for a wide range of possible combinations and changes to be made by simple movement of one or more platters. It should also be appreciated that multiple elements may be combined and mounted together on a platter. For example, multiple lenses, filters and/or lens-filter combinations can be assembled and mounted to a platter, e.g., one assembly per optical chain module. The assemblies mounted on the platter for different optical chains may be moved together, e.g., by rotating the platter, moving the platter horizontally or vertically or by moving the platter using some combination of one or more such movements.

While platters have been described as being moved to change elements in an optical chain, they can, and in some embodiments are, moved for image stabilization purposes.

For example, a platter having one or more lenses mounted thereon can be moved as part of an image stabilization operation, e.g., to compensate for camera motion.

While mounting of lenses and filters on platters has been discussed, it should also be appreciated that the sensors of multiple optical chains can be mounted on a platter. For example, sensors without color filters may be replaced with sensors with color filters, e.g., Bayer pattern filters. In such an embodiment sensors can be swapped or changed while leaving one or more components of one or more optical chains in place.

Note from a review of FIG. 2 that in some embodiments, e.g., larger focal length telephoto applications, the elements, e.g., filters/lenses closer to the sensor of the optical chain module, are smaller in size than the outer most lenses shown in column 201. As a result of the shrinking size of the lenses/filters, space becomes available between the lenses/filters within the corresponding platter.

Figure 3A:
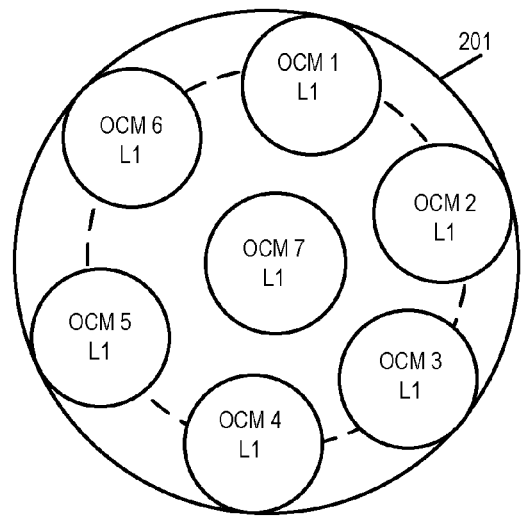
FIG. 3A shows an exemplary lens configuration which may be used for the set of outer lenses of the camera device shown in FIGS. 1A-1C.
Figure 3B:
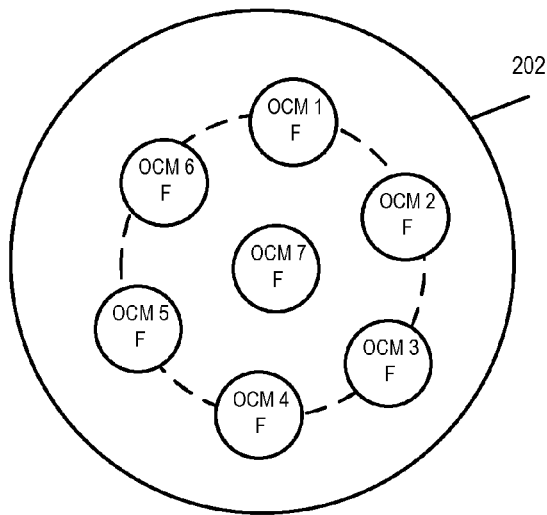
FIG. 3B illustrates an exemplary filter arrangement which is used in the camera of FIGS. 1A-1C in some embodiments.
Figure 3C:
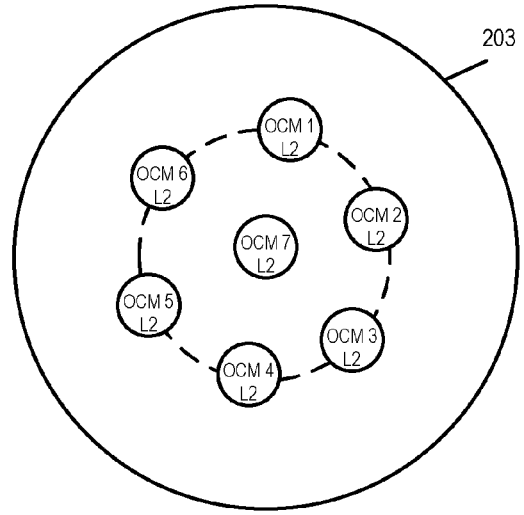
FIG. 3C shows an exemplary inner lens configuration which may, and in some embodiments is, used for a set of inner lenses of the camera device shown in FIGS. 1A-1C.

FIGS. 3A through 3C provide perspective views of the different planes 201, 202, 203 shown in FIG. 2. As shown in FIG. 3A, the outer lenses L1 occupy much of the outer circular area corresponding to the front of the camera modules as previously shown in FIG. 1B. However, as shown in FIG. 3B the filters corresponding to plane 202 occupy less space than the lenses shown in FIG. 3A while the inner lenses L2 shown in FIG. 3C occupy even less space.

The decreasing size of the inner components allow multiple lenses and/or filters to be incorporated into a platter corresponding to one or more of the inner planes. Consider for example that an alternative filter F' or hole could be mounted/drilled below or next two each filter F of a platter corresponding to plan 202 and that by shifting the position or platter vertically, horizontally or a combination of horizontally and vertically, the filter F can be easily and simply replaced with another filter or hole. Similarly the lenses L2 may be replaced by alternative lenses L2' by shifting a platter of lenses corresponding to plane 203. In some embodiments, the platter may also be rotated to support changes. The rotation may be an off center rotation and/or may be performed in combination with one or more other platter position changes.

Figure 4:
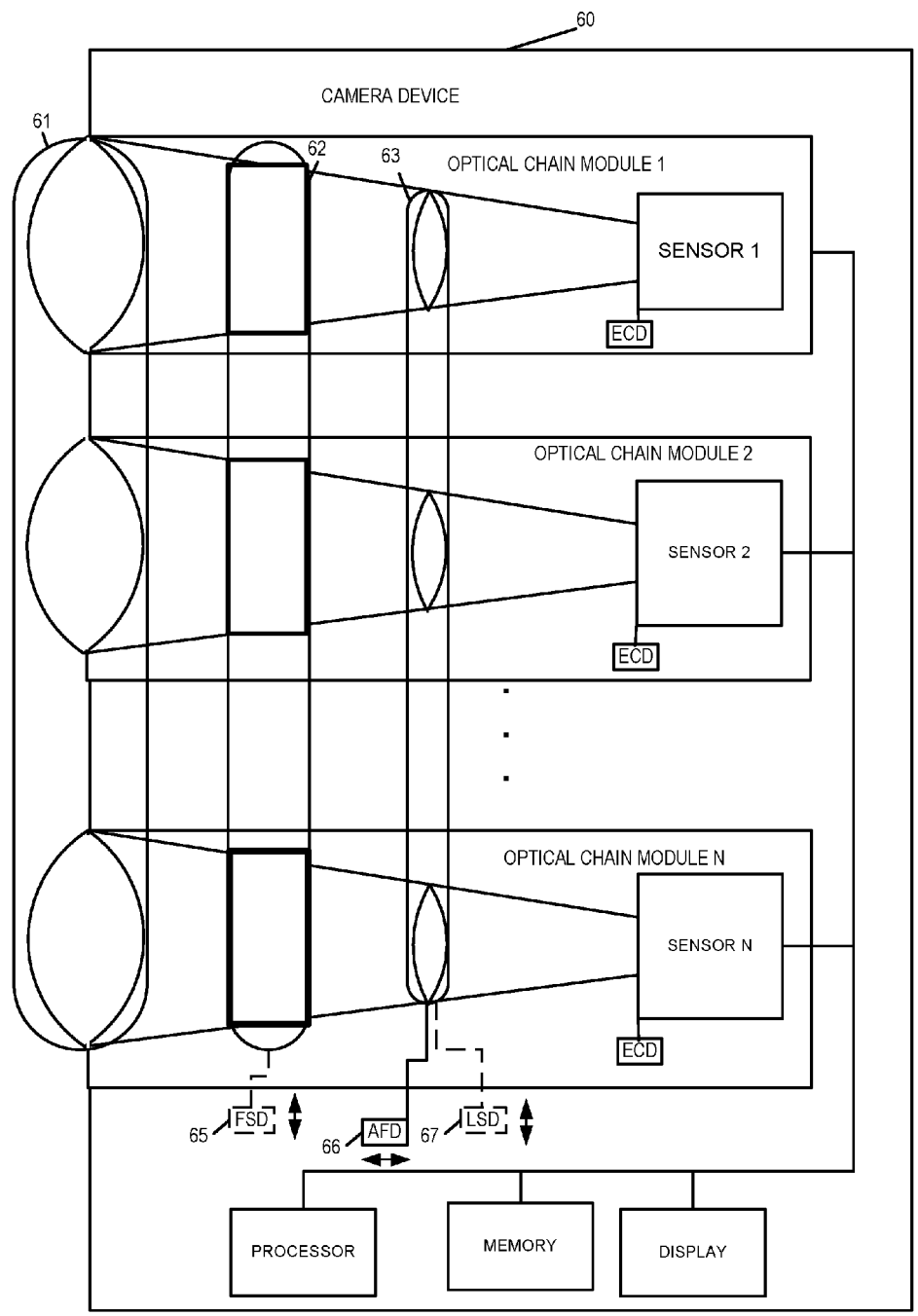
FIG. 4 illustrates an exemplary camera device in which the sets of outer lenses, filters, and inner lenses are mounted on corresponding platters.
Figure 5:
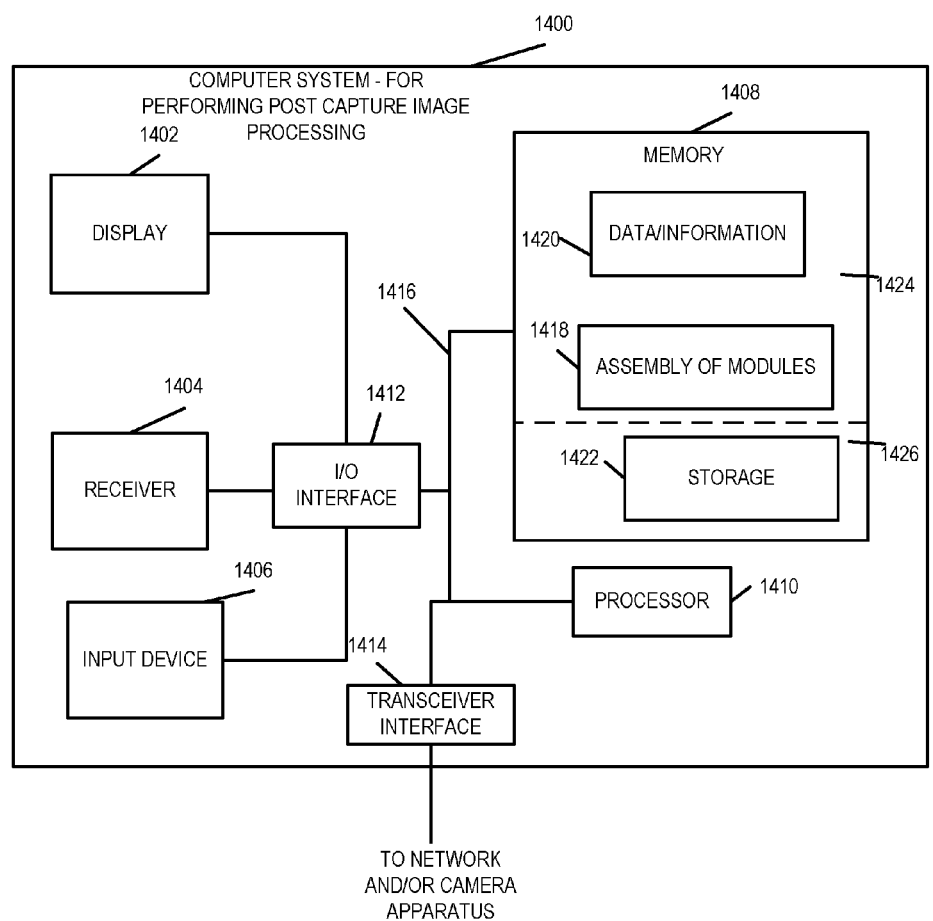
FIG. 5 illustrates a computer system which can be used for post processing of images captured using a camera device.
Figure 6A:
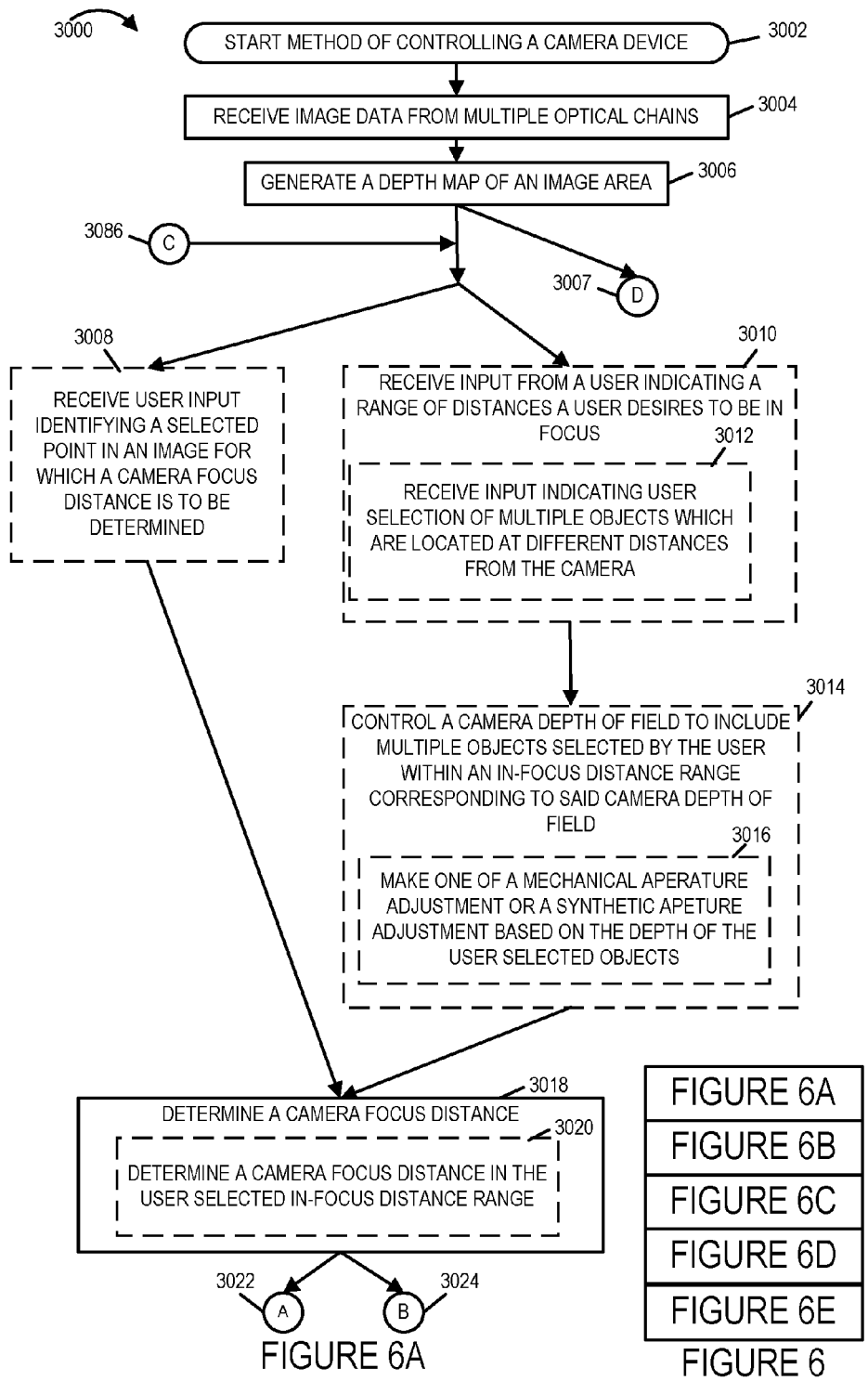
FIG. 6A is a first portion of a flowchart of an exemplary method of controlling a camera device in accordance with an exemplary embodiment.
Figure 6B:
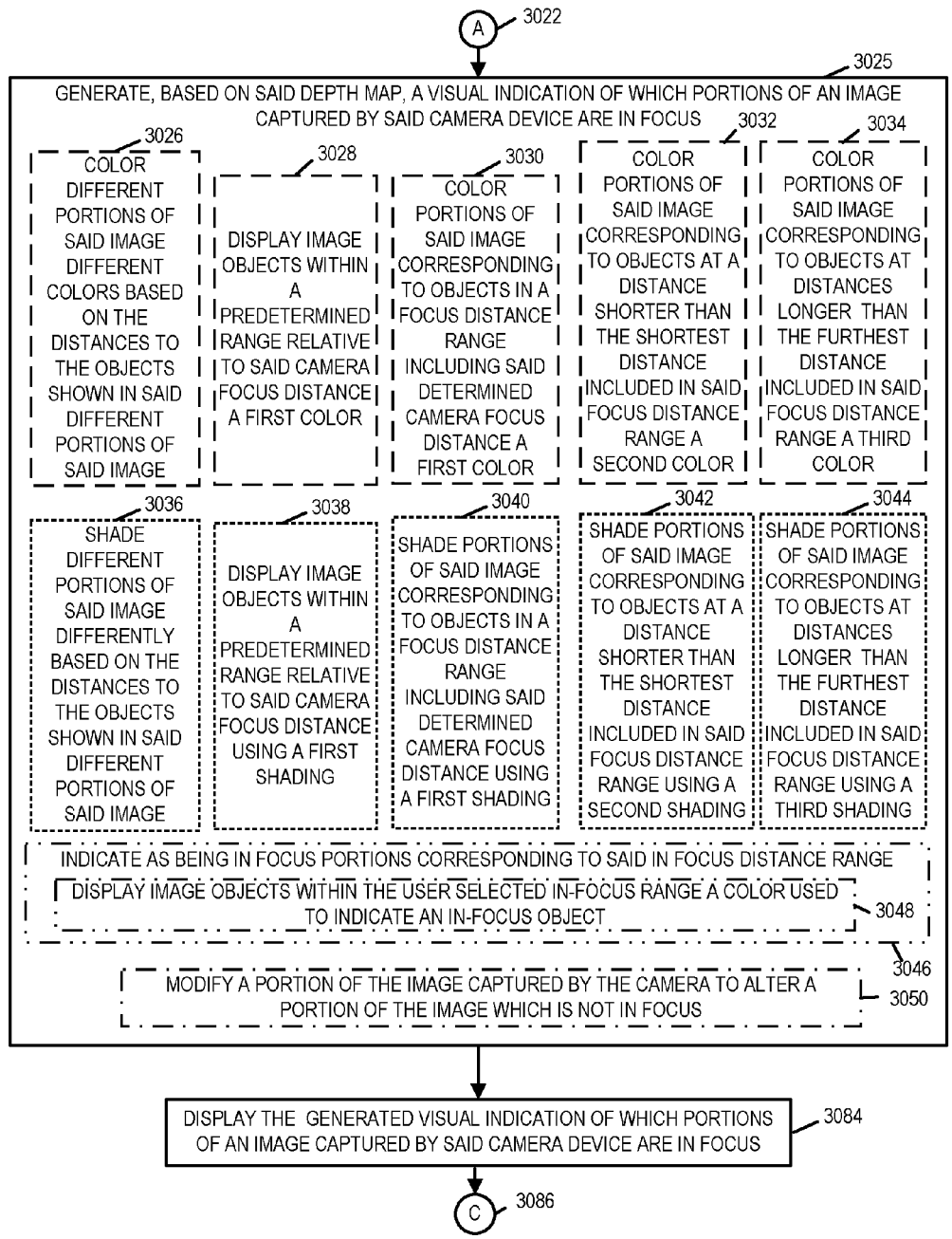
FIG. 6B is a second portion of a flowchart of an exemplary method of controlling a camera device in accordance with an exemplary embodiment.
Figure 6C:
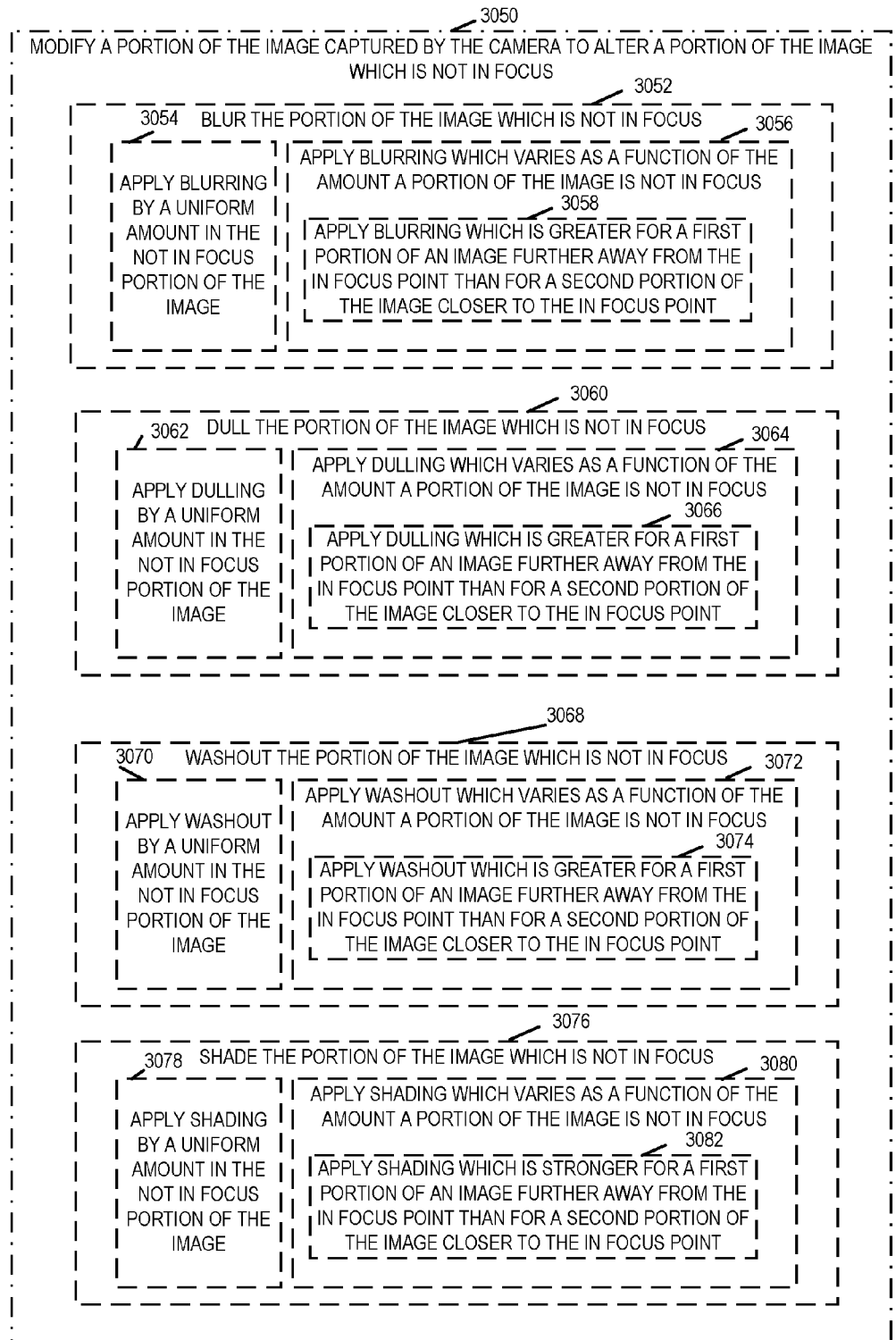
FIG. 6C is a third portion of a flowchart of an exemplary method of controlling a camera device in accordance with an exemplary embodiment.
Figure 6D:
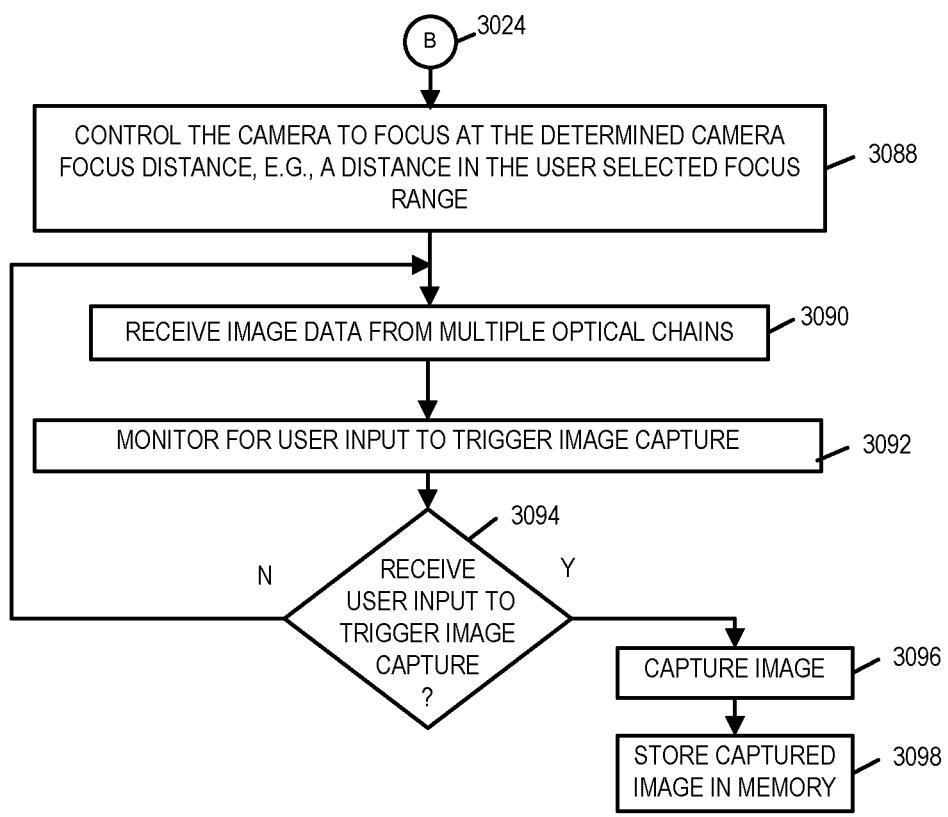
FIG. 6D is a fourth portion of a flowchart of an exemplary method of controlling a camera device in accordance with an exemplary embodiment.
Figure 6E:
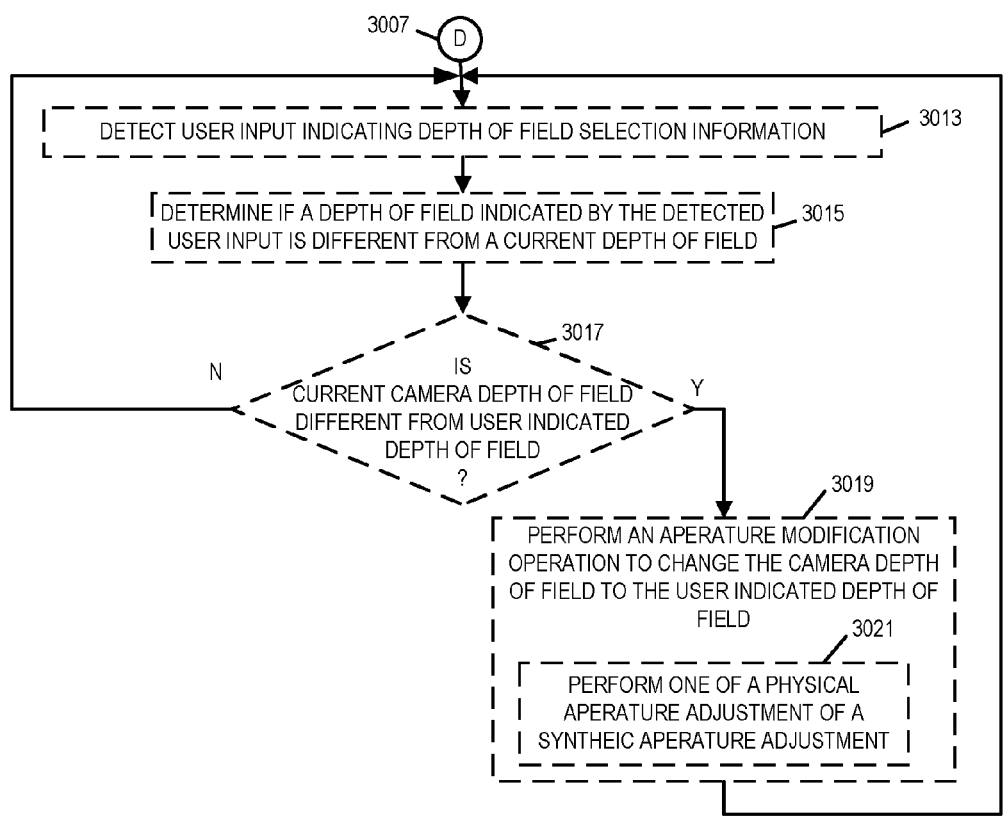
FIG. 6E is a fifth portion of a flowchart of an exemplary method of controlling a camera device in accordance with an exemplary embodiment.

A camera device 60 which includes platters of lenses and/or filters is shown in FIG. 4. Element 61 represents a platter of outer lenses L1 with 3 of the lenses being shown as in the FIG. 10 example. Additional lenses may be, and often are, included on the platter 61 in addition to the ones shown. For example, in a seven optical chain module embodiment such as shown in FIG. 1, platter 61 would include seven outer lenses. Note that the thickness of the platter 61 need not exceed the maximum thicknesses of the lenses and from a side perspective is much thinner than if a single lens having a similar curvature to that of the individual lenses L1, but with the single lens being larger, occupied the same area as all the 7 lenses on the platter 61. Platter 62 includes the filters F while platter 63 includes the inner lenses L2. As can be appreciated the camera device 60 is the same as or similar to the camera device of FIG. 10 and FIG. 2 but with the lenses and filters being mounted on platters which may be moved between the front and back of the camera to support autofocus or horizontally and/or vertically to support lens/filter changes.

Auto focus drive 66 is used to move platter 63 forward or backward as part of a focus operation, e.g., under control of the autofocus controller 132 which may be, and often is, included in the camera device 60. A filter shift drive (FSD) 65 is included in embodiments where shifting of the platter 62 is supported as part of a filter change operation. The FSD 65 is responsive to the processor 110 which operates in response to user selection of a particular mode of operation and/or an automatically selected mode of operation and can move the platter 62 vertically, horizontally or in some combination of vertical and horizontal motion to implement a filter change operation. The FSD may be implemented with a motor and mechanical linkage to the platter 62. In some embodiments, the platter 62 may also be rotated to support changes. The rotation may be an off center rotation and/or may be performed in combination with one or more other platter position changes.

A lens shift drive (LSD) 67 is included in embodiments where shifting of the platter 63 is supported as part of a filter change operation. The LSD 67 is responsive to the processor 110 which operates in response to user selection of a particular mode of operation and/or an automatically selected mode of operation and can move the platter 63 vertically, horizontally or in some combination of vertical and horizontal motion to implement a lens change operation. The LSD 67 may be implemented with a motor and mechanical linkage to the platter 63. In some embodiments, the platter 63 may also be rotated to support changes. The rotation may be an off center rotation and/or may be performed in combination with one or more other platter position changes.

Figure 14:
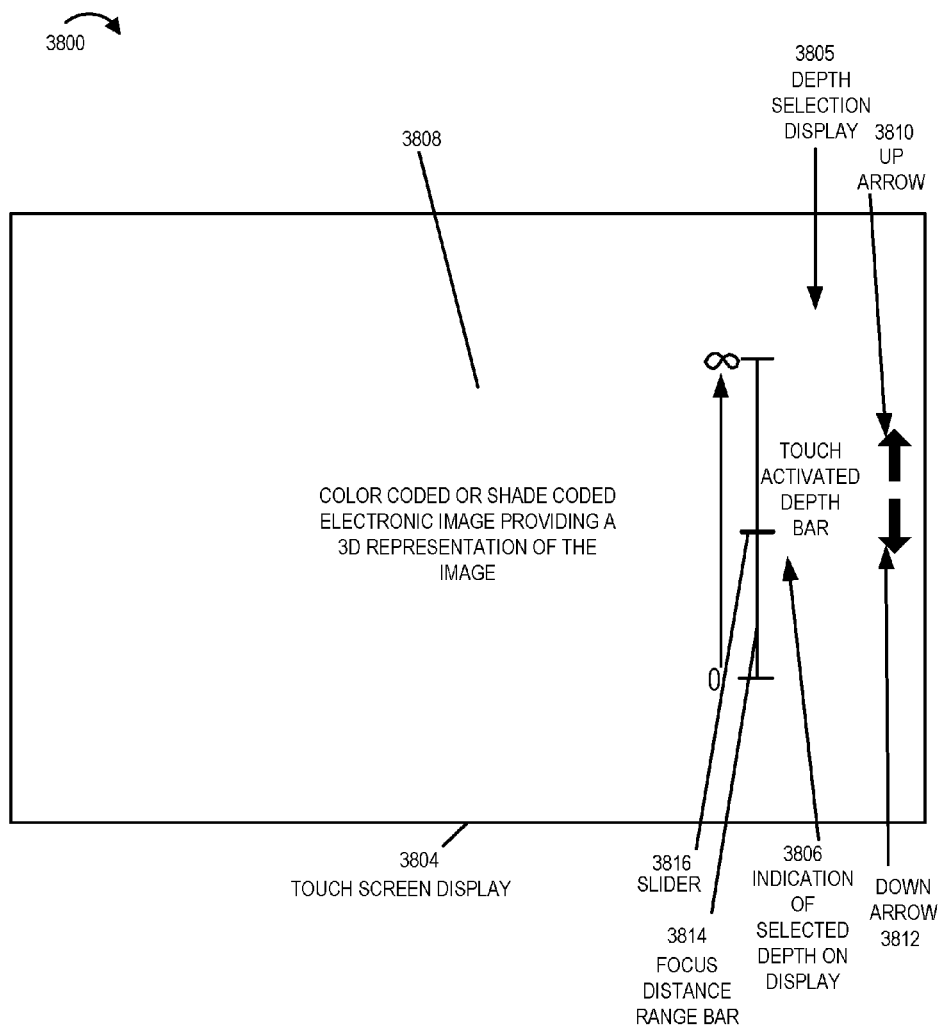
FIG. 14 is a drawing including an exemplary touch screen display including a depth selection display, in accordance with an exemplary embodiment.

FIG. 14 illustrates a computer system which can be used for post processing of images captured using a camera device. The computer system 1400 includes a display 1402, Input/Output (I/O) interface 1412, receiver 1404, input device 1406, transceiver interface 1414, processor 1410 and memory 1408. The memory is coupled to the processor 1410, I/O interface 1412 and transceiver interface 1414 via bus 1416 through which the elements of the computer system 1400 can exchange data and can communicate with other devices via the I/O interface 1412 and/or interface 1414 which can couple the system 1400 to a network and/or camera apparatus. It should be appreciated that via interface 1414 image data can be loaded on to the computer system 1400 and subject to processing, e.g., post capture processing. The images may be stored in the data/information portion 1420 of memory 1408 for processing. The assembly of modules 1418 includes one or more modules or routines which, when executed by the processor 1410, control the computer system to implement one or more of the image processing operations described in the present application. The output of multiple optical receiver chains can be, and in some embodiments is, combined to generate one or more images. The resulting images are stored in the data portion of the memory 1408 prior to being output via the network interface 1414, though another interface, or displayed on the display 1402. Thus, via the display 1402 a user can view image data corresponding to one or more individual optical chain modules as well as the result, e.g., image, generated by combining the images captured by one or optical chain modules.

Figure 7:
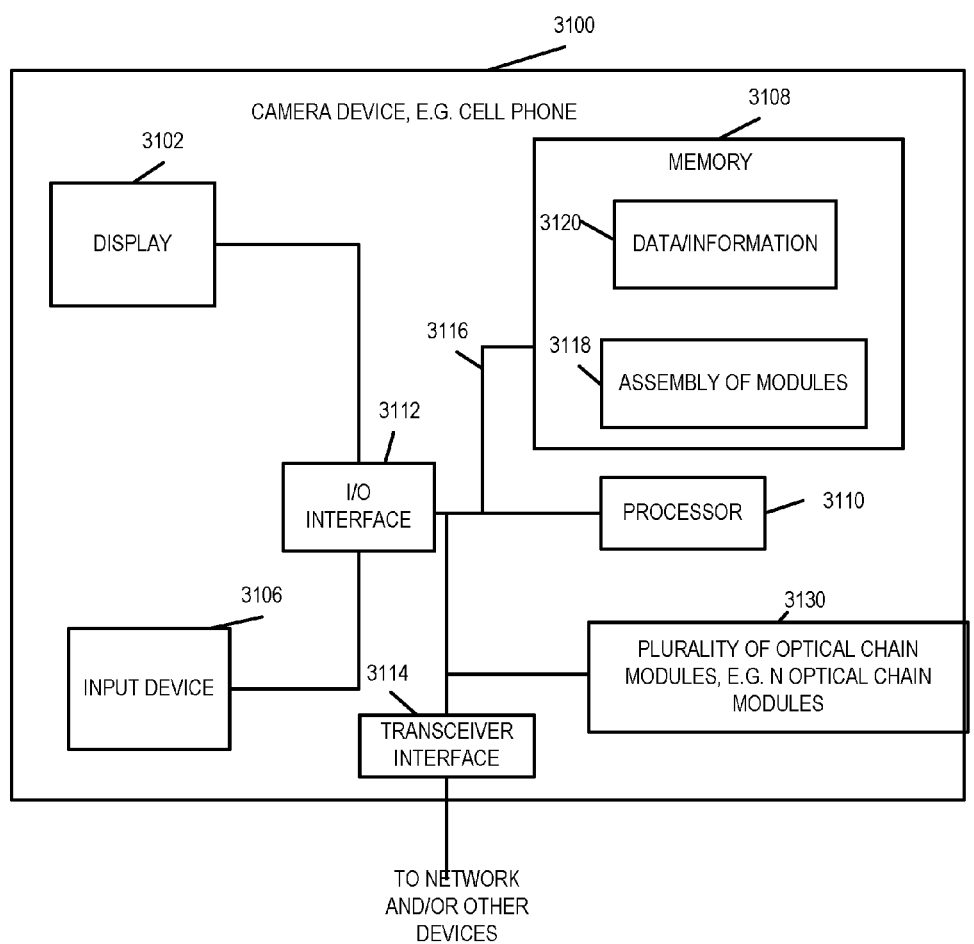
FIG. 7 is a drawing of an exemplary camera device in accordance with an exemplary embodiment.

FIG. 6, comprising the combination of FIG. 6A, FIG. 6B, FIG. 6C, FIG. 6D, and FIG. 6E is a flowchart 3000 of an exemplary method of controlling a camera device, e.g., camera device 3100 of FIG. 7, in accordance with an exemplary embodiment. Operation starts in step 3002, in which the camera device is powered on and initialized. Operation proceeds from step 3002 to step 3004. In step 3004 the camera device receives image data from multiple optical chains included within the camera device. Operation proceeds from step 3004 to step 3006.

In step 3006 the camera device generates a depth map of an image area based on the received image data from multiple optical chains. In some embodiments, operation proceeds from step 3006 to step 3008. In some other embodiments, operation proceeds from step 3006 to step 3010. In still other embodiments, operation proceeds from step 3006 to step 3018. In some embodiments, operation proceeds from step 3006, via connecting node D 3007 to step 3013.

In step 3008 the camera device receives user input identifying a selected point in an image from which a camera focus distance is to be determined. In some embodiments, the operator of the camera touches a touch-screen on the camera to identify the selected point in the image from which a camera focus distance is to be determined. Operation proceeds from step 3008 to step 3018.

In step 3010 the camera receives input from a user indicating a range of distances a user desires to be in focus. In some embodiments, step 3010 includes step 3012 in which the camera device receives input indicating user selection of multiple objects which are located at different distance from the camera. In some embodiments, the operator of the camera touches multiple points on a touch-screen on the camera to identify the selected points in the image from which a camera focus distance is to be determined. Operation proceeds from step 3010 to step 3014.

In step 3014 the camera device controls a camera depth of field to include multiple objects selected by the user within an in-focus distance range corresponding to said camera depth of field. In some embodiments, step 3014 includes step 3016 in which the camera device makes one of a mechanical aperture adjustment or a synthetic aperture adjustment based on the depth of the user selected objects. Operation proceeds from step 3014 to step 3018.

In step 3018 the camera device determines a camera focus distance. In some embodiments, in which step 3008 is included, the camera device determines the camera focus distance based on the received user input from step 3008. In some embodiments, in which step 3010 is included, the camera device determines the camera focus distance based on the received user input from step 3010. In some embodiments, step 3018 includes step 3020, in which the camera device determines a camera focus distance in the user selected in-focus distance range. In some embodiments, in which step 3008 and step 3010 are omitted, the camera determines a camera focus distance based on a predetermined point in the image. In some such embodiments, the predetermined point in the image is the point corresponding to the center of a rectangle corresponding to the image. Operation proceeds from step 3018 to step 3025 and, via connecting node A 3022, and to step 3088, via connecting node B 3024.

In step 3025, the camera device generates, based on said depth map, a visual indication of which portions of an image captured by said camera device are in focus. In some embodiments, step 3025 includes one or more or all of steps 3026, 3028, 3030, 3032 and 3034. In some other embodiments, step 3025 includes one or more or all of steps 3036, 3038, 3040, 3042 and 3044. In some other embodiments, step 3025 includes step 3046. In some other embodiments, step 3025 includes step 3050.

In step 3026 the camera device colors different portions of said image different colors based on the distances to the objects shown in said different portions of said image. In various embodiments, different colors are used to indicate different object distances and the different colors include a first color. In step 3028 the camera device displays objects within a predetermined range relative to said camera focus distance a first color. In some embodiments, the predetermined range is an in-focus distance range. In step 3030 the camera device colors portions of said image corresponding to objects in a focus distance range including said determined camera focus distance a first color. In step 3032 the camera device colors portions of said image corresponding to objects at a distance shorter than the shortest distance including in said focus distance range a second color. In step 3034 the camera device colors portions of said image corresponding to objects at a distance longer than the furthest distance including in said focus distance range a third color.

In some embodiments, the first color is red. In some such embodiments, the second color is blue, and the third color is green.

In some embodiments, the shade of the first color indicates how close to the determined focus distance an object in the image is to the determined focus distance.

In some embodiments, the first color is red and objects in said image which are at the determined focus distance are shaded bright red. In some such embodiments, the shade of the second color indicates how close an object shaded in the second color is to the camera in a foreground area of the image and shade of the third color indicates how close the object shaded in the third color is to the camera in a background area of the image.

In various embodiments, different shadings are used to indicate different object distances, and the different shadings include a first shading. In step 3036 the camera device shades different portions of said image differently based on the distances to the objects shown in said different portions of said image. In step 3038 the camera device displays objects within a predetermined range relative to said camera focus distance using a first shading. In some embodiments, the predetermined range is an in-focus distance range. In step 3040 the camera device shades portions of said image corresponding to objects in a focus distance range including said determined camera focus distance using a first shading, e.g., using a crosshatch pattern shading. In step 3042 the camera device shades portions of said image corresponding to objects at a distance shorter than the shortest distance including in said focus distance using a second shading, e.g., a positive slope line shading. In step 3044 the camera device shades portions of said image corresponding to objects at a distance longer than the furthest distance including in said focus distance range using a third shading, e.g., a negative slope line shading.

In some embodiments, the first shading is crosshatch shading. In some embodiments, the line spacing of the first shading indicates how close an object in the image is to the determined focus distance. In some embodiments, an object at the determined focus distance is shaded using a very fine crosshatch shading.

In some such embodiments, the second shading is positive slope line shading, e.g., left to right ascending line shading; and the third shading is negative slope line shading, left to right descending line shading. In some embodiments, the spacing between the ascending lines in the ascending line shading indicates how close an object shaded using the second shading is to the camera in a foreground area of the image; and the spacing between the descending line shading indicates how close the object shaded using the third shading is to the camera in a background area of the image.

In step 3046, the camera device indicates, as being in focus portions corresponding to said in focus distance range. In some embodiments, step 3046 includes step 3048 in which the camera device displays objects within the user selected in-focus range in a color used to indicate an in-focus object. In some such embodiments, objects which are displayed using said color to indicate an in-focus object vary in at least one of intensity or shade as a function of distance relative to the focus distance.

In step 3050, the camera device modifies a portion of the image captured by the camera to alter a portion of the image which is not in focus. In various embodiments, step 3050 includes one of steps 3052, 3060, 3068, and 3076.

In step 3052, the camera device blurs the portion of the image which is not in focus. In various embodiments, step 3052 includes step 3054 or step 3056. In step 3054, the camera device applies blurring by a uniform amount in the not in-focus portion of the image. In step 3056 the camera device applies blurring which varies as a function of the amount a portion of the image is not in focus. In some such embodiments, step 3056 includes step 3058 in which the camera device applies blurring which is greater for a first portion of an image further away from the in focus point than for a second portion of the image closer to the in focus point.

In step 3060, the camera device dulls the portion of the image which is not in focus. In various embodiments, step 3060 includes step 3062 or step 3064. In step 3062, the camera device applies dulling by a uniform amount in the not in-focus portion of the image. In step 3064 the camera device applies dulling which varies as a function of the amount a portion of the image is not in focus. In some such embodiments, step 3064 includes step 3066 in which the camera device applies dulling which is greater for a first portion of an image further away from the in focus point than for a second portion of the image closer to the in focus point.

In step 3068, the camera device washes out the portion of the image which is not in focus. In various embodiments, step 3068 includes step 3070 or step 3072. In step 3070, the camera device applies washout by a uniform amount in the not in-focus portion of the image. In step 3072 the camera device applies washout which varies as a function of the amount a portion of the image is not in focus. In some such embodiments, step 3072 includes step 3074 in which the camera device applies washout which is greater for a first portion of an image further away from the in focus point than for a second portion of the image closer to the in focus point.

In step 3076, the camera device shades the portion of the image which is not in focus. In various embodiments, step 3076 includes step 3078 or step 3080. In step 3078, the camera device applies shading by a uniform amount in the not in-focus portion of the image. In step 3080 the camera device applies shading which varies as a function of the amount a portion of the image is not in focus. In some such embodiments, step 3080 includes step 3082 in which the camera device applies shading which is stronger for a first portion of an image further away from the in focus point than for a second portion of the image closer to the in focus point.

In some embodiments, the shading is line shading. In some such embodiments, the lines of the line shading are more closely spaced for a first portion of an image farther away from the in focus point than for a second portion of the image closer to the in focus point.

Operation proceeds from step 3025 to step 3084 in which the camera device displays the generated visual indication of which portions of an image captured by the camera device are in focus. Operation proceeds from step 3084, via connecting node C 3086, to step 3008 or to step 3010. In step 3008. the camera device receives user input identifying a selected point in an image for which a camera focus distance is to be determined, e.g., a different selected point. In step 3010. the camera device receives user input indicating a range of distances a user desires to be in focus, e.g., user input indicating a different range of distances.

Returning to step 3088, in step 3008 the camera device controls the camera to focus at the determined camera focus distance, e.g., a distance in the user selected focus range. In some embodiments, controlling the camera to focus at the determined camera focus distance includes controlling one or more optical chains in the camera to focus at the determined camera focus distance. In some embodiments, in step 3088 the camera device controls the camera to focus at a distance in the user selected in-focus distance range. In some embodiments, the distance in the user selected in-focus distance range is in a first ⅓ portion of the in-focus distance range. In some embodiments, the distance in the user selected in-focus distance range is in a first ¼ portion of the in-focus distance range.

Operation proceeds from step 3088 to step 3090 in which the camera device receives image data from multiple optical chains. Operation proceeds from step 3090 to step 3092, in which the camera device monitors for user input to trigger image capture, e.g., detection of depression of a button. The camera device may, and sometimes does detect user input in step 3092. Operation proceeds from step 3092 to step 3094. In step 3094 the camera device determines whether or not user input has been received in the monitoring of step 3092 to trigger image capture. If user input has not been received, then operation proceeds from step 3094 to step 3090. However, if user input has been received, then operation proceeds from step 3094 to step 3096, in which the camera device captures the image. Operation proceeds from step 3096 to step 3098, in which the camera device stores the captured image in memory.

Returning to step 3013, in step 3013, the camera device detects user input indicating depth of field selection information. In some embodiments, the input indicating depth of field selection information includes user selection of multiple objects corresponding to different depths. Operation proceeds from step 3013 to step 3015. In step 3015, the camera device determines if a depth of field indicated by the detected user input is different from a current depth of field. Operation proceeds from step 3015 to step 3017. In step 3017, if the current camera depth of field is different from the user indicated depth of field, then operation proceeds from step 3017 to step 3019; otherwise operation proceeds from step 3017 to step 3013. In step 3019 the camera device performs an aperture modification operation to change the camera depth of field to the user indicated depth of field. In some embodiments, step 3019 includes step 3021 in which the camera device performs one of a physical aperture adjustment or a synthetic aperture adjustment. Operation proceeds from step 3019 to step 3013.

FIG. 7 is a drawing of an exemplary camera device 3100, e.g., a cell phone, in accordance with an exemplary embodiment. Camera device 3100 includes a display 3102, e.g., a display including a touch screen, an input device 3106, e.g., a keypad, switches, buttons, etc., which are coupled to I/O interface 3112. The camera device 3100 further includes a processor 3110, e.g., a CPU, memory 3108, a transceiver interface 3114, and a plurality of optical chain modules 3130, e.g., N optical chain modules. Any of the various multiple optical chain implementations described with respect to any of FIGS. 1-5 may be used to implement the plurality of optical chain modules 3130 of camera device 3100 of FIG. 7. The various elements, 3112, 3110, 3108, 3114 and 3130 are coupled together via a bus 3116 over which the various elements may interchange data and information.

Memory 3108 includes data/information 3120 and assembly of modules 3118. The transceiver interface couples the camera device 3100 to a network and/or other devices.

The processor 3110 controls operation of the camera device 3100 to control the elements of the camera device 3100 to implement the steps of one or more or all of the method described herein. The processor may be a dedicated processor that is preconfigured to implement the methods. However, in many embodiments the processor 31100 operates under direction of software modules and/or routines stored in the memory 3108 which include instructions that, when executed, cause the processor to control the camera device 3100 to implement one, more or all of the methods described herein. Memory 3108 includes an assembly of modules 3118 wherein one or more modules include one or more software routines, e.g., machine executable instructions, for implementing methods of the present invention. Individual steps and/or lines of code in the modules of 3118 when executed by the processor 3110 control the processor 3110 to perform steps of the method of the invention. The memory 3108 includes different types of memory for example, Random Access Memory (RAM) in which the assembly of modules 3118 and data/information 3120 may be, and in some embodiments are stored for future use. Read only Memory (ROM) in which the assembly of modules 3118 may be stored for power failures. Non-volatile memory such as flash memory for storage of data, information and instructions may also be used to implement memory 3108. Memory cards may be added to the device to provide additional memory for storing data (e.g., images and video) and/or instructions such as programming. Accordingly, memory 3108 may be implemented using any of a wide variety of non-transitory computer or machine readable mediums which serve as storage devices.

In one embodiment the assembly of modules 3200 shown in FIG. 8 is part of or used in place of the assembly of modules 3118. The modules in the assembly 3200, when executed by the processor 3110 control the camera device 3100 in one embodiment to implement the method described with regard to FIG. 6. While the modules of FIG. 8 may, and in some embodiments are implemented using software, in other embodiments they are implemented in hardware, e.g., as circuits, which may and in some embodiments are included in the camera device 3100.

Figure 8A:
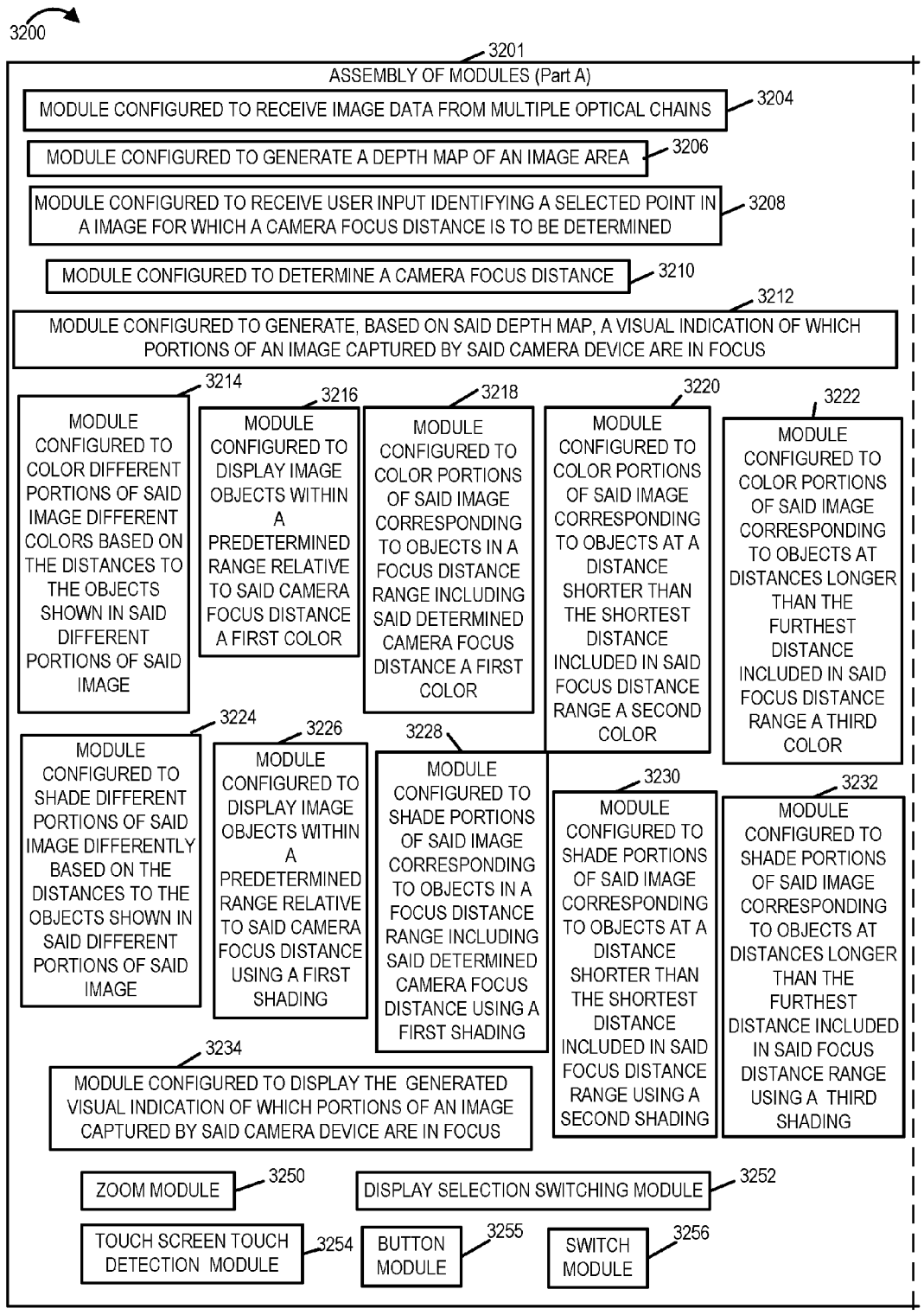
FIG. 8A is a drawing of a first part of assembly of modules which may be included in an exemplary camera device in accordance with an exemplary embodiment.
Figure 8B:
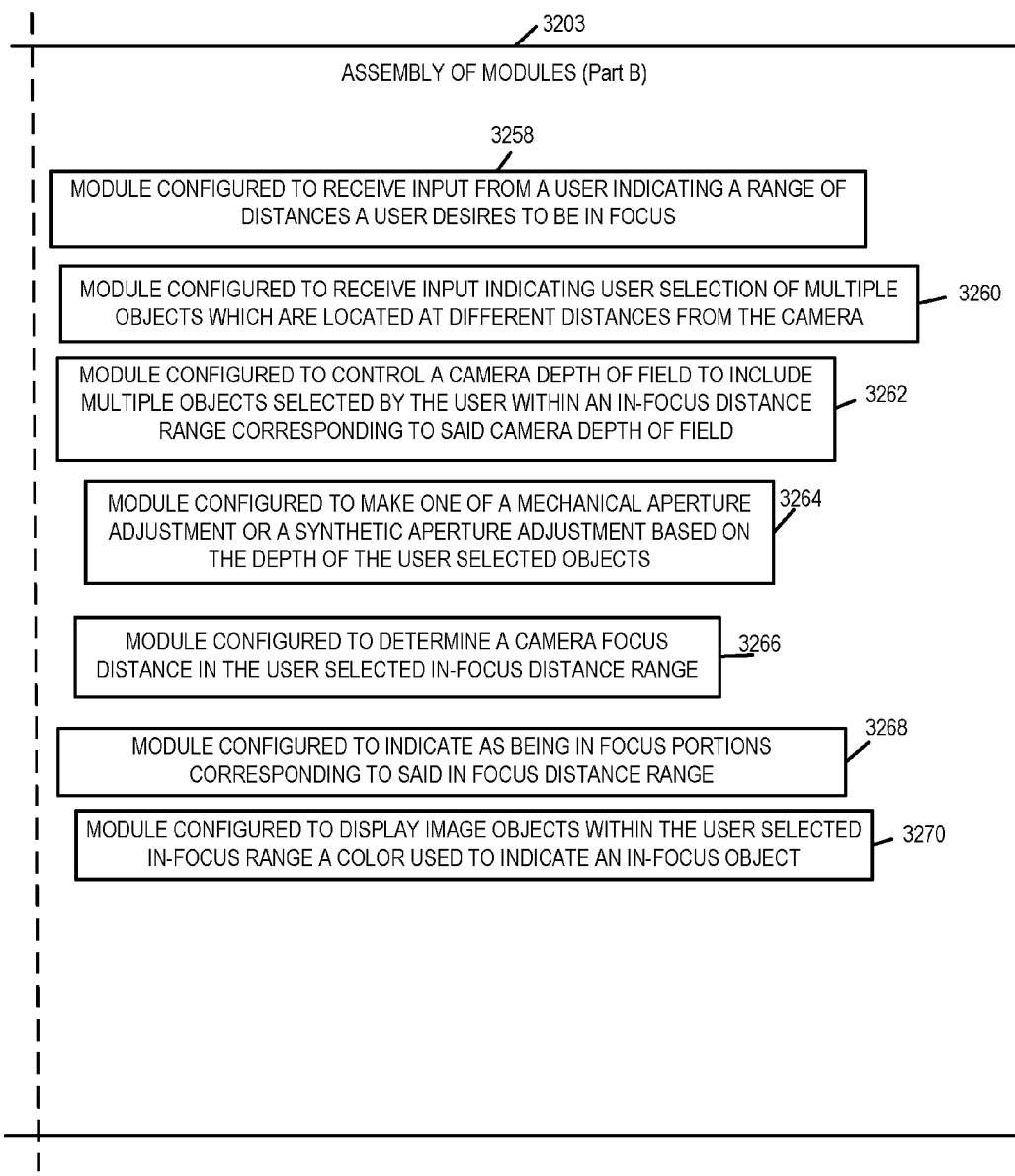
FIG. 8B is a drawing of a second part of assembly of modules which may be included in an exemplary camera device in accordance with an exemplary embodiment.
Figure 8C:
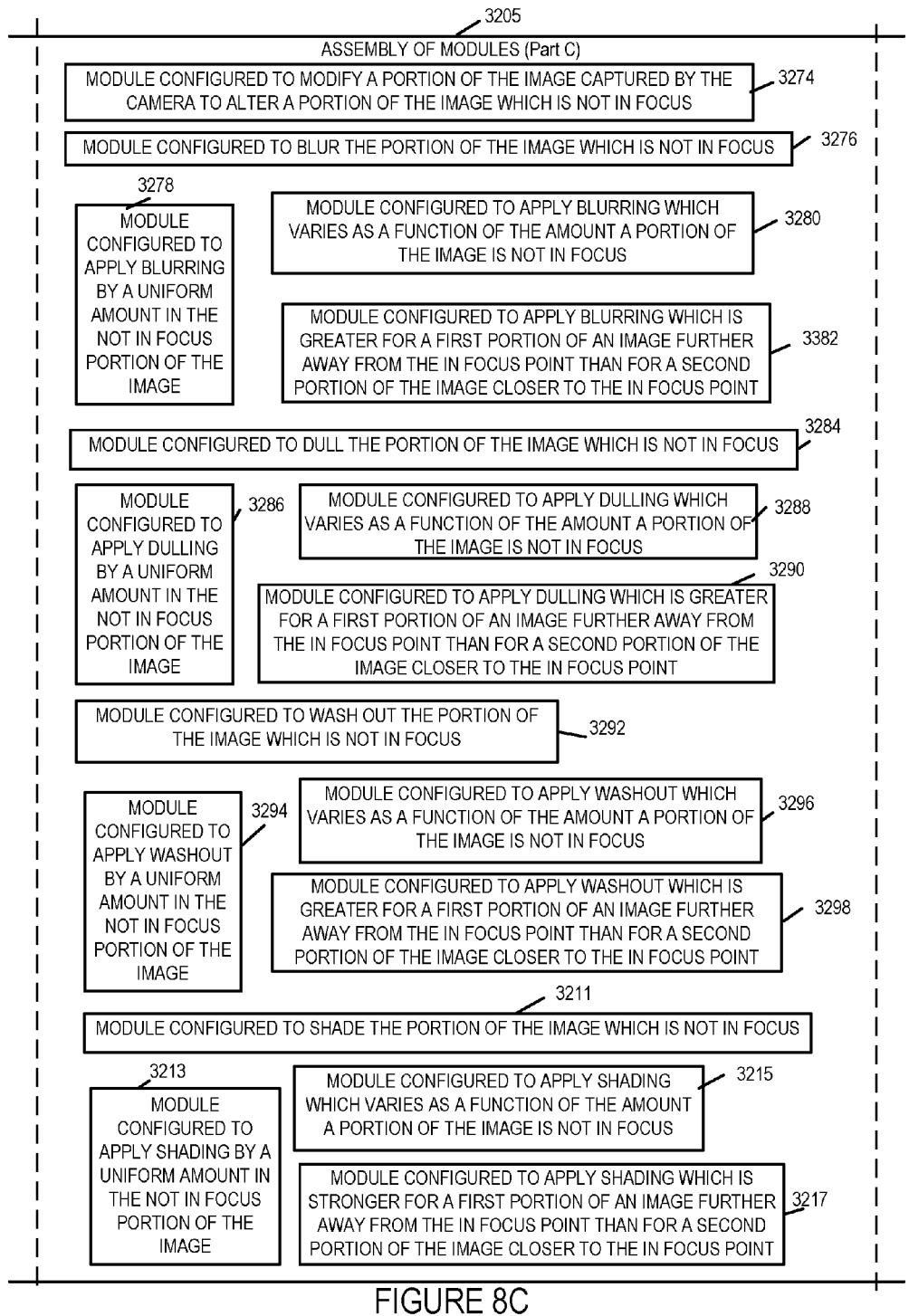
FIG. 8C is a drawing of a third part of assembly of modules which may be included in an exemplary camera device in accordance with an exemplary embodiment.

FIG. 8, comprising the combination of FIG. 8A, FIG. 8B, FIG. 8C and FIG. 8D, is a drawing of an assembly of modules 3200, comprising the combination of part A 3201, part B 3203, part C 3205 and part D 3207, which may be included in an exemplary camera device, e.g., camera device 3100 of FIG. 7, in accordance with an exemplary embodiment. Assembly of modules 3200 includes a module 3204 configured to receive image data from multiple optical chains, a module 3206 configured to generate a depth map of an image area, a module 3208 configured to receive user input identifying a selected point in an image for which a camera focus distance is to be determined, a module 3210 configured to determine a camera focus distance, and a module 3212 configured to generate, based on said determined depth map, a visual indication of which portions of an image captured by said camera device are in focus. Assembly of modules 3200 further includes a module 3214 configured to color different portion of said image different colors based on the distances to the objects shown in said different portions of said image, a module 3216 configured to display image objects within a predetermined range relative to said camera focus distance a first color, a module 3218 configured to color portions of said image corresponding to objects in a focus distance range including said determined camera focus distance a first color, a module 3220 configured to color portions of said image corresponding to objects at a distance shorter than the shortest distance included in said focus distance including in said focus distance range a second color, and a module 3222 configured to color portions of said image corresponding to objects at distances longer than the furthest distance included in said focus distance range a third color. Assembly of modules 3200 includes a module 3224 configured to shade different portions of said image differently based on the distances to the objects shown in said different portions of said image, a module 3226 configured to display image objects within a predetermined range relative to said camera focus distance using a first shading, a module 3228 configured to shade portions of said image corresponding to objects in a focus distance range including said determined camera focus distance using a first shading, a module 3230 configured to shade portions of said image corresponding to objects at a distance shorter than the shortest distance including in said focus distance range using a second shading, and a module 3232 configured to shade portions of said image corresponding to objects at distances longer than the furthest distance included in said focus distance range using a third shading. Assembly of modules 3200 further includes a module 3234 configured to display the generated visual indication of which portions of an image captured by said camera device are in focus, a zoom module 3250, a display selection switching module 3252, a touch screen touch detection module 3254, a button module 3255, and a switch module 3256. Display selection switching module 3252 switches the display on the camera device to display between an image focused at a determined camera focus distance and a visual representation of the image indicating which portions of the image are in focus, e.g., a generated color coded image based on a depth map or a generated shade coded image based on a depth map. Touch screen touch detection module 3254 detects a user touch on a screen identifying a selected point in an image for which a camera focus distance is to be determined. Button module 3255 receives and processes user input from buttons on the camera device. Switch module 3256 receives and processes user input from switches on the camera. In some embodiments, the user input identifying a selected point in an image for which a camera focus distance is to be determined is via one a button or switch on the camera device.

Assembly of modules 3200 further includes a module 3258 configured to receive input from a user indicating a range of distance a user desires to be in focus, a module 3260 configured to receive input indicating user selection of multiple objects which are located at different distances from the camera, a module 3262 configured to control a camera depth of field to include multiple objects selected by the user within an in-focus distance range corresponding to said camera depth of field, and a module 3264 configured to make one of a mechanical aperture adjustment or a synthetic aperture adjustment based on the depth of the user selected objects. In some embodiments, module 3260 is included as part of module 3258. In some embodiments, module 3264 is included as part of module 3262.

Assembly of modules 3200 further includes a module 3266 configured to determine a camera focus in the user selected in-focus distance range, a module 3268 configured to indicate as being in focus portion corresponding to said in-focus distance range, and a module 3270 configured to display image objects within the user selected in-focus distance range a color used to indicate an in-focus object. In some embodiments, module 3266 is includes as part of module 3210. In some embodiments, module 3268 is includes as part of module 3212. In some embodiments, module 3270 is included as part of module 3268. In some embodiments, module 3266 controls the camera to focus at a distance in the user selected in-focus distance range, and the distance in the user selected in-focus distance range is within a first ⅓ portion of said in-focus distance range. In some embodiments, module 3266 controls the camera to focus at a distance in the user selected in-focus distance range, and the distance in the user selected in-focus distance range is within a first ¼ portion of said in-focus distance range. In some embodiments, module 3270 varies at least one of intensity or shade of objects which are displayed using said color to indicate an in-focus objects as a function of the object distance relative to the focus distance.

Assembly of modules 3200 further includes a module 3274 configured to modify a portion of the image captured by the camera to alter a portion of the image which is not in focus. In various embodiments, module 3274 is included as part of module 3212. Assembly of modules 3200 further includes a module 3276 configured to blur the portion of the image which is not in focus, a module 3278 configured to apply blurring by a uniform amount in the no in focus portion of the image, a module 3280 configured to apply blurring which varies as function of the amount a portion of the image is not in focus, a module 3282 configured to apply blurring which is greater for a first portion of an image further away form the in focus point than for a second portion of the image closer to the in focus point, a module 3284 configured to dull the portion of the image which is not in focus, a module 3286 configured to apply dulling by a uniform amount in the no in focus portion of the image, a module 3288 configure to apply dulling which varies as a function of the amount a portion of the image is not in focus, a module 3290 configured to apply dulling which is greater for a first portion of an image further away form the in focus point than for a second portion of the image closer to the in focus point, a module 3292 configured to wash out the portion of image which is not in focus, a module 3294 configured to apply washout by a uniform amount in the not in focus portion of the image, a module 3296 configured to apply washout which varies as a function of the amount a portion of the image is not in focus, and a module 3298 configured to apply washout which is greater for a first portion of an image further away from the in focus point than for a second portion of the image closer to the in focus point, a module 3211 configured to shade the portion of the image which is not in focus, a module 3213 configured to apply shading by a uniform amount in the not in focus portion of the image, a module 3215 configured to apply shading which varies as a function of the amount a portion of the image is not in focus, and a module 3217 configured to apply shading which is stronger for a first portion of an image further away form the in focus point than for a second portion of the image closer to the in focus point.

In various embodiments, module 3274 includes modules 3276, 3284, 3292 and 3211. In some embodiments, module 3276 includes module 3278, and module 3280. In some such embodiments, module 3280 includes module 3282. In some embodiments, module 3284 includes module 3286, and module 3288. In some such embodiments, module 3288 includes module 3290. In some embodiments, module 3292 includes module 3294, and module 3296. In some such embodiments, module 3296 includes module 3298. In some embodiments, module 3211 includes module 3213, and module 3215. In some such embodiments, module 3215 includes module 3217.

Assembly of modules 3200 further includes a module 3219 configured to control the camera to focus at the determined camera focus distance, e.g., a distance in the user selected in-focus distance range, a module 3221 configured to receive image data from multiple optical chains, a module 3223 configured to monitor for user input, e.g., depression of button switch, to trigger image capture, a module 3225 configured to determine if user input has been received to trigger image capture, a module 3227 configured to capture an image, e.g., in response to detected user input, and a module 3229 configured to store a captured image in memory.

Assembly of modules 3200 further includes a module 3231 configured to detect user input indicating depth of field selection information, a module 3233 configured to determine if a depth of field indicated by the detected user input is different from a current depth of field, e.g., a current camera depth of field, a module 3235 configured to perform an aperture modification operation to change the camera depth of field to the user indicated depth of field in response to a determination that a depth of field indicated by detected user input is different from a current camera depth of field, and a module 3227 configured to perform one of a physical aperture adjustment or a synthetic aperture adjustment. In various embodiments, module 3237 is included as part of module 3235. In some embodiments, the user input detected by module 3231 includes user selection of multiple objects corresponding to different depths. In some embodiments, in which module 3219 controls the camera to focus at a distance in the user selected in-focus distance range, the distance in the user selected in-focus distance range is within a first ⅓ portion of said in-focus distance range. In some embodiments, in which module 3219 controls the camera to focus at a distance in the user selected in-focus distance range, the distance in the user selected in-focus distance range is within a first ¼ portion of said in-focus distance range.

In various embodiments, one or more modules included as part of assembly of modules 3200 may be included within another module within assembly of modules 3200.

Figure 9:
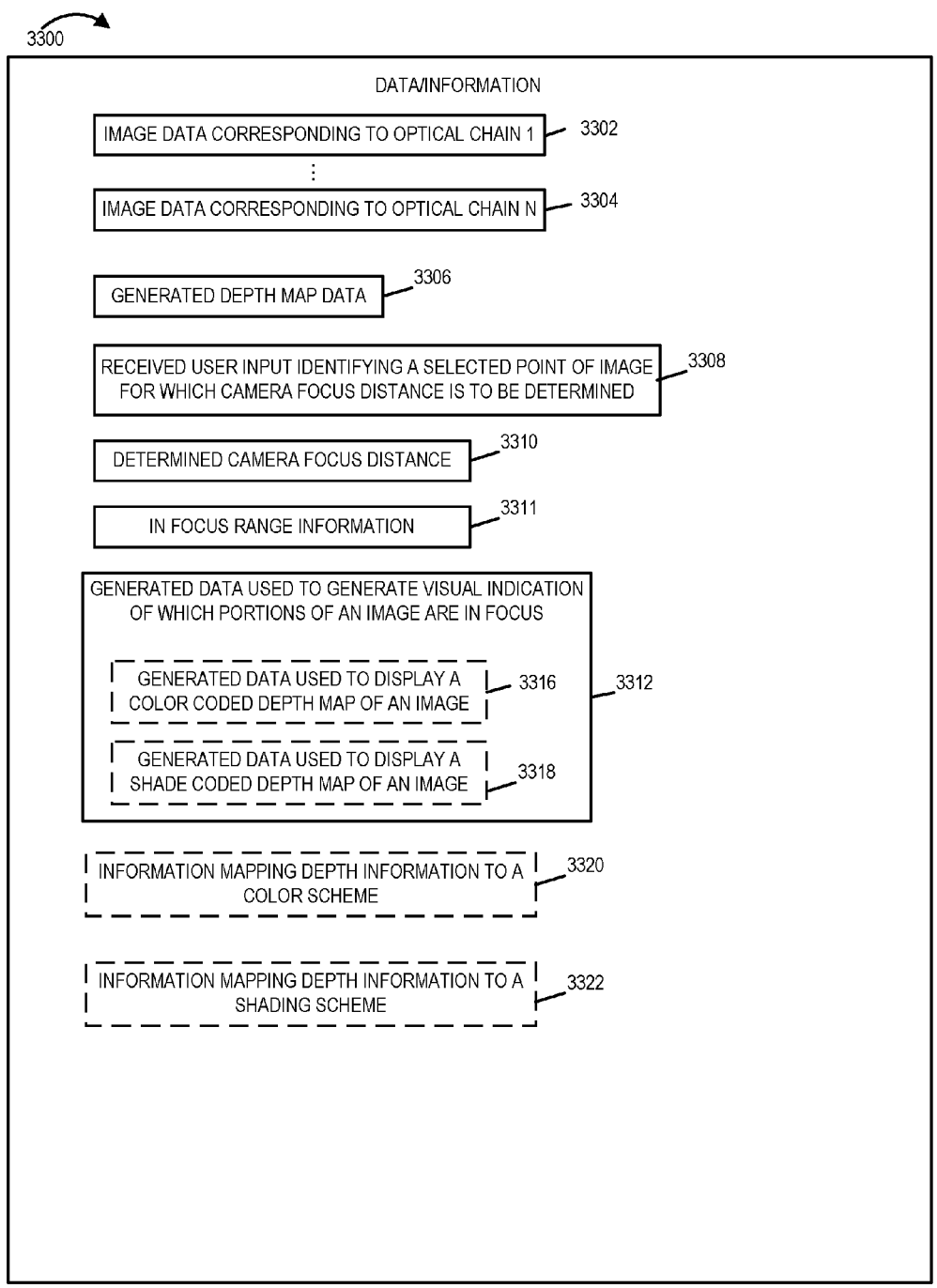
FIG. 9 is a drawing of exemplary data/information which may be included in an exemplary camera device in accordance with an exemplary embodiment.

FIG. 9 is a drawing of exemplary data/information 3300 which may be included in an exemplary camera device in accordance with an exemplary embodiment. In one embodiment, data/information 3300 is included in data information 3120 of camera device 3100 of FIG. 7. Data/information 3300 includes image data corresponding to a plurality of optical chains (image data corresponding to optical chain 1 3302, . . . , image data corresponding to optical chain N 3304), generated depth map data 3306, received user input identifying a selected point of an image for which a camera focus distance is to be determined 3308, a determined camera focus distance 3310, in focus range information 3311, and generated data used to generate a visual indication of which portions of an image are in focus 3312. In some embodiments, data 3312 includes one or both of generated data used to display a color coded depth map of an image 3316 and generated data used to display a shade coded depth map of an image 3318. In various embodiments, data/ information 3300 includes one or both of information mapping depth information to a color scheme 3320 and information 3322 mapping depth information to a shading scheme.

Drawing 3400 of FIG. 10 includes a drawing 3402 of exemplary touch screen display 3404 indicating an exemplary user selected point 3408 for which camera focus distance is determined and an exemplary corresponding table 3452 indicating a mapping between a color code scheme and camera focus distance information in accordance with an exemplary embodiment. Touch screen display 3404 includes a color coded representation 3406 of a displayed image on the screen in which a depth map based on multiple optical chains displays a 3D image via color coding. The user touch-selected point 3408 on the screen 3404 is represented by the color red, e.g., bright red. Table 3452 indicates color mapping to depth information, with respect to the user selected point. First row 3454 indicates three exemplary colors (blue, red, and green). Second row 3456 indicates distance information relative to the focal distance range, wherein the focal distance range includes the determined camera focus distance based on the user selected point. Second column 3458 indicates that the color red is used to color portions of the image that correspond to objects in the focus distance range. First column 3456 indicates that the color blue is used to color portions of the image that correspond to objects at a shorter distance than the focus distance range. Third column 3460 indicates that the color green is used to color portions of the image that correspond to objects at a distance longer then the furthest distance included in the focus distance range. In various embodiments, different color shading is used to indicate how close an object is with respect to the determined camera focus distance.

Figure 11:
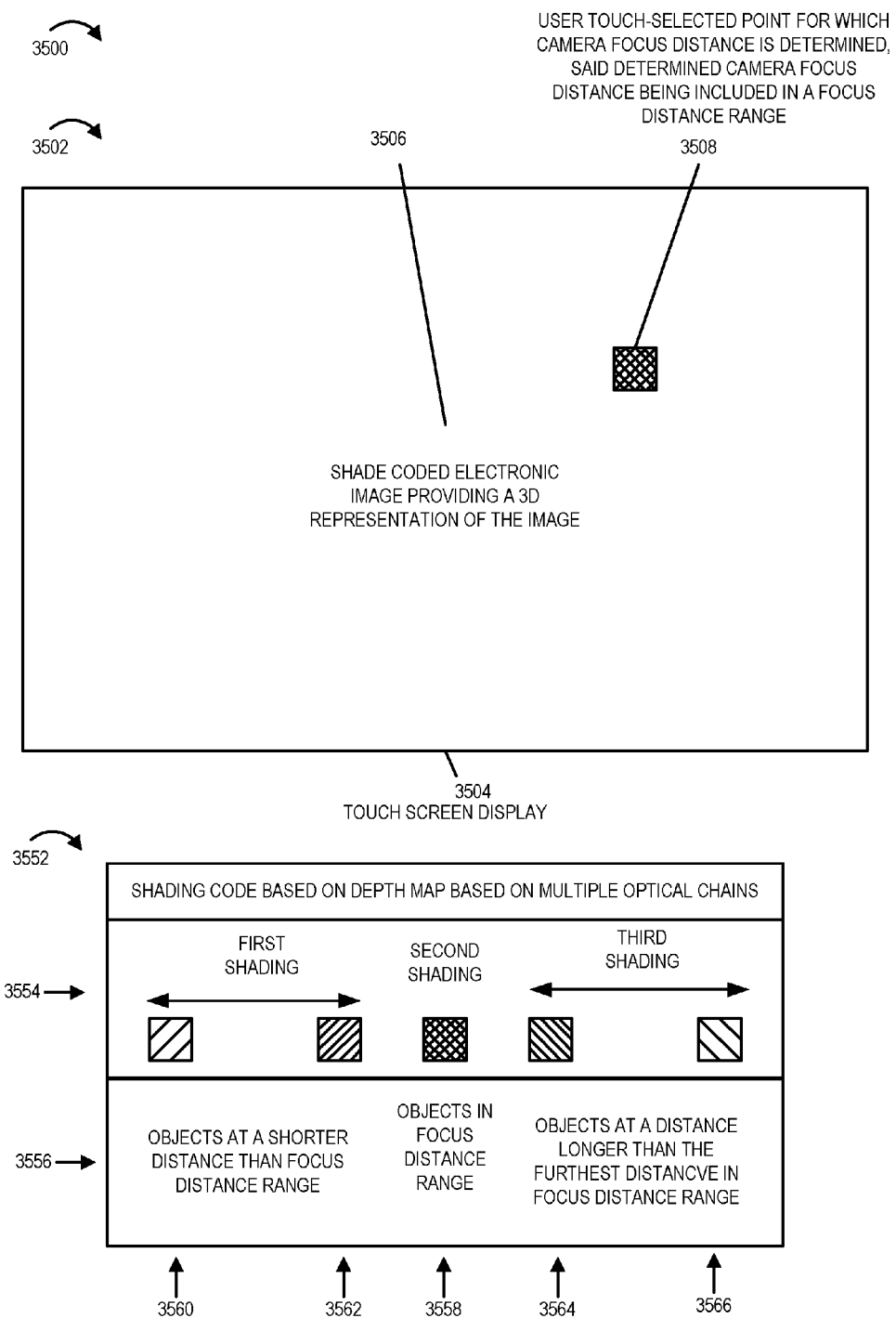
FIG. 11 illustrates an exemplary touch screen display indicating an exemplary user selected point for which camera focus distance is determined and an exemplary corresponding table indicating a mapping between a shading scheme and camera focus distance information in accordance with an exemplary embodiment.

Drawing 3500 of FIG. 11 includes a drawing 3502 of exemplary touch screen display 3504 indicating an exemplary user selected point 3508 for which camera focus distance is determined and an exemplary corresponding table 3552 indicating a mapping between a shading scheme and camera focus distance information in accordance with an exemplary embodiment. Touch screen display 3502 includes a shade coded representation 3506 of a displayed image on the screen in which a depth map based on multiple optical chains displays a 3D image via shade coding. The user touch-selected point 3508 on the screen 3504 is represented by the color cross hatch shading. Table 3552 indicates shade mapping to depth information, with respect to the user selected point. First row 3554 indicates three exemplary shading patterns (positive sloping line shading, crosshatch shading, and negative sloping line shading). Second row 3556 indicates distance information relative to the focal distance range, wherein the focal distance range includes the determined camera focus distance based on the user selected point. Third column 3558 indicates that the crosshatch shading is used to shade portions of the image that correspond to objects in the focus distance range. First column 3560 and second column 3562 indicates that positive sloping line shading is used to shade portions of the image that correspond to objects at a shorter distance than the focus distance range. The spacing between the lines in the shading is used to further indicate a distance from the focal distance range. Fourth column 3564 and fifth column 3566 indicates that negative sloping line shading is used to shade portions of the image that correspond to objects at a distance longer then the furthest distance included in the focus distance range. The spacing between the lines in the shading is used to further indicate a distance from the focal distance range.

Figure 12:
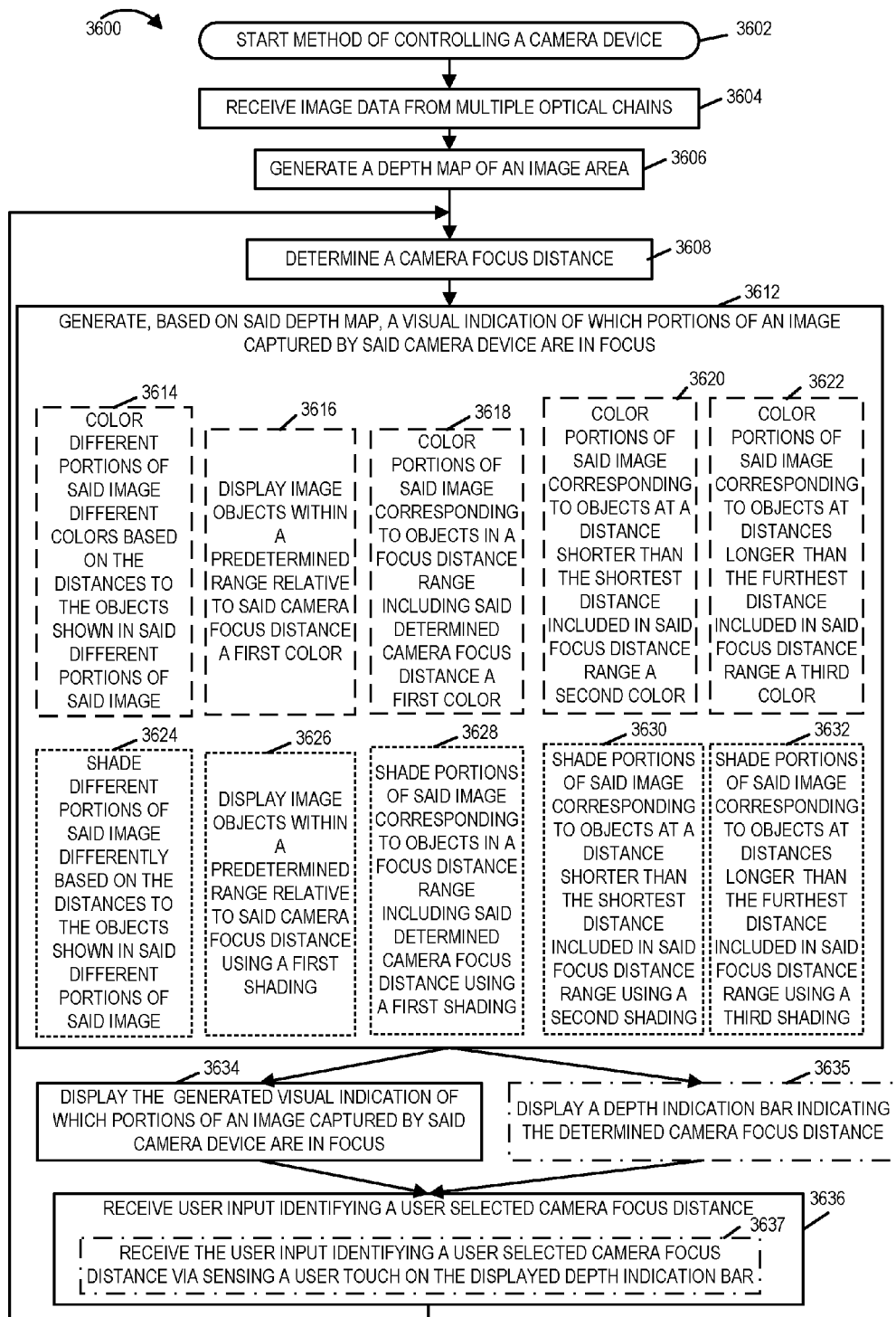
FIG. 12 is a flowchart of an exemplary method of controlling a camera device in accordance with an exemplary embodiment.

FIG. 12 is a flowchart 3600 of an exemplary method of controlling a camera device, e.g., camera device 3100 of FIG. 7, in accordance with an exemplary embodiment. Operation starts in step 3602, in which the camera device is powered on and initialized. Operation proceeds from step 3602 to step 3604. In step 3604 the camera device receives image data from multiple optical chains included within the camera device. Operation proceeds from step 3604 to step 3606.

In step 3606 the camera device generates a depth map of an image area based on the received image data from multiple optical chains. Operation proceeds from step 3606 to step 3608.

In step 3608 the camera device determines a camera focus distance, e.g., an initial camera focus distance. In some embodiments the initial camera focus distance corresponds to the focus distance to a predetermined point in the image, e.g., the center of a rectangle corresponding to the image. In some embodiments, the initial camera focus distance is a user selected distance, e.g., one of a plurality of alternative user selections. Operation proceeds from step 3608 to step 3612.

In step 3612, the camera device generates, based on said depth map, a visual indication of which portions of an image captured by said camera device are in focus. In some embodiments, step 3612 includes one or more or all of steps 3614, 3616, 3618, 3620 and 3622. In some other embodiments, step 3612 includes one or more or all of steps 3624, 3626, 3628, 3630 and 3632.

In step 3614 the camera device colors different portions of said image different colors based on the distances to the objects shown in said different portions of said image. In step 3616 the camera device displays objects within a predetermined range relative to said camera focus distance a first color. In some embodiments, the predetermined range is an in-focus distance range. In step 3618 the camera device colors portions of said image corresponding to objects in a focus distance range including said determined camera focus distance a first color. In step 3620 the camera device colors portion of said image corresponding to objects at a distance shorter than the shortest distance including in said focus distance range a second color. In step 3622 the camera device colors portions of said image corresponding to objects at a distance longer than the furthest distance including in said focus distance range a third color.

In some embodiments, the first color is red. In some such embodiments, the second color is blue, and the third color is green.

In some embodiments, the shade of the first color indicates how close to the determined focus distance an image in the image is to the determined focus distance.

In some embodiments, the first color is red and objects in said image which are at the determined focus distance are shaded bright red. In some such embodiments, the shade of the second color indicates how close an object shaded in the second color is to the camera in a foreground area of the image and shade of the third color indicates how close the object shaded in the third color is to the camera in a background area of the image.

In step 3624 the camera device shades different portions of said image differently based on the distances to the objects shown in said different portions of said image. In step 3626 the camera device displays objects within a predetermined range relative to said camera focus distance using a first shading. In some embodiments, the predetermined range is an in-focus distance range. In step 3628 the camera device shades portions of said image corresponding to objects in a focus distance range including said determined camera focus distance using first shading. In step 3630 the camera device shades portions of said image corresponding to objects at a distance shorter than the shortest distance including in said focus distance using a second shading. In step 3632 the camera device shades portions of said image corresponding to objects at a distance longer than the furthest distance including in said focus distance range using a third shading.

In some embodiments, the first shading is crosshatch shading. In some such embodiments, the second shading is left to right ascending line shading; and the third shading is left to right descending line shading. In some embodiments, the spacing between the ascending lines in the ascending line shading indicates how close an object shaded using the second shading is to the camera in a foreground area of the image; and the spacing between the descending line shading indicates how close the object shaded using the third shading is to the camera in a background area of the image.

Operation proceeds from step 3612 to step 3634 in which the camera device displays the generated visual indication of which portions of an image captured by the camera device are in focus. In some embodiments, operation also proceeds from step 3612 to step 3635 in which the camera device displays a depth indication bar indicating the determined camera focus distance. In some embodiments, the displayed depth indication bar is an overlay on the generated visual indication of which portions of an image captured by the camera device are in focus, e.g., an overlay on a color or shade code image which represents the image in 3D.

Operation proceeds from step 3634, and in some embodiments, from step 3635 to step 3636. In step 3636 the camera device receives user input identifying a user selected camera focus distance. In some embodiments, step 3636 includes step 3637 in which the camera device receives the user input identifying a user selected camera focus distance via sensing a user touch on the displayed depth indication bar. Operation proceeds from step 3636 to step 3608 in which the camera device determines a new camera focus distance based on the received user input of step 3636. In various embodiments, the camera device sets the new determined camera focus distance to the identified user selected camera focus distance obtained from step 3636. Operation proceeds from step 3608 to step 3610 in which the camera device generates, based on said depth map and said new determined camera focus distance, a visual indication of which portions of an image captured by said camera device are in focus.

Figure 13:
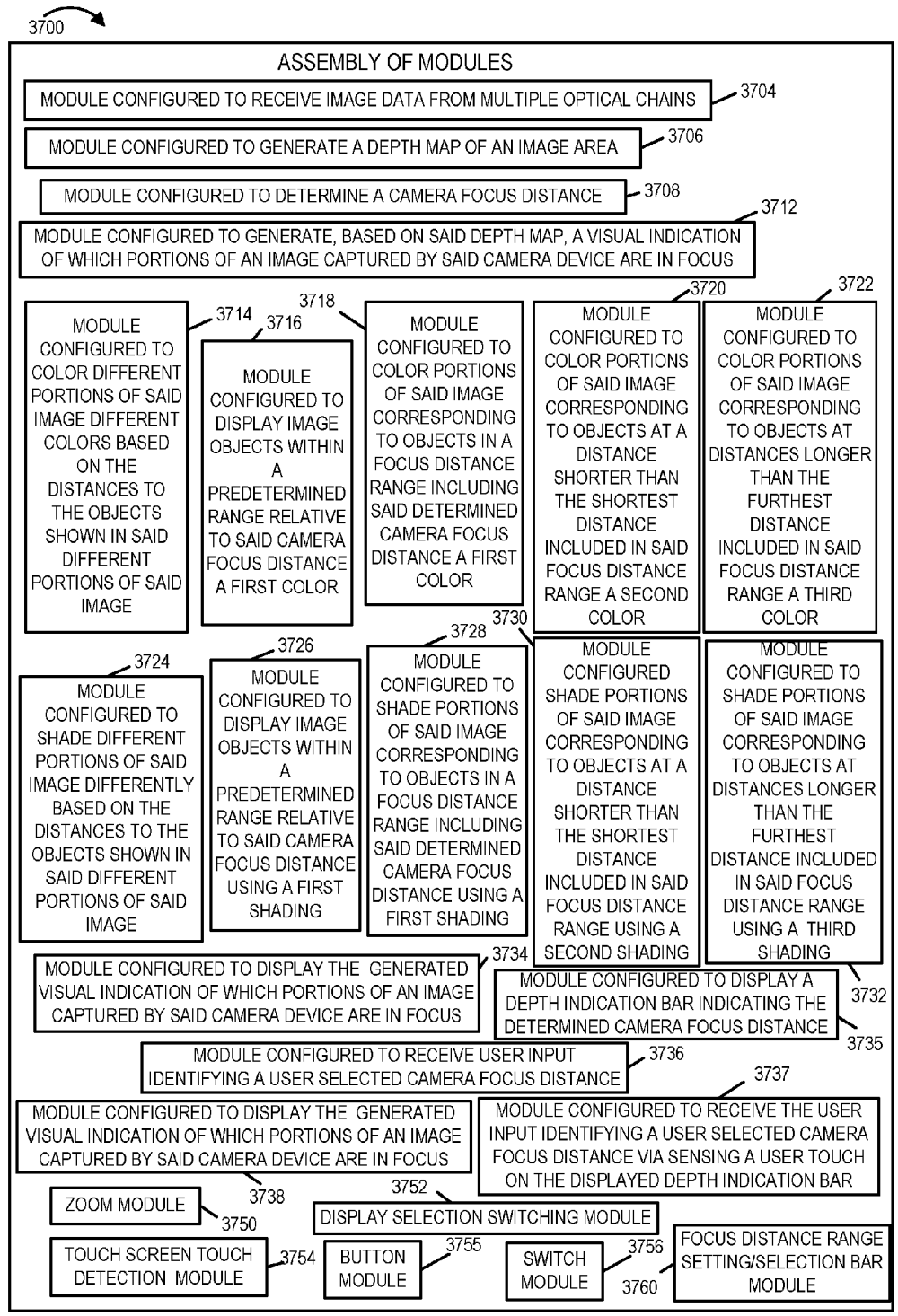
FIG. 13 is a drawing of an assembly of modules, which may be included in an exemplary camera device, in accordance with an exemplary embodiment.

FIG. 13 is a drawing of an assembly of modules 3700, which may be included in an exemplary camera device, e.g., camera device 3100 of FIG. 7, in accordance with an exemplary embodiment. In one embodiment the assembly of modules 3700 shown in FIG. 13 is part of or used in place of the assembly of modules 3118. The modules in the assembly 3700, when executed by the processor 3110 control the camera device 3100 in one embodiment to implement the method described with regard to FIG. 12. While the modules of FIG. 13 may, and in some embodiments are implemented using software, in other embodiments they are implemented in hardware, e.g., as circuits, which may and in some embodiments are included in the camera device 3100.

Assembly of modules 3700 includes a module 3704 configured to receive image data from multiple optical chains, a module 3706 configured to generate a depth map of an image area, a module 3708 configured to determine a camera focus distance, and a module 3712 configured to generate, based on said determined depth map, a visual indication of which portions of an image captured by said camera device are in focus. Assembly of modules 3700 further includes a module 3714 configured to color different portion of said image different colors based on the distances to the objects shown in said different portions of said image, a module 3716 configured to display image objects within a predetermined range relative to said camera focus distance a first color, a module 3718 configured to color portions of said image corresponding to objects in a focus distance range including said determined camera focus distance a first color, a module 3720 configured to color portions of said image corresponding to objects at a distance shorter than the shortest distance included in said focus distance including in said focus distance range a second color, and a module 3722 configured to color portions of said image corresponding to objects at distances longer than the furthest distance included in said focus distance range a third color. Assembly of modules 3700 includes a module 3724 configured to shade different portions of said image differently based on the distances to the objects shown in said different portions of said image, a module 3726 configured to display image objects within a predetermined range relative to said camera focus distance using a first shading, a module 3728 configured to shade portions of said image corresponding to objects in a focus distance range including said determined camera focus distance using a first shading, a module 3730 configured to shade portions of said image corresponding to objects at a distance shorter than the shortest distance including in said focus distance range using a second shading, and a module 3732 configured to shade portions of said image corresponding to objects at distances longer than the furthest distance included in said focus distance range using a third shading. Assembly of modules 3700 further includes a module 3734 configured to display the generated visual indication of which portions of an image captured by said camera device are in focus, a module 3735 configured to display a depth indication bar indicating the determined camera focus distance, a module 3736 configured to receive user input identifying a user selected camera focus distance, a module 3737 configured to receive user input identifying a user selected camera focus distance via sensing a user touch on a displayed depth indication bar, a zoom module 3750, a display selection switching module 3752, a touch screen touch detection module 3754, a button module 3755, and a switch module 3756.

Zoom module 3750 responds to received user commands to zoom in and zoom out. The zoom capability allows the user to zoom in on a very small area in the image and identify, via the visual representation, e.g., via the color coded image, that the user selected camera focus distance is set to match the object of interest image in the selected area. The user selected camera focus distance can be, and sometimes is, varied until the object of interest in the selected zoomed in area indicates, e.g., via color, e.g., via bright red color, is at the user selected camera focus distance.

Display selection switching module 3752 switches the display on the camera device to display between an image focused at a determined camera focus distance and a visual representation of the image indicating which portions of the image are in focus, e.g., a generated color coded image based on a depth map or a generated shade coded image based on a depth map. Touch screen touch detection module 3754 detects a user touch on a screen identifying in a user selected camera focus distance, e.g., a user touch on a displayed depth indication bar. Button module 3755 receives and processes user input from buttons on the camera device. Switch module 3756 receives and processes user input from switches on the camera. Focus distance range setting/selection bar module 3760 processes received user input from module 3737, setting the user selected camera focus distance and modifying the indication bar to reflect the user selection.

In various embodiments, one or more modules included as part of assembly of modules 3700 may be included within another module within assembly of modules 3700.

FIG. 14 is a drawing 3800 including an exemplary touch screen display 3804 including a depth selection display 3805. Touch screen display 3804 includes a color coded or shade coded electronic image 3808 proving a 3D representation of an image on the screen based on a depth map based on multiple optical chains. A touch activated focus distance range bar 3814, sometimes referred to as a depth bar, is part of the depth selection display 3805. Slider 3816 provides an indication of the current, e.g., user selected, depth for the display, e.g., an indication of the user selected camera focus distance. The user may, and sometimes does, select a different point on the focus distance range bar, e.g., touch and move the slider to a different point, and the camera device will readjust the camera focus distance to the new user selection. Then, the color coded or shaded coded display 3408 is readjusted to match the new user selection. In this example, the depth selection display also includes touch activated UP arrow 3810 and touch activated DOWN arrow 3812, which may also be used by the user to change the focus distance setting.

In various embodiments, the depth selection display 3804 is an overlay on the color coded or shade coded image 3808.

Figure 15B:
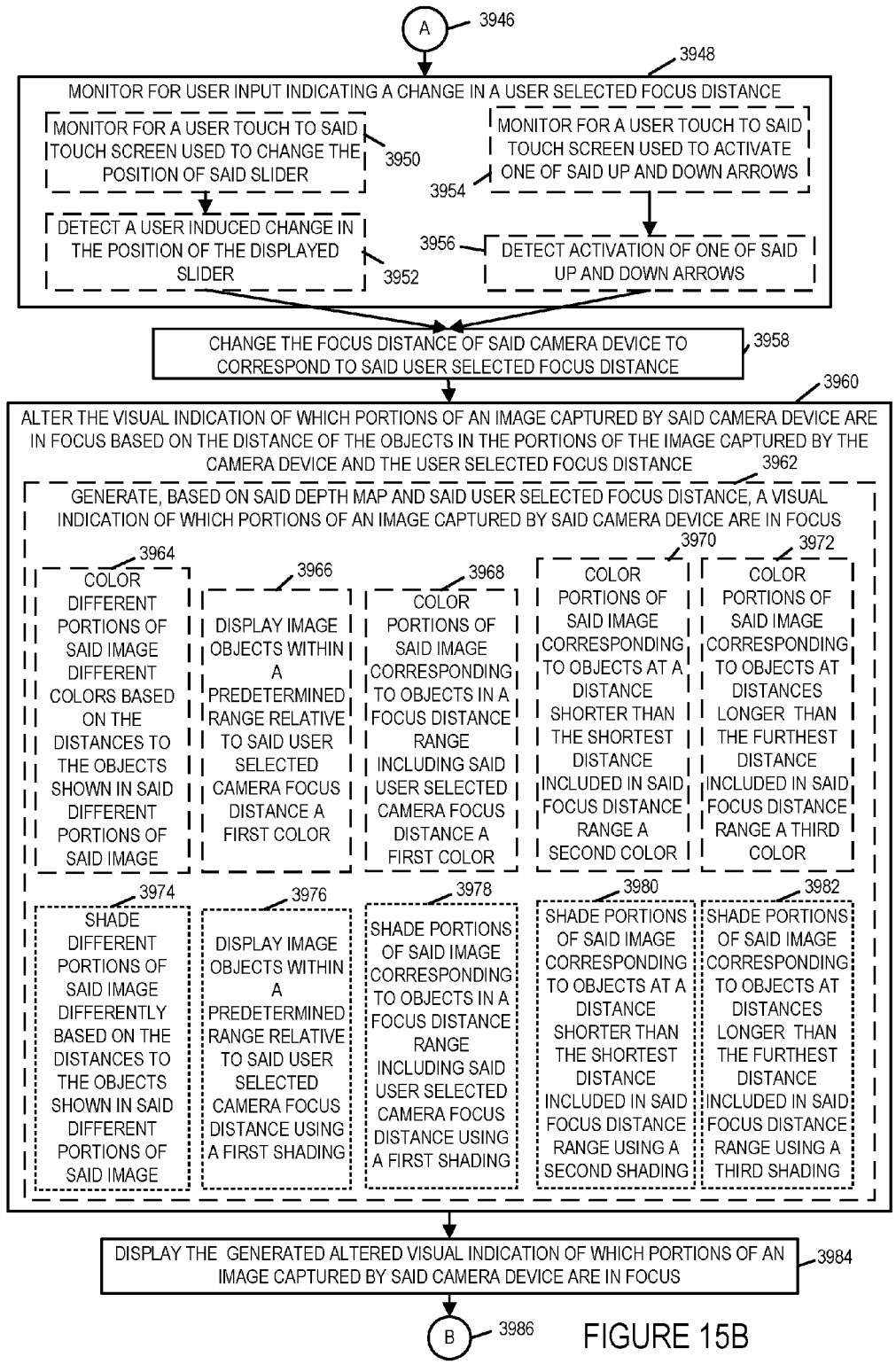
FIG. 15B is a second part of a flowchart of an exemplary method of controlling a camera device in accordance with various exemplary embodiments.

FIG. 15, comprising the combination of FIG. 15A and FIG. 15B, is a flowchart 3900 of an exemplary method of controlling a camera device, e.g., camera device 3100 of FIG. 7, in accordance with various exemplary embodiments. Operation starts in step 3902, in which the camera device is powered on and initialized. Operation proceeds from step 3902 to step 3904, in which the camera device receives image data from multiple optical chains. Operation proceeds from step 3904 to step 3906 in which the camera device generates a depth map of an image area based on the received image data from multiple optical chains. Operation proceeds from step 3906 to step 3908. In step 3908 the camera device determines a camera focus distance, e.g., an initial camera focus distance. In some embodiments, the initial camera focus distance corresponds to the object in a particular point, e.g., a predetermined point in the image, e.g., the center of the captured image. In some embodiments, the initial camera focus distance corresponds to a user selected initial focus distance or a predetermined initial focus distance setting. In some embodiments, the initial camera focus distance corresponds to an automated initial focus distance determination, e.g., based on an acoustic sensor, e.g., an ultrasonic sensor. Operation proceeds from step 3908 to step 3910.

In step 3910 the camera device generates, based on the depth map, a visual indication of which portions of an image captured by the camera device are in focus. The generation of step 3910 is also based on the determined camera focus distance of step 3908.

In some embodiments, step 3910 includes one or more or all of steps 3912, 3914, 3916, 3918, and 3920. In step 3912 the camera device colors different portions of said image different colors based on the distances to the objects shown in said different portions of said image. In step 3914 the camera device displays image objects within a predetermined range relative to said camera focus distance a first color. In step 3916 the camera device colors portions of said image corresponding to objects in a focus distance range including said determined camera focus distance a first color. In step 3918 the camera device colors portions of said image corresponding to objects at a distance shorter than the shortest distance in said focus distance range a second color. In step 3920 the camera device colors portions of said image corresponding to objects at distances longer than the furthest distance included in said focus distance range a third color.

In some embodiments, step 3910 includes one or more or all of steps 3922, 3924, 3926, 3928 and 3930. In step 3922 the camera device shades different portions of said image differently based on the distance to the objects shown in said different portions of said image. In step 3924 the camera device displays image objects within a predetermined range relative to said camera focus distance using a first shading. In step 3926 the camera device shades portions of said image corresponding to objects in a focus distance range including said determined camera focus distance using a first shading. In step 3928 the camera device shades portions of said image corresponding to objects at a distance shorter than the shortest distance included in said focus distance range using a second shading. In step 3930 the camera device shades portions of said image corresponding to objects at distances longer than the furthest distance included in said focus distance range using a third shading.

Operation proceeds from step 3910 to step 3932, in which the camera device displays the generated visual indication of which portion of an image captured by said camera device are in focus. Operation proceeds from step 3932 to step 3934. In step 3934 the camera device displays to the user a user controllable focus distance control. In various embodiments, step 3934 includes one or more or all of steps 3936, 3940, 3942 and 3944. In step 3936 the camera device displays a slider on a focus distance range bar. In step 3940 the camera device displays said slider on a touch screen display. In step 3942 the camera device displays up and down arrows. In step 3944 the camera device displays said up and down arrows on a touch screen. Operation proceeds from step 3934 via connecting node A 3946 to step 3948.

In step 3948 the camera device monitors for user input indicating a change in a user selected focus distance. Step 3948, in some embodiments, includes step 3950 and step 3952. In step 3950 the camera device monitors for a user touch to said touch screen used to change the position of said slider. Operation proceeds from step 3950 to step 3952 in which the camera device detects a user induced change in the position of the displayed slider. Step 3948, in some embodiments, includes step 3954 and step 3956. In step 3954 the camera device monitors for a user touch to said touch screen used to activate one of said up and down arrows. Operation proceeds from step 3954 to step 3956 in which the camera device detects activation of one of said up and down arrows.

Operation proceeds from step 3948 to step 3958 in which the camera device changes the focus distance to said camera device to correspond to said user selected focus distance. Operation proceeds from step 3958 to step 3960.

In step 3960 the camera device alters the visual indication of which portions of an image captured by said camera device are in focus based on the distance of the objects in the portions of the image captured by the camera device and the user selected focus distance. In various embodiments, step 3960 includes step 3962 in which the camera device generates based on the depth map and said user selected focus distance a visual indication of which portion of an image captured by said camera device are in focus.

In some embodiments, step 3962 includes one or more or all of steps 3964, 3966, 3968, 3970, and 3972. In step 3964 the camera device colors different portions of said image different colors based on the distances to the objects shown in said different portions of said image. In step 3966 the camera device displays image objects within a predetermined range relative to said user selected camera focus distance a first color. In step 3968 the camera device colors portions of said image corresponding to objects in a focus distance range including said user selected camera focus distance a first color. In step 3970 the camera device colors portions of said image corresponding to objects at a distance shorter than the shortest distance in said focus distance range a second color. In step 3972 the camera device colors portions of said image corresponding to objects at distances longer than the furthest distance included in said focus distance range a third color.

In some embodiments, step 3962 includes one or more or all of steps 3974, 3976, 3978, 3980 and 3982. In step 3974 the camera device shades different portions of said image differently based on the distance to the objects shown in said different portions of said image. In step 3976 the camera device displays image objects within a predetermined range relative to said user selected camera focus distance using a first shading. In step 3978 the camera device shades portions of said image corresponding to objects in a focus distance range including said user selected camera focus distance using a first shading. In step 3980 the camera device shades portions of said image corresponding to objects at a distance shorter than the shortest distance included in said focus distance range using a second shading. In step 3982 the camera device shades portions of said image corresponding to objects at distances longer than the furthest distance included in said focus distance range using a third shading.

Operation proceeds from step 3960 to step 3984, in which the camera device displays the generated altered visual indication of which portions of an image captured by said camera device are in focus. Operation proceeds from step 3984, via connecting node B 3986 to step 3932.

Figures 16, 16A:
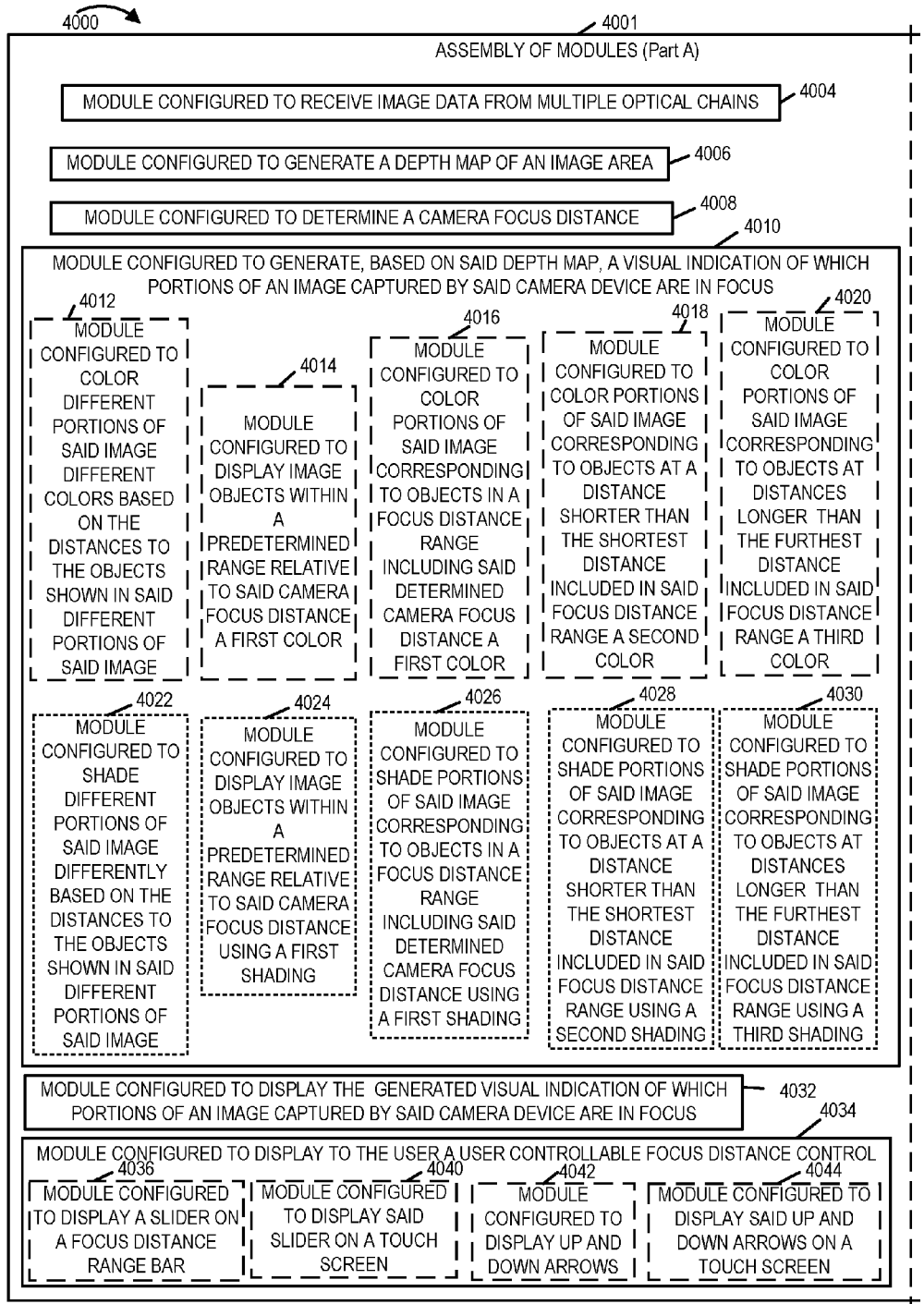
FIG. 16A is a drawing of a first part of an assembly of modules, which may be included in an exemplary camera device, e.g., camera device 3100 of FIG. 7, in accordance with an exemplary embodiment.

FIG. 16 is a drawing of an assembly of modules 4000, which may be included in an exemplary camera device, e.g., camera device 3100 of FIG. 7, in accordance with an exemplary embodiment. In one embodiment the assembly of modules 4000 shown in FIG. 16 is part of or used in place of the assembly of modules 3118. The modules in the assembly 4000, when executed by the processor 3110 control the camera device 3100 in one embodiment to implement the method described with regard to FIG. 15. While the modules of FIG. 16 may, and in some embodiments are implemented using software, in other embodiments they are implemented in hardware, e.g., as circuits, which may and in some embodiments are included in the camera device 3100.

Figure 16B:
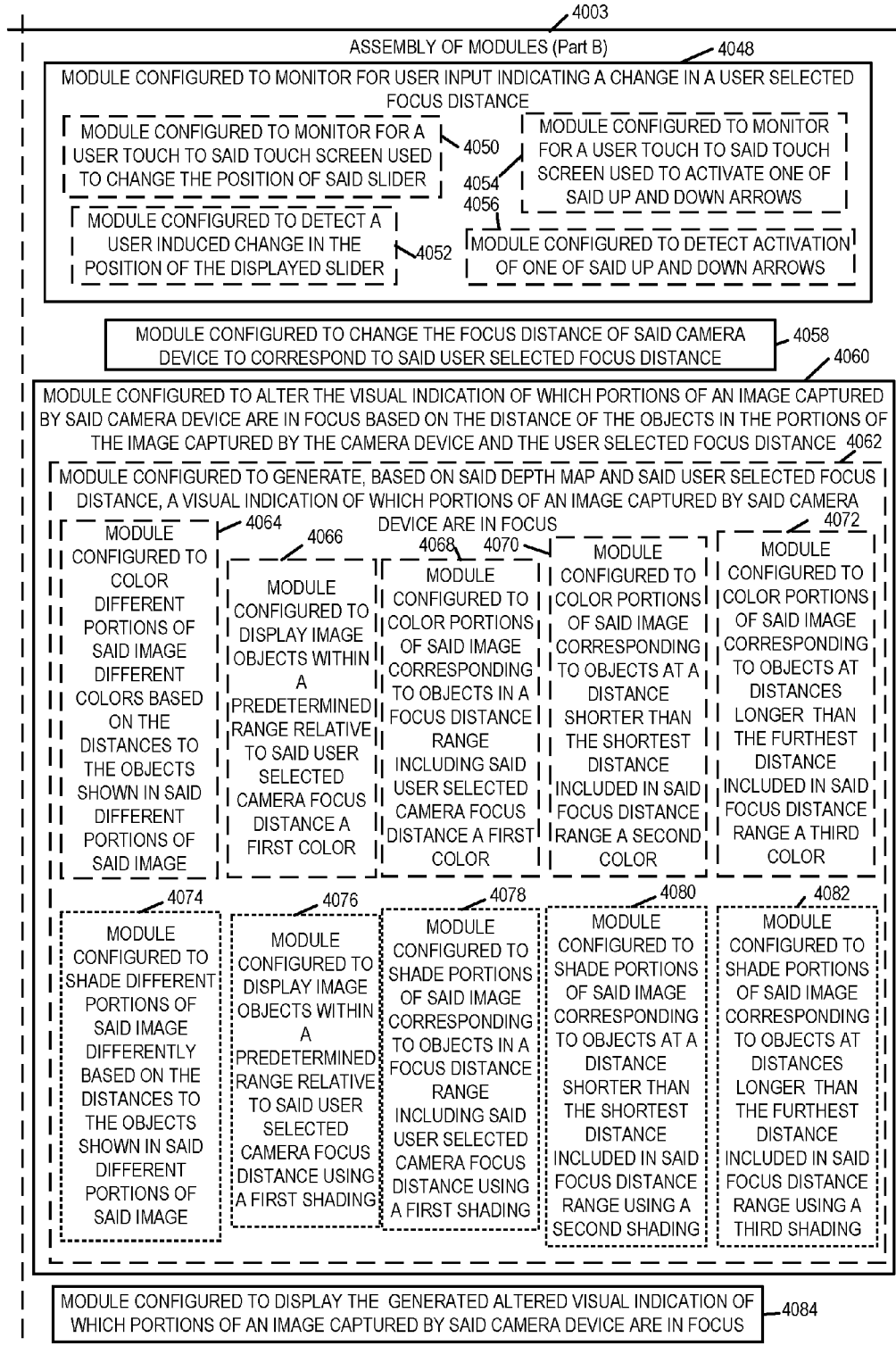
FIG. 16B is a drawing of a second part of an assembly of modules, which may be included in an exemplary camera device, e.g., camera device 3100 of FIG. 7, in accordance with an exemplary embodiment.

FIG. 16, comprising the combination of FIG. 16A and FIG. 16B, is an assembly of modules 4000, comprising Part A 4001 and Part B 4003, in accordance with various exemplary embodiments. Assembly of modules 4000 includes a module 4004 configured to receive image data from a plurality of optical chains, a module 4006 configured to generate a depth map of an image area, a module 4008 configured to determine a camera focus distance, and a module 4010 configured to generate, based on said depth map, a visual indication of which portions of an image captured by said camera device are in focus. In various embodiments, module 4010 includes one or more or all of: a module 4012 configured to color different portions of said image different colors based on the distances to the objects shown in different portions of said image, a module 4014 configured to display image objects within a predetermined range relative to said camera focus distance a first color, a module 4016 configured to color portions of said objects corresponding to objects in a focus distance range including said determined camera focus distance a first color, a module 4018 configured to color portions of said image corresponding to objects at a distance shorter than the shortest distance included in said focus distance range a second color, and a module 4020 configured to color portions of said image corresponding to objects at distances longer than the furthest distance included in said focus distance range a third color. In various embodiments, module 4010 includes one or more or all of: a module 4022 configured to shade different portions of said image differently based on the distances to the objects shown in said different portions of said image, a module 4024 configured to display image objects with a predetermined range relative to said camera focus distance using a first shading, a module 4026 configured to shade portions of said image corresponding to objects in a focus distance range including said determined camera focus distance using a first shading, a module 4028 configured to shade portions of said image corresponding to objects at a distance shorter than the shortest distance included in said focus distance range using a second shading, and a module 4030 configured to shade portions of said image corresponding to objects at a distances longer than the furthest distance included in said focus distance range using a third shading.

Assembly of modules 4000 further includes a module 4032 configured to display the generated visual indication of which portions of an image captured by said camera device are in focus, and a module 4034 configured to display to the user a user controllable focus distance control. In various embodiments, module 4034 includes one or more or all of: a module 4036 configured to display a slider on a focus distance range bar, a module 4040 configured to display said slider on a touch screen, a module 4042 configured to display up and down arrows and a module 4044 configured to display said up and down arrows on a touch screen.

Assembly of modules 4000 further includes a module 4048 configured to monitor for user input indicating a change in a user selected focus distance, a module 4058 configured to change the focus distance of said camera device to correspond to said user selected focus distance, a module 4060 configured to alter the visual indication of which portions of an image captured by said camera device are in focus based on the distance of the objects in the portion of the image captured by the camera device and the user selected focus distance, and a module 4084 configured to display the generated altered visual indication of which portions of an image captured by said camera device are in focus. In some embodiments, module 4048 includes one or more or all of a module 4050 configured to monitor for a user touch to said touch screen used to change the position of said slider, a module 4052 configured to detect a user induced change in the position of the displayed slider, a module 4054 configured to monitor for a user touch to said touch screen used to activate one or said up and down arrows, and a module 4056 configured to detection activation of one of said up and down arrows.

In various embodiments, module 4060 includes a module 4062 configured to generate, based on the depth map and said user selected focus distance, a visual indication of which portions of an image captured by said camera device are in focus. In various embodiments, module 4062 includes one or more or all of: a module 4064 configured to color different portions of said image different colors based on the distances to the objects shown in said different portions of said image, a module 4066 configured to display image objects within a predetermined range relative to said user selected camera focus distance a first color, a module 4068 configured to color portions of said image corresponding to objects in a focus distance range including said user selected camera focus distance a first color, a module 4070 configured to color portion of said image corresponding to objects at a distance shorter than the shortest distance included in said focus distance range a second color, and module 4072 configured to color portion of said image corresponding to objects at distances longer than the furthest distance included in said focus distance range a third color. In some embodiments, module 4060 includes one or more or all of: a module 4074 configured to shade different portion of said image differently based on the distances to the objects shown in said different portion of said image, a module 4076 configured to display image objects within a predetermined range relative to said user selected camera focus distance using a first shading, a module 4078 configured to shade portion of said image corresponding to objects in a focus distance range including said user selected camera focus distance using a first shading, a module 4080 configured to shade portion of said image corresponding to objects at a distance shorter than the shortest distance included in said focus distance range using a second shading, and a module 4082 configured to shade portions of said image corresponding to objects at distance longer than the furthest distance included in said focus distance range using a third shading.

In various embodiments, one or more modules included as part of assembly of modules 4000 may be included within another module within assembly of modules 4000.

Figure 17:
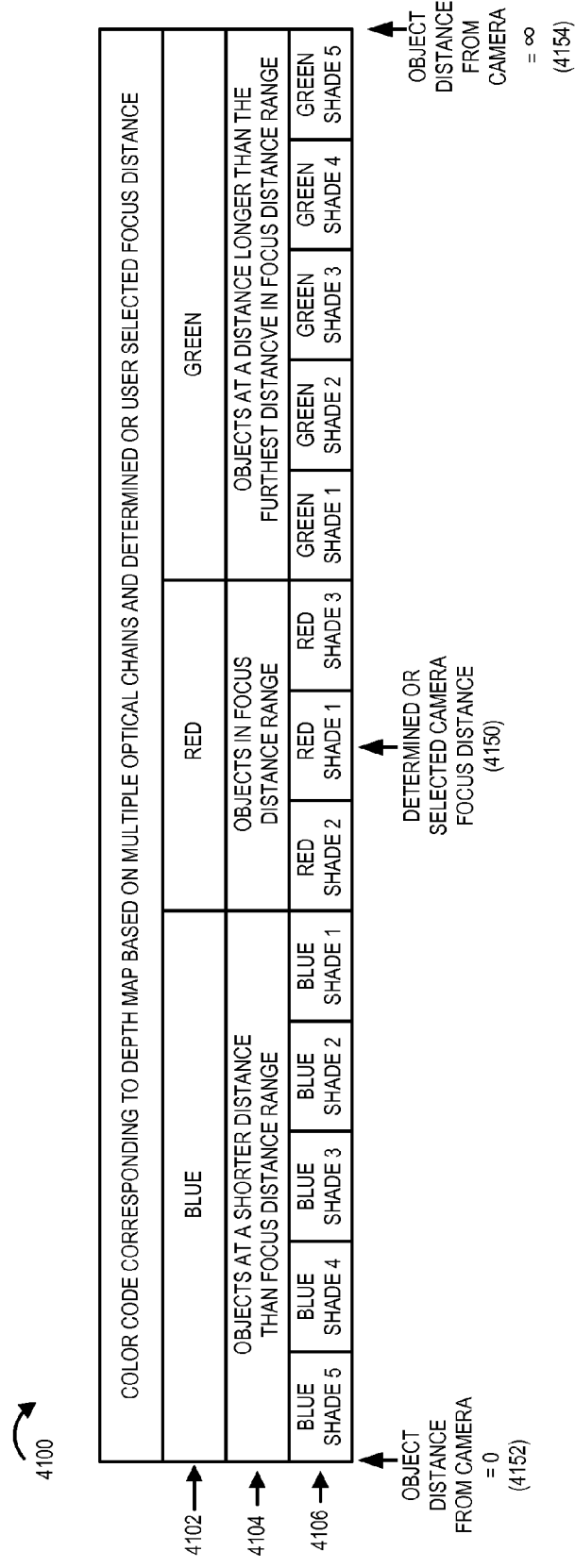
FIG. 17 is a drawing of table indicating an exemplary mapping between a color coding scheme and camera focus distance information in accordance with an exemplary embodiment.

FIG. 17 is a drawing of table 4100 indicating an exemplary mapping between a color coding scheme and camera focus distance information in accordance with an exemplary embodiment. Table 4100 indicates color coding used in a visual representation of an image, based on a depth map based on multiple optical chains and based on a determined or user selected camera focus distance, in accordance with an exemplary embodiment. First row 4102 illustrates the basic colors used; second row 4104 indicates objects distances corresponding to each color; and third row 4106 indicates color shading, which provides a further refinement on object distances. In this example, there is a determined or user selected camera focus distance 4150. Point 4152 represents object distance from the camera=0, which represents one distance extreme. Point 4154 represents object distance from the camera=∞, which represents the other distance extreme.

The color red corresponds to objects within the focus distance range. The focus distance range includes the determined or selected camera focus distance. In this example, there are three sub-ranges within the focus distance range (red shade 2, red shade 1, red shade 3). The center range which includes the determined or selected camera focus distance corresponds to red shade 1, e.g., a bright red.

The color blue corresponds to objects at a shorter distance than the focus distance range. In this example, there are five sub-ranges (blue shade 1, blue shade 2, blue shade 3, blue shade 4, and blue shade 5) corresponding to the color blue. The shading is used to indicate how far an object in the image is with respect the focus distance range, e.g., how close an object is to the camera device.

The color green corresponds to objects at a longer distance than the focus distance range. In this example, there are five sub-ranges (green shade 1, green shade 2, green shade 3, green shade 4, and green shade 5) corresponding to the color green. The shading is used to indicate how far an object in the image is with respect the focus distance range, e.g., how much farther out an object is beyond the focus distance range.

At different times, the distances ranges corresponding to each of the colors and/or color shades can be, and sometimes is, different, e.g., based on a different determined or user selected camera focus distance, e.g., based on a different selected point in the image selected to be the identified point for the camera focus distance, e.g., selected via touch of a point in the image on the touch screen, or based on a user selected camera focus distance, e.g., selected via touch of focus distance bar or via touch of an arrow on the touch screen.

For example, in one example, at one time the user selected camera focus distance is 10 m (where m is meters); red shade 1 corresponds to a camera to object distance of 9.8 to 10.2 m; red shade 2 corresponds to a camera to object distance of 9.8 to 9.4 m; red shade 3 corresponds to a camera to object distance of 10.2 to 10.6 m; blue shade 1 corresponds to a camera to object distance of 9.4 to 8 m; blue shade 2 corresponds to a camera to object distance of 8 to 6 m; blue shade 3 corresponds to a camera to object distance of 6 to 4 m; blue shade 4 corresponds to a camera to object distance of 4 to 2 m; blue shade 5 corresponds to a camera to object distance of 2 to 0 m; green shade 1 corresponds to a camera to object distance of 10.6 to 12 m; green shade 2 corresponds to a camera to object distance of 12 to 22 m; green shade 3 corresponds to a camera to object distance of 22 to 50 m; green shade 4 corresponds to a camera to object distance of 50 to 100 m; and green shade 5 corresponds to a camera to object distance of 100 to ∞ m.

Continuing with the example, if the determined or user selected camera focus distance is set to 5 m; red shade 1 corresponds to a camera to object distance of 4.95 to 5.05 m; red shade 2 corresponds to a camera to object distance of 4.95 to 4.9 m; red shade 3 corresponds to a camera to object distance of 5.05 to 5.15 m; blue shade 1 corresponds to a camera to object distance of 4.95 to 4.5 m; blue shade 2 corresponds to a camera to object distance of 4.5 to 3.5 m; blue shade 3 corresponds to a camera to object distance of 3.5 to 3.0 m; blue shade 4 corresponds to a camera to object distance of 3.0 to 2.0 m; blue shade 5 corresponds to a camera to object distance of 2.0 to 0 m; green shade 1 corresponds to a camera to object distance of 5.05 to 6.0 m; green shade 2 corresponds to a camera to object distance of 6.0 to 10.0 m; green shade 3 corresponds to a camera to object distance of 10 to 20 m; green shade 4 corresponds to a camera to object distance of 20 to 50 m; and green shade 5 corresponds to a camera to object distance of 50 to ∞ m.

Figure 18:
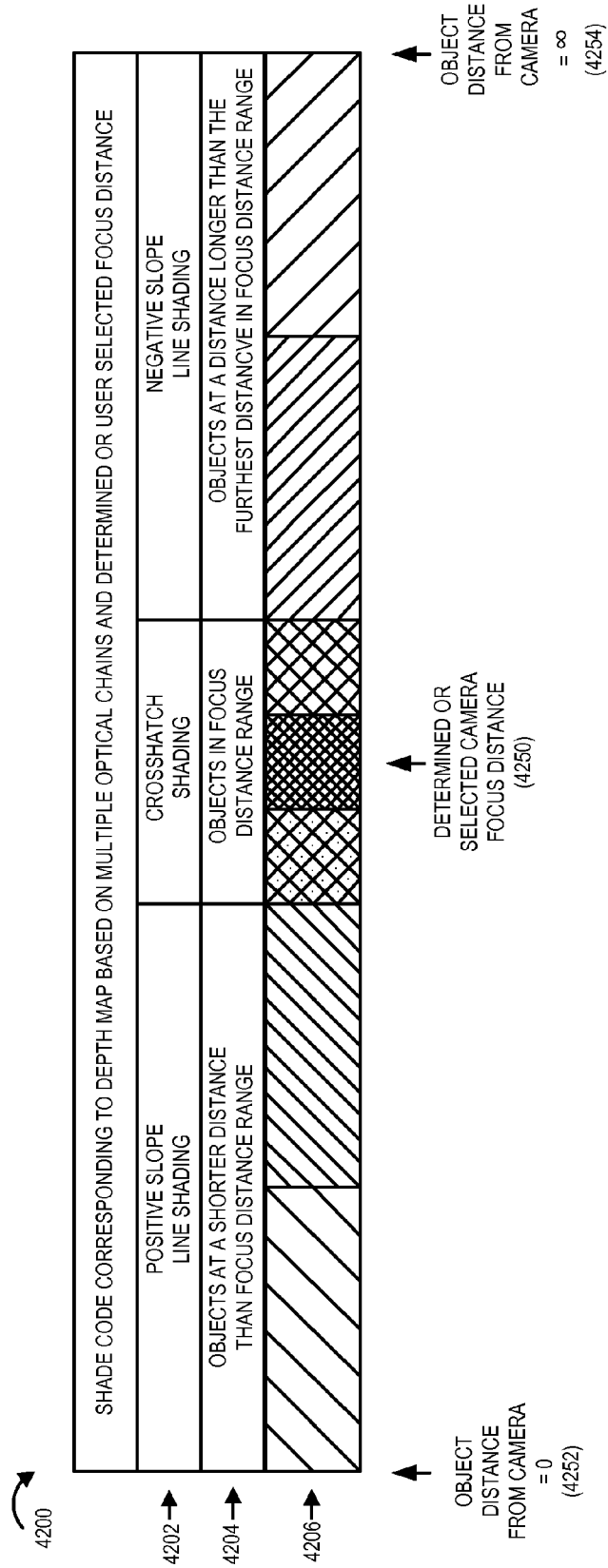
FIG. 18 is a drawing of table indicating an exemplary mapping between a shade coding scheme and camera focus distance information in accordance with an exemplary embodiment.

FIG. 18 is a drawing of table 4200 indicating an exemplary mapping between a shade coding scheme and camera focus distance information in accordance with an exemplary embodiment. Table 4200 indicates shade coding used in a visual representation of an image, based on a depth map based on multiple optical chains and based on a determined or user selected camera focus distance, in accordance with an exemplary embodiment. First row 4202 illustrates the basic shading patterns used; second row 4204 indicates objects distances corresponding to each basic shading pattern; and third row 4206 indicates refinements of the basic shading patterns, which provide a further refinement on object distances. In this example, there is a determined or user selected camera focus distance 4250. Point 4252 represents object distance from the camera=0, which represents one distance extreme. Point 4254 represents object distance from the camera=∞, which represents the other distance extreme.

Crosshatch shading corresponds to objects within the focus distance range. The focus distance range includes the determined or selected camera focus distance. In this example, there are three sub-ranges within the focus distance range (intermediate density crosshatch shading with dots, fine density crosshatch shading, intermediate density crosshatch shading). The center range which includes the determined or selected camera focus distance is represented by fine density crosshatch shading.

The positive slope line shading corresponds to objects at a shorter distance than the focus distance range. In this example, there are two sub-ranges (positive slope line shading with intermediate distance line spacing, positive slope line shading with wide distance line spacing) corresponding to positive slope line shading. The variation on the positive slope line shading is used to indicate how far an object in the image is with respect the focus distance range, e.g., how close an object is to the camera device.

The negative slope line shading corresponds to objects at a longer distance than the focus distance range. In this example, there are two sub-ranges (negative slope line shading with intermediate distance line spacing, negative slope line shading with wide distance line spacing) corresponding to negative slop line shading. The shading is used to indicate how far an object in the image is with respect the focus distance range, e.g., how much farther out an object is beyond the focus distance range.

At different times, the distance ranges corresponding to each of the shading patterns and/or shading pattern variations can be, and sometimes are, different, e.g., based on a different determined or user selected camera focus distance, e.g., based on a different selected point in the image selected to be the identified point for the camera focus distance, e.g., selected via touch of a point in the image on the touch screen, or based on a user selected camera focus distance, e.g., selected via touch of focus distance bar or via touch of an arrow on the touch screen.

Figure 19:
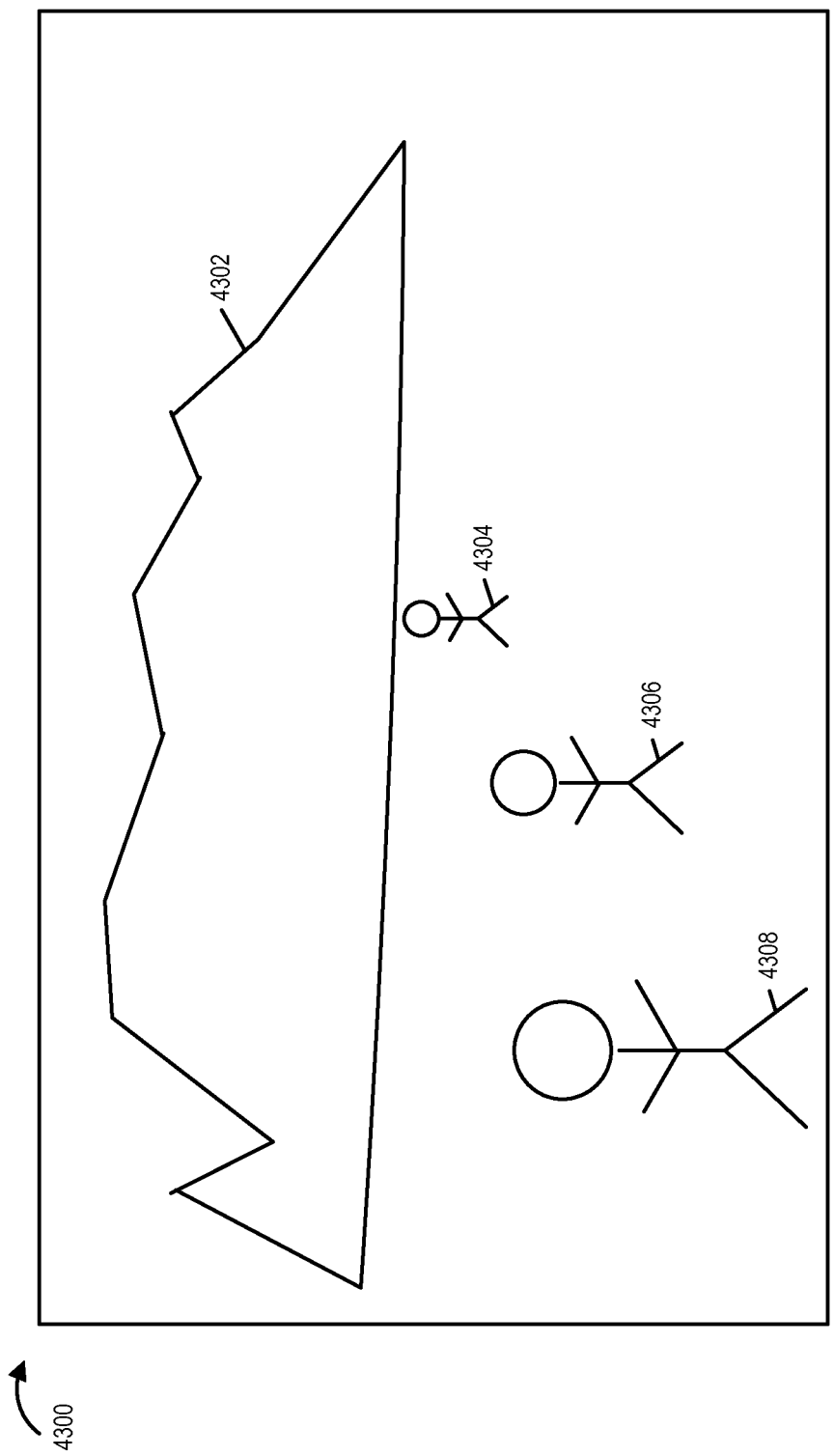
FIG. 19 is a drawing of an exemplary image displayed on a touch screen display of a camera device in accordance with an exemplary embodiments.

FIG. 19 is a drawing of an exemplary image 4300 displayed on a touch screen display of a camera device in accordance with an exemplary embodiments. The camera device has received image data from multiple optical chains and a depth map has been generated corresponding to displayed image 4300. The displayed image may represent an image from one of the multiple optical chains or from a composite of a plurality of optical chains.

The exemplary image 4300 includes a mountain range 4302 in the very far distance, and three people of approximate equivalent actual size, but situated at different distances from the camera device, person 1 4304 in the distance, person 2 4306 at an intermediate range, and person 3 4308 at a relatively close distance to the camera device.

Figure 20:
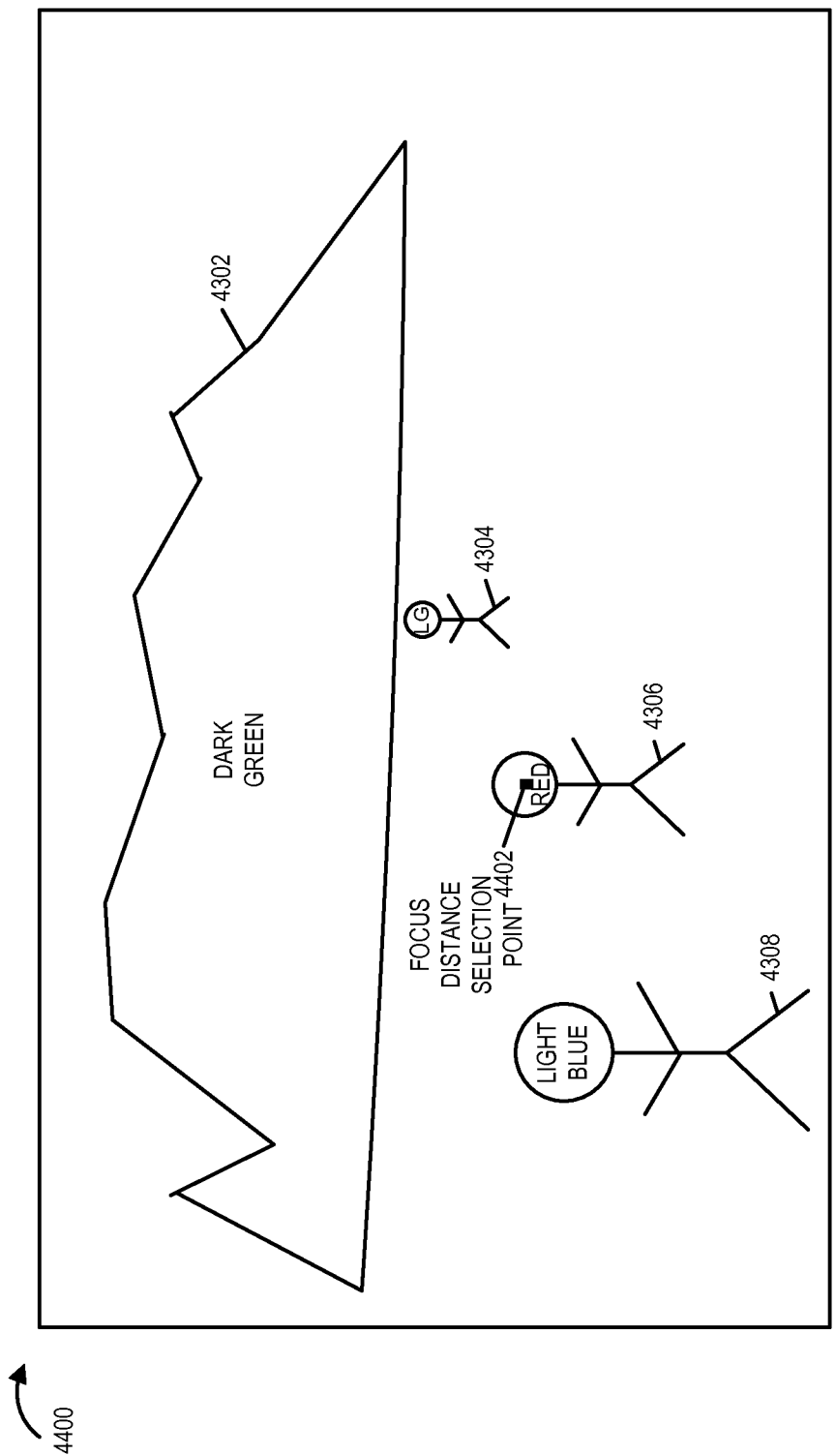
FIG. 20 is a drawing representing a color coded representation of the displayed image of FIG. 19 based on a depth map and corresponding to a first selected point used to determine camera focus distance.

FIG. 20 is a drawing 4400 representing a color coded representation of the displayed image 4300. In this example, the camera device has received user input identifying a selected point in the image for which a camera focus distance is to be determined, e.g., via a user touch on the touch screen of a selected point, represented by box 4402. In this example, objects at the selected focus distance are colored red, e.g., dark red. Therefore person 2 4306 is colored red, e.g., dark red. Mountain range 4302 is colored dark green, person 1 4304 is colored light green, and person 3 4308 is colored light blue. In this example, various shades of green are used to represent objects at distances longer than the furthest distance in the focus distance range. In this example, various shades of blue are used to represent objects at distances shorter than the furthest distance in the focus distance range.

Figure 21:
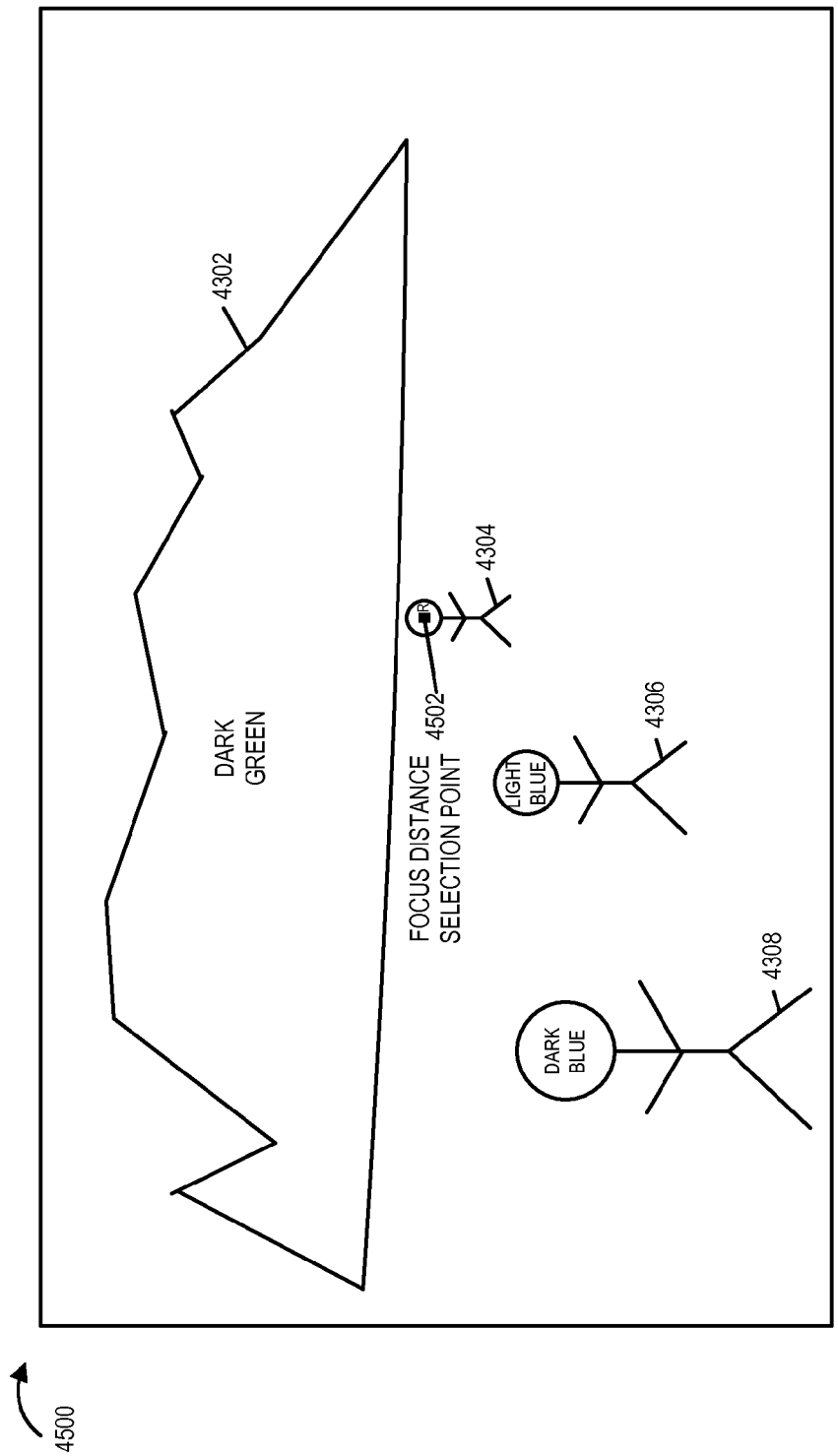
FIG. 21 is a drawing representing another color coded representation of the displayed image of FIG. 19 based on a depth map and corresponding to a second selected point used to determine camera focus distance.

FIG. 21 is a drawing 4500 representing a different color coded representation of the displayed image 4300. In this example, the camera device has received user input identifying a selected point in the image for which a camera focus distance is to be determined, e.g., via a user touch on the touch screen of a selected point, represented by box 4502. In this example, objects at the selected focus distance are colored red, e.g., dark red. Therefore person 1 4304 is colored red, e.g., dark red. Mountain range 4302 is colored dark green, person 2 4306 is colored light blue, and person 3 4308 is colored dark blue. In this example, various shades of green are used to represent objects at distances longer than the furthest distance in the focus distance range. In this example, various shades of blue are used to represent objects at distances shorter than the furthest distance in the focus distance range.

Figure 22:
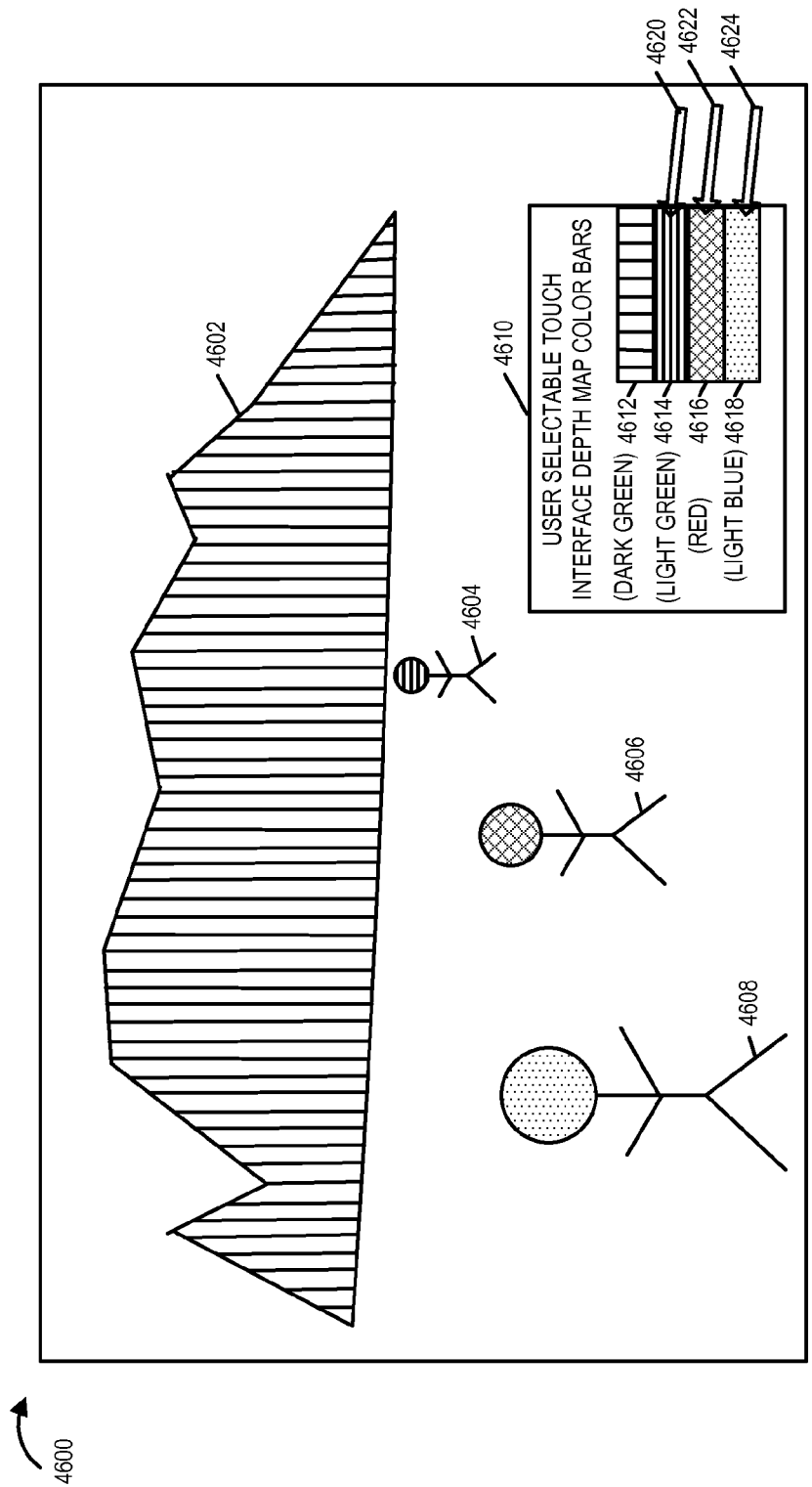
FIG. 22 is a drawing illustrating a user selectable in-focus distance range and exemplary user selection in accordance with an exemplary embodiment.

FIG. 22 is a drawing used to illustrate an exemplary user input in an exemplary embodiment including user selectable depth of field interface. Exemplary image 4600 displayed on a touch screen display of a camera device in accordance with an exemplary embodiment. The camera device has received image data from multiple optical chains and a depth map has been generated corresponding to displayed image 4600. The displayed image may represent an image from one of the multiple optical chains or from a composite of a plurality of optical chains.

The exemplary image 4600 includes a mountain range 4602 in the very far distance, and three people of approximate equivalent actual size, but situated at different distances from the camera device, person 1 4604 in the distance, person 2 4606 at an intermediate range, and person 3 4608 at a relatively close distance to the camera device.

Box 4610 is a user selectable touch interface depth map with color bars. In this example, different shading patterns are used to illustrate the different display colors. Each color corresponds to a different depth map distance, e.g., a different depth bucket. Dark green is represented by a vertical line shading pattern. Light green is represented by a horizontal line shading pattern. Red is represented by crosshatch shading. Light blue is represented by dotted shading.

Mountain range 4602 is colored dark green, as indicated by vertical line shading. Person 1 4604 is colored light green, as indicated by horizontal line shading. Person 2 4606 is colored red, as indicated by crosshatch pattern shading, and person 3 4608 is colored light blue as indicated by dotted pattern shading.

In this example, the user of the camera decides that it is desirable for person 1 4604, person 2 4606 and person 3 4608 to be within an in-focus range. The user touches the light green color bar 4614, as indicated by arrow 4620; the user touches the red color bar 4616, as indicated by arrow 4622; and the user touches the light blue color bar 4618, as indicated by arrow 4624. The camera device detects the user input indicating different distances from the camera which are desired to be included in the in-focus distance range. The camera device determines an in-focus range, a focus distance, and a depth of field as a function of the detected user input.

In some embodiments, rather than touching one or more color bars, the user touches one or more objects in the displayed image that the user desires to be included within the in-focus distance range. Alternatively, in some embodiments, the user may move positions on a sliding depth bar to select an in-focus distance range.

Figure 23:
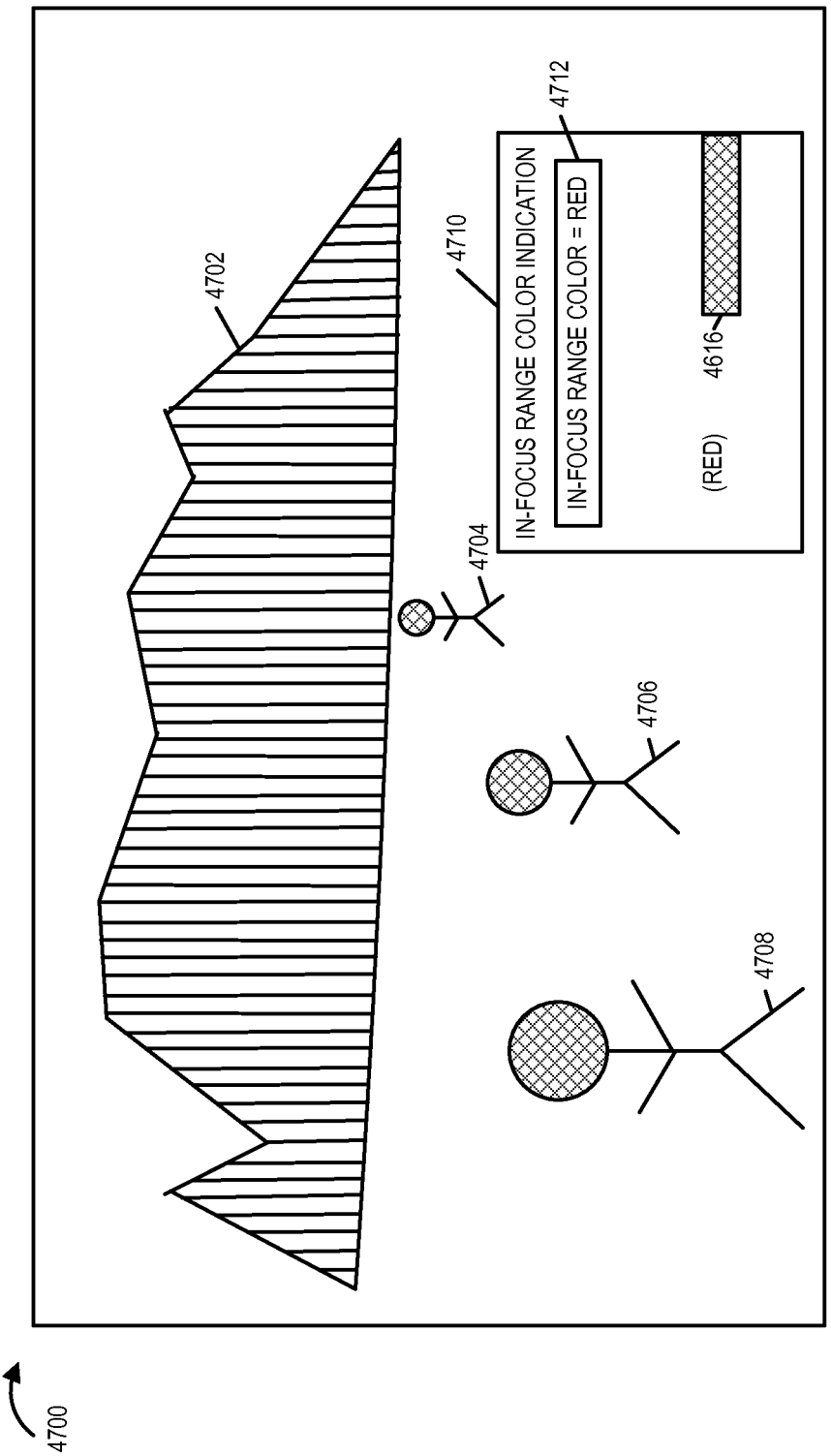
FIG. 23 is a drawing illustrating displayed image objects within the selected in-focus distance range, corresponding to the selection of FIG. 22, in accordance with an exemplary embodiment.

FIG. 23 is a drawing illustrating a visual indication of objects within the in-focus distance range in accordance with an exemplary embodiment. Exemplary image 4700 is displayed on a touch screen display of the camera device in response to the selected user input of the example of FIG. 22. In this example, box 4712, within legend 4710, indicates that objects in the display within the in-focus distance range are displayed in the color red, as indicated by a crosshatch shading pattern. Mountain range 4702 is colored dark green. Person 1 4704, person 2 4706, and person 3 4708, which are each within the user selected in-focus distance range are colored red, as indicated by crosshatch pattern shading. In some embodiments, the intensity of the color red varies as a function of the distance of an object within the in-focus distance range from the camera focus distance.

Figure 24:
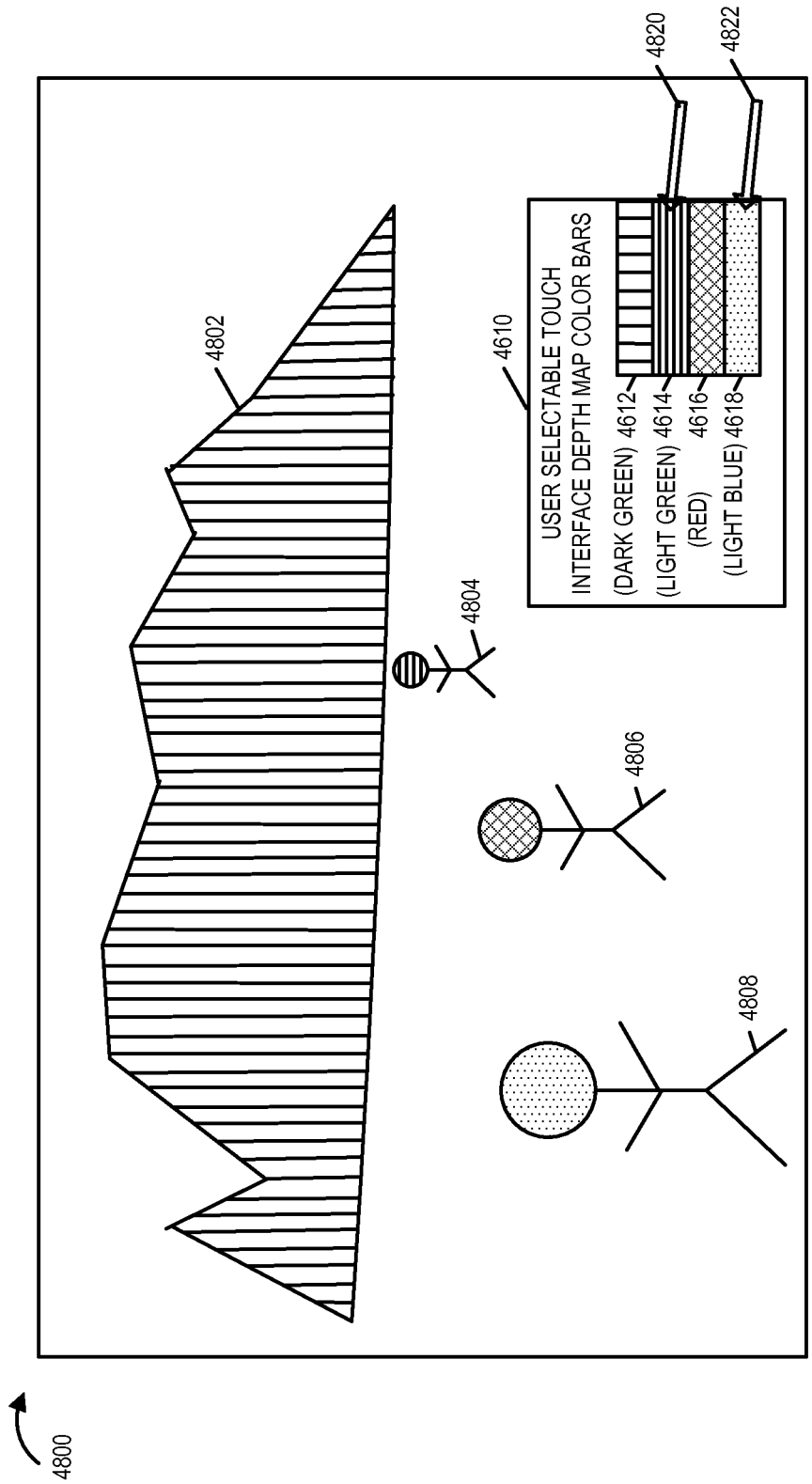
FIG. 24 is a drawing illustrating a user selectable in-focus distance range and another exemplary user selection in accordance with an exemplary embodiment.

FIG. 24 is a drawing used to illustrate an exemplary user input in an exemplary embodiment including user selectable depth of field interface. Exemplary image 4800 displayed on a touch screen display of a camera device in accordance with an exemplary embodiment. The camera device has received image data from multiple optical chains and a depth map has been generated corresponding to displayed image 4800. The displayed image may represent an image from one of the multiple optical chains or from a composite of a plurality of optical chains.

The exemplary image 4800 includes a mountain range 4802 in the very far distance, and three people of approximate equivalent actual size, but situated at different distances from the camera device, person 1 4804 in the distance, person 2 4806 at an intermediate range, and person 3 4808 at a relatively close distance to the camera device.

Box 4610 is a user selectable touch interface depth map with color bars. In this example, different shading patterns are used to illustrate the different display colors. Each color corresponds to a different depth map distance. Dark green is represented by a vertical line shading pattern. Light green is represented by a horizontal line shading pattern. Red is represented by crosshatch shading. Light blue is represented by dotted shading.

Mountain range 4802 is colored dark green, as indicated by vertical line shading. Person 1 4804 is colored light green, as indicated by horizontal line shading. Person 2 4806 is colored red, as indicated by crosshatch pattern shading, and person 3 4808 is colored light blue as indicated by dotted pattern shading.

In this example, the user of the camera decides that it is desirable for person 1 4804 and person 3 4808 to be within an in-focus range. The user touches the light green color bar 4614, as indicated by arrow 4820; and the user touches the light blue color bar 4618, as indicated by arrow 4822. The camera device detects the user input indicating different distances from the camera which are desired to be included in the in-focus distance range. The camera device determines an in-focus range, a focus distance, and a depth of field as a function of the detected user input. In this embodiment, the camera device determines a contiguous in-focus distance range, e.g., a contiguous in-focus range including the objects which correspond to the selected colors. Thus the camera device may, and sometimes does, include objects corresponding to colors which were not selected by the user within the in-focus distance range.

Figure 25:
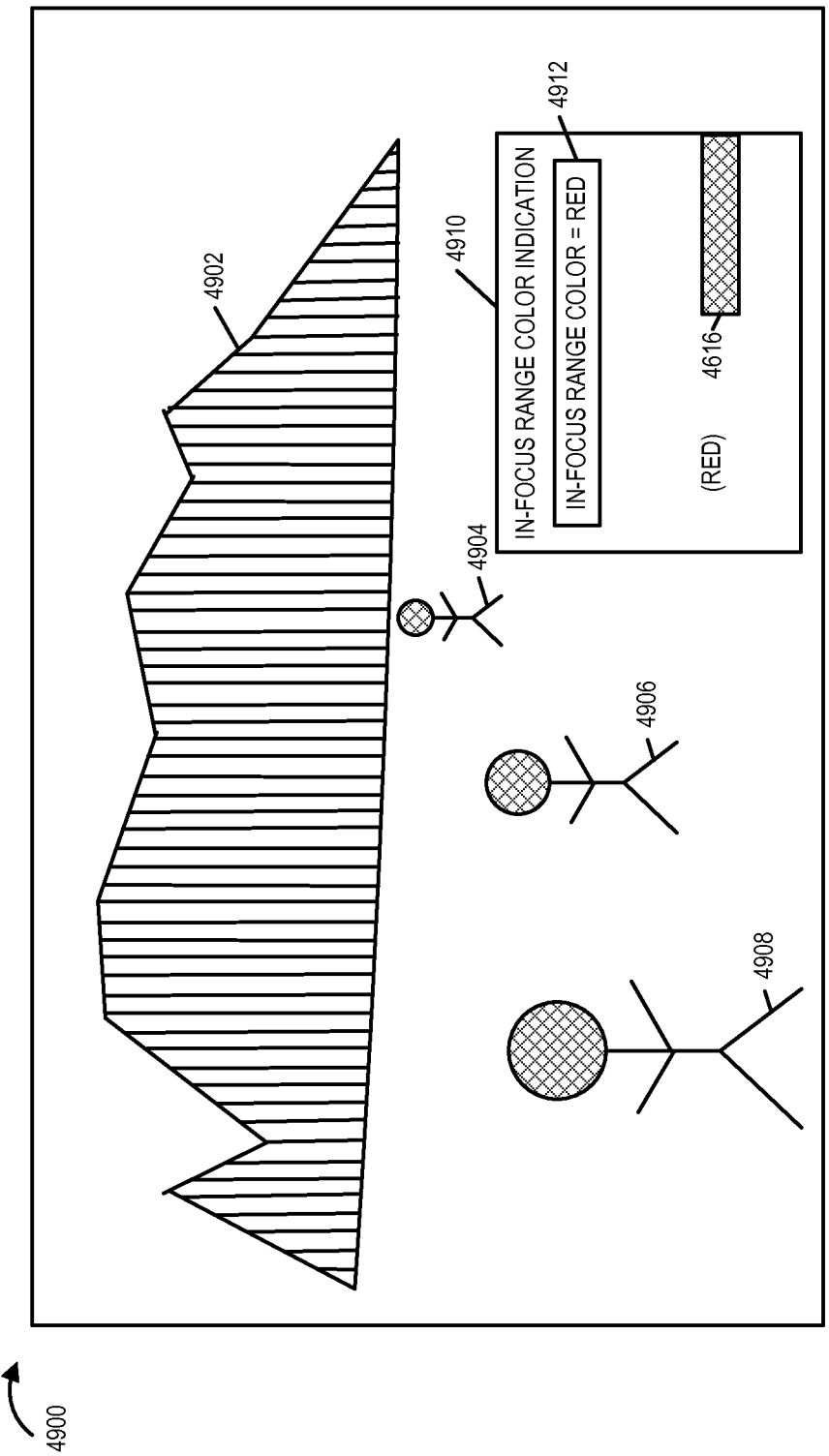
FIG. 25 is a drawing illustrating displayed image objects within the selected in-focus distance range, corresponding to the selection of FIG. 24, in accordance with an exemplary embodiment.

FIG. 25 is a drawing illustrating a visual indication of objects within the in-focus distance range in accordance with an exemplary embodiment. Exemplary image 4900 is displayed on a touch screen display of the camera device in response to the selected user input of the example of FIG. 24. In this example, box 4912, within legend 4910, indicates that objects in the display within the in-focus distance range are displayed in the color red, as indicated by a crosshatch shading pattern. Mountain range 4902 is colored dark green. Person 1 4904, person 2 4906, and person 3 4908, which are each within the user selected in-focus distance range are colored red, as indicated by crosshatch pattern shading. In some embodiments, the intensity of the color red varies as a function of the distance of an object within the in-focus distance range from the camera focus distance.

In various embodiments, the camera device provides a depth map on the device to the user at the time of taking a shot. An object that is at a slant angle or a large group of people may, and sometimes does, fall into several "colors" of depth buckets, and the user may want the entire object or the large group of people to be in-focus and want the background to be blurred. In some embodiments, such as the examples of FIGS. 22-25, the user is given the option to pick multiple depth buckets to be in-focus. The user can select his or her preference based on the depth map, e.g., clicking all of the depth colors that correspond to people in the group.

In some embodiments, the final chosen in-focus range is made continuous regardless of user selection, e.g., the camera automatically includes colors within the limits of the selected user range to be included as part of the in-focus range.

Numerous additional variations and combinations are possible while remaining within the scope of the invention. Cameras implemented in some embodiments have optical chains which do not extend out beyond the front of the camera during use and which are implemented as portable handheld cameras or devices including cameras. Such devices may and in some embodiments do have a relatively flat front with the outermost lens or clear, e.g., (flat glass or plastic) optical chain covering used to cover the aperture at the front of an optical chain being fixed. However, in other embodiments lenses and/or other elements of an optical chain may, and sometimes do, extend beyond the face of the camera device.

In various embodiments the camera devices are implemented as digital cameras, video cameras, notebook computers, personal data assistants (PDAs), or other portable devices including receiver/transmitter circuits and logic and/or routines, for implementing the methods of the present invention and/or for transiting captured images or generated composite images to other devices for storage or display.

The techniques of the present invention may be implemented using software, hardware and/or a combination of software and hardware. The present invention is directed to apparatus, e.g., dedicated camera devices, cell phones, and/or or other devices which include one or more cameras or camera modules. It is also directed to methods, e.g., method of controlling and/or operating cameras, devices including a camera, camera modules, etc. in accordance with the present invention. The present invention is also directed to machine readable medium, e.g., ROM, RAM, CDs, hard discs, etc., which include machine readable instructions for controlling a machine to implement one or more steps in accordance with the present invention.

In various embodiments devices described herein are implemented using one or more modules to perform the steps corresponding to one or more methods of the present invention, for example, control of image capture and/or combining of images. Thus, in some embodiments various features of the present invention are implemented using modules. Such modules may be implemented using software, hardware or a combination of software and hardware. In the case of hardware implementations embodiments implemented in hardware may use circuits as part of or all of a module. Alternatively, modules may be implemented in hardware as a combination of one or more circuits and optical elements such as lenses and/or other hardware elements. Thus in at least some embodiments one or more modules, and sometimes all modules, are implemented completely in hardware. Many of the above described methods or method steps can be implemented using machine executable instructions, such as software, included in a machine readable medium such as a memory device, e.g., RAM, floppy disk, etc. to control a machine, e.g., a camera device or general purpose computer with or without additional hardware, to implement all or portions of the above described methods, e.g., in one or more nodes. Accordingly, among other things, the present invention is directed to a machine-readable medium including machine executable instructions for causing or controlling a machine, e.g., processor and associated hardware, to perform e.g., one or more, or all of the steps of the above-described method(s).

While described in the context of an cameras, at least some of the methods and apparatus of the present invention, are applicable to a wide range of image captures systems including tablet and cell phone devices which support or provide image capture functionality.

Images captured by the camera devices described herein may be real world images useful for documenting conditions on a construction site, at an accident and/or for preserving personal information whether be information about the condition of a house or vehicle.

Captured images and/or composite images maybe and sometimes are displayed on the camera device or sent to a printer for printing as a photo or permanent document which can be maintained in a file as part of a personal or business record.

Numerous additional variations on the methods and apparatus of the present invention described above will be apparent to those skilled in the art in view of the above description of the invention. Such variations are to be considered within the scope of the invention. In various embodiments the camera devices are implemented as digital cameras, video cameras, notebook computers, personal data assistants (PDAs), or other portable devices including receiver/transmitter circuits and logic and/or routines, for implementing the methods of the present invention and/or for transiting captured images or generated composite images to other devices for storage or display.

Numerous additional embodiments are possible while staying within the scope of the above discussed features.

What is claimed is:

1. A method of controlling a camera device, the method comprising:
    generating a depth map of an image area;
    generating, based on said depth map, a visual indication of which portions of an image captured by said camera device are in focus and depth information indicating depth of objects;
    receiving user focus distance control input indicating a user selected focus distance from a user via i) a slider control, ii) a dial control or iii) a numerical focus input control; and
    generating a new visual indication of depth information along with an indication of which portions of an image captured by said camera device are in focus based on said user selected focus distance.

2. The method of claim 1, further comprising:
    modifying a portion of the image captured by said camera to alter a portion of said image which is not in focus, said modifying including blurring a portion of the image captured by said camera to produce blurring by an amount that is greater than the amount due to the lack of focus.

3. The method of claim 1, wherein different colors are used to indicate different object distances, a first color used to indicate objects in focus being one of said different colors, a second color being used to indicate objects closer to the camera device than objects which are in focus, said second color being one of said different colors and different from said first color.

4. The method of claim 1, further comprising:
displaying an image with a touch activated focus distance range bar, prior to generating a new visual indication, said image including the visual indication of which portions of the image captured by said camera device are in focus and depth information indicating depth of objects; and
determining a camera focus distance based on user control of a slider on said touch activated focus distance range bar.

5. The method of claim 4,
wherein generating a visual indication of which portions of an image captured by said camera device are in focus includes coloring different portions of said image different colors based on the distances to objects shown in said different portions of said image.

6. The method of claim 4,
wherein generating a new visual indication of depth information along with an indication of which portions of an image captured by said camera device are in focus based on said user selected focus distance includes:
changing coloring of the displayed image based on the user control of the slider on said touch activated focus distance range bar.

7. The method of claim 6,
wherein said change in the coloring of the displayed image is made prior to refocusing of the camera device based on the user control of the slider on said touch activated focus distance range bar.

8. The method of claim 7, wherein said change in color is performed based on the received user focus distance control input indicating a user selected focus distance.

9. The method of claim 1, further comprising:
receiving input from a user indicating a range of distances a user desires to be in focus; and
wherein generating a visual indication of which portions of an image captured by said camera device are in focus includes indicating as being in focus image portions corresponding to said range of distances a user desires to be in focus.

10. The method of claim 9 wherein said input from a user indicating a range of distances includes input indicating user selection of multiple objects which are located at different distances from said camera.

11. The method of claim 10, further comprising:
controlling a camera depth of field to include the multiple objects selected by the user within an in-focus distance range corresponding to said camera depth of field.

12. The method of claim 1,
wherein generating a new visual indication of depth information along with an indication of which portions of an image captured by said camera device are in focus based on said user selected focus distance includes:
changing coloring of a displayed image based on the user control of the slider on said touch activated focus distance range bar.

13. A camera device comprising:
a module configured to generate a depth map of an image area;
a module configured to generate, based on said depth map, a visual indication of which portions of an image captured by said camera device are in focus and depth information indicating depth of objects;
an interface configured to receive user focus distance control input indicating a user selected focus distance from a user via i) a slider control, ii) a dial control or iii) a numerical focus input control; and
wherein said module configured to generate a visual indication is further configured to generate a new visual indication of depth information along with an indication of which portions of an image captured by said camera device are in focus based on said user selected focus distance.

14. The camera device of claim 13, further comprising:
a module configured to modify a portion of the image captured by said camera to alter a portion of said image which is not in focus, said modifying including blurring a portion of the image captured by said camera to produce blurring by an amount that is greater than the amount due to the lack of focus.

15. The camera device of claim 13, wherein different colors are used to indicate different object distances, a first color used to indicate objects in focus being one of said different colors, a second color being used to indicate objects closer to the camera device than objects which are in focus, said second color being one of said different colors and different from said first color.

16. The camera device of claim 13, further comprising:
a display configured to display an image with a touch activated focus distance range bar, said image including the visual indication of which portions of the image captured by said camera device are in focus and depth information indicating depth of objects; and
a module configured to determine a camera focus distance based on user control of a slider on said touch activated focus distance range bar.

17. The camera device of claim 16, further comprising:
a module configured to color different portions of said image different colors based on the distances to the objects shown in said different portions of said image.

18. The camera device of claim 13, further comprising:
a module configured to receive input from a user indicating a range of distances a user desires to be in focus; and
wherein said module configured to generate a visual indication of which portions of an image captured by said camera device are in focus includes a module configured to indicate as being in focus image portions corresponding to said range of distances a user desires to be in focus.

19. The camera device of claim 18, wherein said module configured to receive input from a user indicating a range of distances includes a module configured to receive input indicating user selection of multiple objects which are located at different distances from said camera.

20. A non-transitory machine readable medium having machine executable instructions stored thereon which when executed by a processor control a camera device to:
generate a depth map of an image area;
generate, based on said depth map, a visual indication of which portions of an image captured by said camera device are in focus and depth information indicating depth of objects;
receive user focus distance control input indicating a user selected focus distance from a user via i) a slider control, ii) a dial control or iii) a numerical focus input control; and generate a new visual indication of depth information along with an indication of which portions of an image captured by said camera device are in focus based on said user selected focus distance.

* * * * *